United States Patent
Samid

(10) Patent No.: US 10,594,480 B2
(45) Date of Patent: Mar. 17, 2020

(54) EFFICIENT PROOF OF KNOWLEDGE OF ARBITRARILY LARGE DATA WHICH REMAINS UNEXPOSED

(71) Applicant: Gideon Samid, Rockville, MD (US)

(72) Inventor: Gideon Samid, Rockville, MD (US)

(*) Notice: Subject to any disclaimer, the term of this patent is extended or adjusted under 35 U.S.C. 154(b) by 26 days.

(21) Appl. No.: 15/594,637

(22) Filed: Feb. 12, 2018

(65) Prior Publication Data

US 2017/0331624 A1    Nov. 16, 2017

Related U.S. Application Data

(60) Provisional application No. 62/336,477, filed on May 13, 2016, provisional application No. 62/339,921, filed on May 22, 2016, provisional application No. 62/374,804, filed on Aug. 13, 2016.

(51) Int. Cl.
  *H04L 29/06* (2006.01)
  *H04L 9/08* (2006.01)
  *H04L 9/32* (2006.01)
  *H04L 9/06* (2006.01)

(52) U.S. Cl.
  CPC .......... *H04L 9/0869* (2013.01); *H04L 9/0618* (2013.01); *H04L 9/3271* (2013.01); *H04L 2209/08* (2013.01)

(58) Field of Classification Search
  CPC ... H04L 9/0869; H04L 9/0618; H04L 9/3271; H04L 2209/08
  See application file for complete search history.

(56) References Cited

U.S. PATENT DOCUMENTS

| | | | | |
|---|---|---|---|---|
| 6,105,133 A | * | 8/2000 | Fielder | H04L 9/0891 380/283 |
| 2007/0074273 A1 | * | 3/2007 | Linden | H04L 63/1441 726/3 |
| 2014/0185798 A1 | * | 7/2014 | Feliciano | H04L 9/0869 380/44 |
| 2014/0279558 A1 | * | 9/2014 | Kadi | G06Q 20/3278 705/71 |

OTHER PUBLICATIONS

"Password Authentication and Password Cracking", Feb. 15, 2016, Wordfence The WordPress Security Learning Center, 10 pages (Year: 2016).*

* cited by examiner

*Primary Examiner* — Carl G Colin
*Assistant Examiner* — Han Yang

(57) ABSTRACT

This invention establishes means and protocols to secure data, and practice online authentication, using large undisclosed amounts of randomness, replacing the algorithmic complexity paradigm. Computation is limited to basic primitives like transposition, and bit-flipping. Security is credibly appraised through combinatorics calculus, and this transfers the security responsibility to the user who determines how much randomness to use.

5 Claims, 1 Drawing Sheet

The PARCEL and PUZZLE Procedures

Prover:

(a)
(b)
(c)
(d)

Verifier:

(e)
(f)
(g)

The PARCEL and PUZZLE Procedures
Prover:
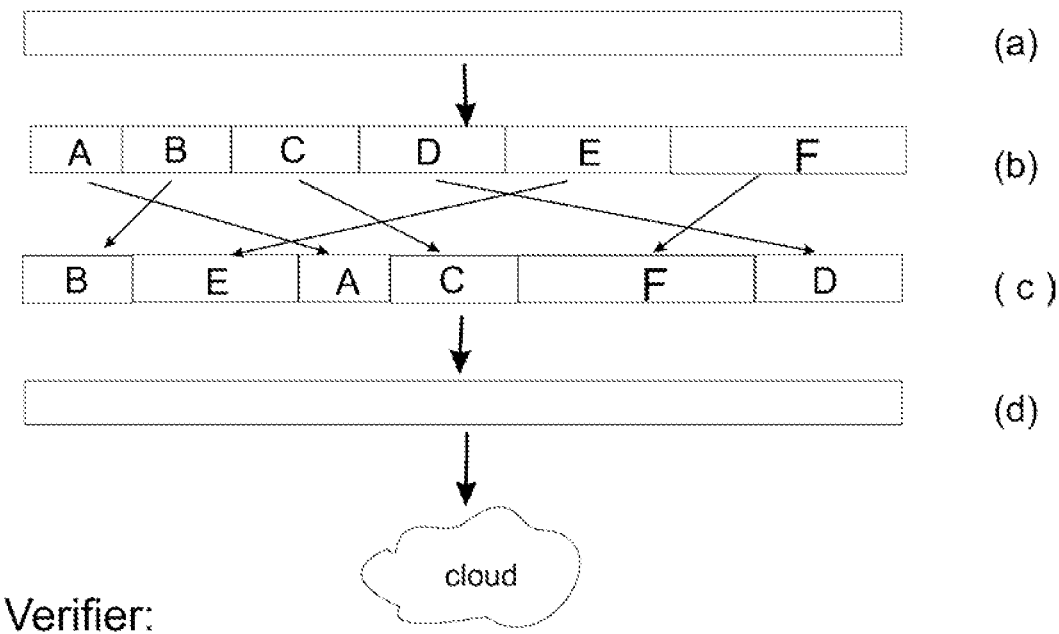
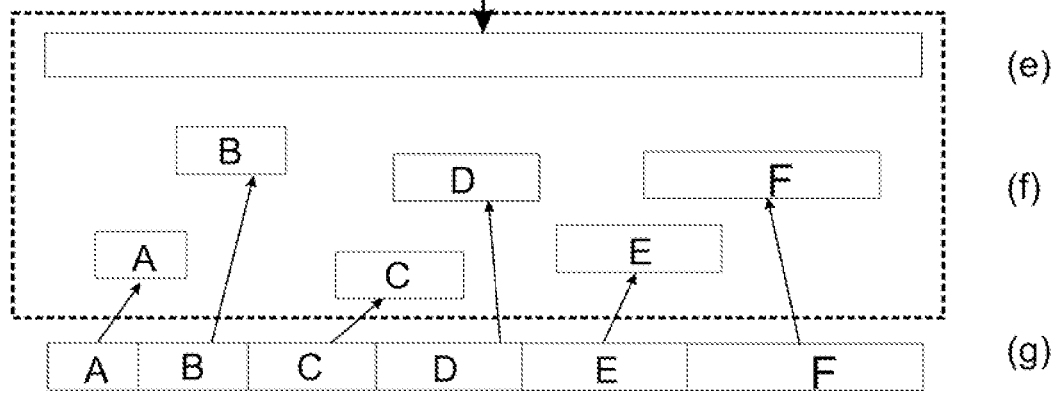

EFFICIENT PROOF OF KNOWLEDGE OF ARBITRARILY LARGE DATA WHICH REMAINS UNEXPOSED

TRACKED DATA TRANSMISSION

Tracking the Transactional History of Data

Proposing a method to pass data from its origination to a succession of recipients such that the sequence can be verified. The concept: mapping data to integers; expressing integers in the unary system (through bits count); flipping designated bits in the unary expression before passing the data on. So repeating from data originator to data terminator (the last recipient) such that it is possible to compare the bits identities at the terminator with the bits identities of any former data holder, up to the originator. Details and applications vary. Let D be some amount of data written as a bit string. Let us chop D to fixed size blocks of size b bits each. The last block will padded with zeros on the right side if necessary. Each block then contains a number B: $0 < B <= 2^b$. One will now express each B in a unary system, namely by a string comprised of B bits, where their count, B, reflects the value: $B=2^b+1$. The identities of the B bits will be randomly selected (or otherwise selected, but not implying any information about the value of that block). For example: D=100111001001101. Let b=3 so D becomes a succession of 3 bits blocks: D=100 111 001 001 101. or: D=5 8 2 2 6. Using '*' as a delimiter D will now be written as: D=10011*00111110*00*10*110000 where the identities of the bits don't represent any information about the value of D, only their count. So one could equally write: D=10001*11001110*10*11*011100
Let Alice be the originator of D. She then passed D to Bob. Let Bob now use some well defined protocol $Prot_b$, accordingly Bob flips certain bits in D, then passed it to Carla. Carla, when she wishes to pass D along to David will also execute a bit-flipping protocol ($Prot_c$) before passing D to David. An observer, checking D in David's hands and aware of the bit flipping protocol of all concerned will be able to unflip the D version in David's hands to recover the bit pattern held by Carla. Then the observer will be able to unflip the bit pattern held by Carla to find the bit pattern held by Bob, and then compare it with the original form of D as originated by Alice. if the comparison checks out then the observer is persuaded that D traveled from Alice to Bob and from Bob to Carla, and from Carla to David. This bit flipping protocol can be exercised any number of times without increasing the measure of the data. It proves which hands the data went through without the need for add-on signatures. Note that any bit can be flipped and re-flipped any number of time. Illustration: We take the original D=10011*00111110*00*10*110000, which Alice passes to Bob. Bob, say flips the rightmost bit for each block to create: D'=D=10010*00111111*01*11*110001 which he then passes (D') to Carla. Carla's protocol is to flip the leftmost bit for any block comprised of even number of bits, so she creates D=D'=D": D"=10010*10111111*11*01*010001 An observer checking out D", then reverse flipping Carla's flips will generate D', and upon reverse-flipping Bob's flips will re-create D, the original version of the data, and by that the observer will verify the transactional track for the data. Note that the contents of the data D remains the same through the various flipping operations because the identity of the bits does not play a role in evaluating the data value of D. When Alice distributes some data D to n recipients, she can tailor a flipping protocol to each recipient, or let some or all share the same protocol. The same for every recipient of data. Thus a data D that is tree-distributed through the network, carries in its bits the tracking history going back to its original creator. There are various applications based on the nature of the flipping protocol and who knows what this protocol is. The protocol may be completely random (driven by non-algorithmic randomness generators), and then each sender will keep a database of which bits were flipped, and share them according to the particular application. The tracking chain also proves who has seen the data in the network. It is possible to mark the boundaries through double-bitting: in the example above the delimiters, the boundaries between the various block numbers, B, were marked with a "*". But since a computer is binary bound we can implement this by using two consecutive bits to represent one: so: 00→0 and 11→1. The "*" of each B number will be written with '01' and the combination '10' will be reserved to separate one D from the next, or for related designations. Accordingly the original D will be written as: D=10 1100001111 01 0000111111111100 01 0000 01 1100 01 111100000000 10 Of course, in that case all flipping will have to effect the respective pair.

Towards a Generic Block Cipher with Preset Bound Breakability

Proposing a generic setup of substitution-transposition primitives that may emulate every block cipher, and operates with a key selected by the user from a series of monotonic rising key sizes, up to Vernam (Shannon) mathematical security, where the breakability of shorter keys is bound by durable combinatoric computation, immunized against the possibility of a mathematical shortcut that overshadows all complexity-hinged block ciphers. The proposed GBC is defined over several matrices of size: $u*v=2^n$, where all n-bits long strings are randomly placed, and transposed as needed. No algorithmic complexity is used, only guided matrix to matrix substitution. The idea of the GBC is to exploit the cryptography benefit of symmetric substitution-transposition ciphers to their theoretical limit, and to pass control of security metric to the user to adjust for the prevailing circumstances, up to perfect secrecy.
Introduction: Block ciphers are the working horse of cryptography, a plaintext string comprised of n bits is encrypted into a cipher string comprised of n' bits where, in most cases n=n'. Encryption and decryption are carried out with the same or very similar key. DES, and its successor AES are the most prominent examples. Alas, DES and AES, as well as virtually all other block ciphers, are based on arbitrary parametric choices which, some suspect, hide latent mathematical vulnerability. Even if such vulnerabilities were not put there by design as conspiracy theorist argue, these vulnerabilities may be hidden there unwittingly. And since triple-DES and AES are so common, they become a highly prized target for world class cryptanalytic shops, bent on identifying these hidden vulnerabilities. Needless to say that such exploitation of vulnerabilities may already have happened. Those who did crack, say AES would put an inordinate amount of effort to hide this fact, and keep us untouched by suspicion of the truth. Only if we naively believe that national ministries for information warfare and similar others have not yet cracked AES would be continue to use it, as we do. The generic block cipher remedies this vulnerability. Another attribute of all common block ciphers is the fact that they all come with a fixed size key (AES may use three key sizes, but once a cipher is selected, the key size is fixed). A fixed key size implies fixed security. Normally a user needs to secure data of low sensitivity, data of medium sensitivity, and data of high sensitivity. Using a fixed security cipher implies that at least two of these data categories are either over-secured, or under-secured. A GBC will allow the user to 'dial up'. or 'dial down' the security provided for each data category to create a good match. This security adjustment will take place by chosing larger or smaller keys. A third attribute of the GBC is that it encrypts several, t, plaintexts in parallel, resulting in a single ciphertext, that in turn decrypts back to the t generating plaintexts. The co-encrypted plaintexts may be unrelated, or related. If unrelated then, the benefit is in efficiency and improved security owing to the linkage in the encryption (and decryption) process. If related then the benefit depends on the relationship. For example, a block of size to bits may be co-encrypted by regarding each consecutive n bits as a separate plaintext stream, and combining the t stream into a linked ciphertext. A clear advantage of the parallel encryption is for document management. A document may contain several levels of secrecy such that each intended reader should be allowed to read at his level or below, but not above. The GBC allows an organization to write, transmit, and store a single document in its encrypted form, while all intended readers see in it only what they are allowed to see. This offers a crucial document management efficiency, especially critical for complex project management and for intelligence dissemination. In summary: GBC remedies the common risk for block ciphers (mathematical breach), it shift the control over security level to the user, who can adjust it per the situation, and if enables parallel encryption of several plaintexts into a single ciphertext that decrypts only to the plaintexts which that key holder was allowed to read. Definition and Constructs Given an alphabet A comprised of n letters, one would define a block cipher over A, as a cipher that encrypts a fixed size block comprised of q letters from A, to the same size block of q letters of alphabet A. A proper block cipher is a cipher with a key space K of size |K|, such that each key, k∈K operates on any block (plaintext block) to generate a matching block (ciphertext block), such that the same key decrypts the ciphertext block to its generating plaintext block. The number of possible blocks $b=n^q$. These b blocks may be listed in b! permutations. A key k∈K may be regarded as a transposition key, that changes permutation $\pi_i$ of the b blocks to some other permutation $\pi_j$ of the same blocks $1<=j,j<=b!$. This interpretation is based on the procedure where a given block $b_p$, standing at position $l(1<=l<b)$ in permutation $\pi_i$, will be replaced with its matching ciphertext block $b_c$ generated via a key, k in the matching permutation $\pi_j$. In other words, any block in position l in permutation $\pi_j$ will encounter its corresponding ciphertext block in the same position l in permutation $\pi_j$. That is because every block functioning as a plaintext will point to a unique block as a ciphertext, otherwise some ciphertexts will face equivocation as to which is the plaintext that generated them, and hence that cipher will not qualify as a proper block cipher. A Complete Block Cipher (CBC): A proper block cipher will be regarded as 'complete' over an alphabet A and block size q if for every two arbitrary permutations $\pi_i$, and $\pi_j$, there is a key k∈K that transposes $\pi_i$ to $\pi_j$. Since there are b! permutations, then a complete block cipher will have to have a key space K such that $|K|>=0.5b!(b!-1)$. It is easy to see that DES, AES, and their likes are not CBC. For AES, the first level: the key space $|K_{AES}|=2^{128}$ while the block size is b=128 bits, so $b!=(2^{128})!$ Each of the b! permutations may be transposed with each of the $2^{128}$ keys This defines b!*b transpositions much less than the required: $0.5b!(b!-1)$. In fact AES is a negligible fractional size compared to a complete block cipher over the same block size, and over the same binary alphabet. The First CBC Theorem: all proper not-complete block ciphers are a subset of a complete block cipher. Proof: All the $|K_{non-CBC}|$ keys of a non-CBC transpose a block listing $\pi_i$ to some block listing $\pi_j$. Hence any CBC will have a matching key for each key of the non-CBC, and then some. The Second CBC Theorem: All instances of CBC are equivalent to each other. Proof: Given two block listing permutations $\pi_i$, and $\pi_j$. A CBC regarded as "CBC'" will, by definition feature a key $k'\&_{ij}$ that would transpose $\pi_i$ to $\pi_j$. Albeit, any other CBC designated as "CBC*", by definition will also have a key $k*_{ij}$ that would transpose the same plaintext listing to the same matching ciphertext listing. So while these two keys may be quite different, and the CBC may be exercised via different algorithms, their "black box" operation is the same. They are equivalent. A Group Representation of a CBC: Given some starting permutation $\pi_1$, it can be operated on with a CBC key $k_{1i}$ to transpose $\pi_i$ to another permutation $\pi_i$, which in turn may be operated on with another CBC key $k_{ij}$ that would transpose $\pi_i$ to $\pi_j$. However, by the definition of the CBC, it would include a key $k_{1j}$ that would transpose $\pi_1$ to $\pi_j$. We can write: $k_{ij}*k_{1i}=k_{1j}$ Since the effect of each CBC key$_1$ is to move the rank of each block $l(1<=l<=b)$ some $x_{1l}$ ranking slots up or down, and key$_2$ will move the same block $l$ $x_{2l}$ up or down then the net result is independent of the order of applying these keys, therefore we can write: $(k_{jr}*k_{ij})*k_{1i}=k_{jr}*(k_{ij}*k_{1i})$ Also, by definition of the CBC any arbitrary permutations $\pi_i$ and $\pi_j$ may exchange status plaintext-ciphertext, therefore every $k_{ij}$ has a matching $k_{ji}$ such that: $k_{ij}*k_{ji}=k_{ji}*k_{ij}=k_{00}$ where $k_{00}$ is defined as the "no effect" encryption, where the ciphertext equals the plaintext, as applied to any permutation. Clearly: $k_{ij}*k_{00}=k_{00}*k_{ij}=k_{ij}$ Which identifies the CBC keys as a group (even an Abelian group, using the same arguments used for proving the association attribute). And as such it lends itself to various applications of asymmetric cryptography, especially by exploiting some CBCs which are one-way functions versus others (although functionally equivalent) which are two-ways functions.

GBC—The Concept The motivation for GBC is the emerging cryptographic approach to increase the role of randomness at the expense of unproven algorithmic complexity. All the mainstay block ciphers in use today are based on a fixed (rather short) key, and a particular algorithmic complexity, which by its very nature is susceptible to yet uncovered mathematical insight offering a fatal computational shortcut. By contrast, ciphers who accept varying size keys, and operate with algorithmic simplicity will hinge their security on the randomness of the adjustable size key, and hence will escape the risk of a mathematical shortcut, and instead sustain a computational intractability defense which may be objectively appraised through combinatorics. We are looking at a block cipher environment where a message comprised of m letters of a certain alphabet (a message block) is encrypted to ciphertext of same size, written in the same alphabet, which may be decrypted to the generating message (bijection). The vehicle for randomness, given a cipher that operates on some alphabet A comprised of u*v=n letters (u,v positive integers) is "the alphabet matrix": a u*v matrix where each letter a from some alphabet A (a∈A) comprised of u*v letters, is found once, and only once in M. We assume that the letters in A have a pre-agreed order. When these letters are marked into the alphabet matrix with that order in tact, we regard this matrix as "the zero permutation" of the alphabet matrix: $M^0$. We agree to count the element row after row starting with the upper one. Using the "ultimate Transposition cipher"[ ] or any other means we may assign a natural number T ranging from 1 to $(u*v)!$ to mark any of the $(u*v)!$ possible distinct alphabet matrices. The designation $M^T$ will denote an alphabet matrix at transposition T. We define "an encryption set" as a set of 4 alphabet matrices designated as $P_1$, $C_1$, and $C_2$, and $P_2$ We define "a double substitution act" as an act where two elements, one from $C_1$, and one from $C_2$ substitute for two elements, one from $P_1$ and one from $P_2$: $\{p_1 \epsilon P_1, p_2 \epsilon P_2\} = \rightarrow \{c_1 \epsilon C_1, c_2 \epsilon C_2\}$ Accordingly a message m written in alphabet A comprised of letters $p_1, p_2, \ldots p_n$ may be encrypted using the a GBC encryption set by processing a double substitution act: $p_1 p_2 \rightarrow c_1 c_2$, $p_3 p_4 \rightarrow c_3 c_4, \ldots$ Decryption operates in reverse: $\{c_1 \epsilon C_1, c_2 \epsilon C_2\} \rightarrow \{p_1 \epsilon P_1, p_2 \epsilon P_2\}$ Substitution and reverse substitution are controlled by the following relationship: Let $p_1$ be written in $P_1$ in row i and column j: $p_1 = p_{1ij}$. Let $p_2$ be written in $P_2$ in row j and column k: $p_2 = p_{2kl}$. These two plaintext letters will be substituted by $c_1$ written in $C_1$ in row i column l, and by $c_2$ written in $C_2$ in row k column j. $\{p_{1ij} \epsilon P_1, p_{2kl} \epsilon P_2\} \Leftrightarrow \{c_{1il} \epsilon C_1, c_{2kj} \epsilon C_2\}$ Lemma 1: This double-substitution cipher operates as a complete block cipher for blocks comprised of two letters of the A alphabet. A 'complete block cipher' will have a key that encrypts any possible block to some other block, and because of bijection this implies that any two letters block may be decrypted to some other two letters blocks. Theorem 1: The double-substitution cipher may be made equivalent to any block cipher for two letters blocks. Proof: Let an arbitrary block cipher operate on two letters blocks, for letters of the A alphabet. Accordingly that Arbitrary Block Cipher (ABC) will use some key, K to encrypt any of the possible $(u*v)^2$ blocks, each to some other block from the same set. We need to show that there are 4 alphabet matrices: $P_1$, $P_2$, $C_1$, $C_2$ such that the same encryption occurs with them as with the ABC. Let's first assume that some choice encryption set of four matrices as above has been occupied by the $n = u*v$ letters per each matrices, and that all blocks (pairs of two A letters) have been encrypted in the same way as in the ABC. In that case the double-substitution encryption is equivalent to the ABC. Let's now retract our assumption and assume that only (n−1) blocks were properly fitted but the last one can't be fitted because the only two letters (one in $C_1$ and one in $C_2$) that are left unused, are the pair: $c_{1i'j'} \epsilon C_1$, $c_{2k'j'} \epsilon C_2$ And at least one of the following equations is true: i≠i', j≠j', k≠k', and l≠l'. In that case the two unused elements in $C_1$ and $C_2$ will decrypt to $p_{1ij} \epsilon P_1$, $p_{2kl} \epsilon P_2$ which have already been properly accounted for (while their corresponding $C_1$, and $C_2$ elements are still unused). This contradiction eliminates the possibility that n−1 block are properly mapped while the last one is not. We move backwards now to the case where n−2 blocks are properly mapped, and 2 pairs of unused elements are left in each of the four matrices. In that case either there is such a combination where one of the left two pairs is properly fitted, in that case we bounce back to the former state, which we have already proven to be impossible, so all pairs fit, or that there is no fit among the two pairs according to the double-substitution algorithm. In that case the matrix matching elements in $C_1$ and in $C_2$ for one pair of elements one in $P_1$, and one in $P_2$ will point to different pair in $P_1$ and $P_2$, alas this pair has already been matched, while its corresponding elements in $C_1$ and $C_2$ are still unused. Again a contradiction that eliminates that assumption.

We can now regress back to the case where n−3 pairs are properly matched, and repeat with the same logic. Then continue to n−4, n−5, etc, until we reach, if necessary the case of one pair fitting, which is clearly possible. This proves that the double-substitution encryption is a generic block cipher for blocks that are comprised of two letters of some alphabet A. Note that this proves that DES, AES, etc. will find their double-substitution cipher equivalent. DES for example will be interpreted as a two letters block where the respective alphabet is all the bit strings of 32 bits long. Note that the double-substitution key space: $|K| = ((u*v)!)^4$ is much larger than the the plaintext-ciphertext pairs: $(u*v)^2$. multiple substitution iteration Denoting double-substitution in short as follows: $[p_1, p_2][c_1, c_2]$ we may extend the double-substitution to triple substitution as follows: $[p_3, c_2][c_3, c_4] = [p_1, p_2, p_3][c_1, c_3, c_4]$ And similarly extend the same to t-substitution: $[p_t, c_{2t-4}][c_{2t-3}, c_{2t-2}] = [p_1, p_2 \ldots, p_t][c_1, c_3 \ldots, c_{2t-2}]$ This procedure amounts to a block cipher encrypting a block comprised of t letters from the A alphabet $p_1, p_2 \ldots, p_t$ to a ciphertext block of t letters from the same alphabet: $c_1, c_3 \ldots, c_{2t-2}$. The key for this cipher is comprised of 2t alphabet matrices. Theorem 2 The t-substitution cipher may be made equivalent to any block cipher for t letters blocks. Two proves: Proof #1: Very similar to the proof of theorem 1. Suppose the t-substitution fits an arbitrary block cipher (ABC) that encrypts a block of t letters from the A alphabet to a ciphertext block of t letters of the same alphabet. Then all is well. Now suppose that the last unused pair of elements in matrix $P_t$ and matrix $C^{2t-4}$ does not fit with the last unused pair of element in matrices $C_{2t-3}$ and $C_{2t-3}$. That would imply that the pair in $C_{2t-3}$ and $C_{2t-3}$ that does fit with the pair in $P_t$ and matrix $C_{2t-4}$ is matched with another (wrong) pair in these two matrices, which contradicts our previous assumption, so it can not happen. Now we start regressing, assume that the last two pairs don't fit, same argument as above: contradiction. And again as we regress leading to the inevitable conclusion that any proper block cipher operating with a block of t letters of some alphabet A may be faithfully emulated with a t-substitution cipher. Proof 2: The first pair encryption: $[p_1, p_2][c_1, c_2]$ is fully compatible with the emulated ABC by virtue of theorem 1. So for the next pair: $[p_3, c_2][c_3, c_4]$ and so on to the last pair. The key space for the t-substitution cipher is: $|K| = ((u*v)!)^{2t}$, while the message space is much smaller: $|M| = (u*v)^t$—fully compatible with Shannon mathematical secrecy condition. Illustration: Let the alphabet A be the hexadecimal numeric system: $0, 1, \ldots F$ which may also be represented as all possible 4 bits long letters: $\{0000\} 4 - \{1111\}$. Let us encrypt a block comprised of 44 letters using only a double-substitution cipher. The message space (number of distinct blocks) will be: $|M| = 16^{44 = 9.6} * 10^{52}$; the key space: $|K| = 16!^4 = 1.92 * 10^{53}$. It figures then that a block of 44 hexadecimal letters or less (704 bits or less) may be encrypted with a simple double-substitution cipher while allowing for Shannon mathematical secrecy. Given a randomized transposition of the matrices even a simple double-substitution cipher may provide mathematical secrecy for an indefinite encrypted message. The schematics of multiple-substitution cipher is as follows: Iteration Configuration The above described iteration is only one possible variation. Here is a second one: $[p_3, c_1][c_3, c_4] = [p_1, p_2, p_3][c_2, c_3, c_4]$ In other words, instead of matching $p_3$ with $c_2$, it is matched with $c_1$. In the next iteration, $p_4$ may be matched wither with $c_3$, or with $c_4$, and so on. For i iterations there are $2^i$ possible combinations, that are distinct, but share the same properties. The user will have to specify which of the various iteration sequences should be used. This selection may, or may not be part of the secrecy of the cipher.

Plaintext Randomization Any plaintext in the series of message streams $P*_1, P*_2, \ldots p*_t$ may be replaced with a random variable: a uniform selection of a letter a from alphabet A: $P*_j = \{a \epsilon A \text{ by random selection}\}^r$ where r is the count of letters in plaintext stream $P^*_i$. And $1<=i<=t$. We say that stream $P^*_i$ has been randomized. If all the streams have been randomized then a cryptanalyst will search in vain for the non existent meaningful plaintexts. If (t−1) plaintext streams are randomized then the remaining non-randomized stream will be very well protected. Even if a single stream is randomized, it will be very effective in confusing the cryptanalyst. We assume a cryptanalyst hunting the key by brute force testing all possible keys (if he knows the exact iteration configuration), against the known ciphertexts. Naturally a randomized plaintext will keep the cryptanalyst searching through all possible combinations for the plaintext stream. In the case of a simple double-substitution, $P^*_2$ may be randomized, and hence the cipher will only encrypt $P^*_1$. In this configuration it will take a long time (will require a long encrypted version) for the frequency cryptanalysis to become productive.

Single-Substitution Given three alphabet matrices: $P_1$, $C_1$, and $C_2$

Emulating Odd Size block ciphers: At the least GBC needs to divide the intended block into two equal parts (that is to establish a minimum double substitution cipher). But in general GBC works well with blocks of size $2^n$, that can be divided to as many sub blocks as desired. However, in order to be regarded as a generic block cipher the GBC will need to be able to emulate all block sizes, including blocks comprised of odd number of bits. GBC will do it by extending the emulated odd-block cipher, of size z bits to a higher bit size x, where $x=2^n$, where n is such that $z>2^{n-1}$. The extended cipher will operate on a x size block, and will operate as follows: The rightmost z bits from the x bits string will be fed into the odd-size block cipher and the remaining (x-z) bits will be left padded to the z bits of ciphertext generated by the odd size block cipher. This will define an x size block cipher which GBC can emulate, and derive from it the emulation of the odd-sized block cipher.GBC as GroupThe GBC form groups per block and per cryptographic configuration, as seen ahead. Given a t-substitution GBC defined over an alphabet A of u*v letters. For every instant of 2t alphabet matrices, (featuring 2t*u*v letters) any t letters block is encrypted to a t-letters ciphertext. There are $b=(u*v)^t$ t-letters size blocks for the plaintext space and for the ciphertext space: $|P|=|C|=b=(u*v)^t$ The GBC key, K, (which is the contents of the 2t alphabet matrices) is mapping any plaintext block to a unique ciphertext block. We may agree on an order of the (u*v) letters, and hence assign them numbers from 1 to u*v. Based on such numbering we may list the all the b blocks in order. We regard this order as the base order, or the unit order of the GBC block space, and mark it as $B_1$. The b distinct blocks may be ordered in b! possible ways: $B_1$, $B_2$ ... $B_{b!}$. By applying the GBC key, K to all the blocks in some $B_p$ order ($1<=p<=b!$), one will generate the same blocks, now organized as the matching ciphertexts, in an order designated as $B_c$($1<=c<=b!$). Block listed in position i in $B_p$ when encrypted with K, will generate some other block, which will be listed in position in $B_c$. By applying K to all the blocks in $B_p$ one generates a transposition of $B_p$, which we regard as $B_c$. Let $K=K_i$ be the GBC key used for this transposition of the blocks. We may designate this transposition as $T_i$. Another GBC key, $K_j$, will be designated as transposition j: $T_j$. There are $((u*v)!)^{2t}$ such transpositions. Generic Block Cipher Framework Nominally ciphers process key bits with message bits to generate the ciphertext. Albeit, the key could be used in a more abstract way: it provides random data, and it shapes the encryption and decryption algorithm. We may use the term cipher framework to describe such a configuration.

To construct a GBC one would need to specify the alphabet A, the dimensions of the alphabet matrices: u, v; the size of the block, t, which also defines the cipher as a t-substitution algorithm, and the permutation of A over the 2t alphabet matrices. The GBC key may be defined as: $K<sub<GBC=[A, t, u, v\{T_{ij}\}_t]$ where $0<=T_{ij}<=(U*v)!$ expresses the permutation number $T^*_{*j}$ that defines the permutations of the letters in A in matrix $T_{j*}$. As mentioned, we may use any complete transposition cipher to apply the natural number $T_{*\&}$ndexj over the base permutation of the letters in A, and generate any of the possible (u*v)! permutations. By opting for a cipher framework we give the user the power to choose the fitting cipher algorithm for his or her needs. Illustration: Let A be Base-64, hence comprised of all the 6 bits long strings: $\{0,0,0,0,0,0\}$ to $\{1,1,1,1,1,1\}$. Let u=v=8 so that all $2^6$=64 letters in A fit in the alphabet matrices. Let t=10, hence the, the processed block will be 60 bits long. The cipher framework will require 2t=20 matrices, each with a random distribution of the Base-64 letters. Each matrices will have 64*6=384 bits, and the full key will have 20*384=7680 bits.

Cryptanalysis

GBC is constructed with zero algorithmic complexity. Computation is comprised of look-up tables, and value exchange, nothing more. Security is built via the size of the randomness used. It can be of such (secret) size that any desired length of plaintext will be encrypted with mathematical secrecy. A the same time, the GBC framework may be operated without mathematical secrecy but rather hinged on intractability.

Alas, unlike all mainstay block cipher, the GBC does not rely on unproven unbreakability of computational complexity, but rather on durable, reliable probability and combinatorics calculation. As long as the alphabet matrices are randomly filled, the likelihood of comprising the cipher is well computed and is well managed.

Intractability is managed by (i) the size of randomness used (the size of the alphabet matrices); by (ii) introducing any number of randomized plaintexts, and by (iii) changing the randomness in the alphabet matrices by applying transposition every so often.

Applications

By virtue of being a generic block cipher capable of emulating any other block cipher, the GBC merits consideration for any situation where a complexity based block cipher is used since the GBC is immunized against a surprise mathematical shortcut. And since its operation is very easy on computational power, the GBC should be used especially in cases where power is scarce.

Owing to its special structure of tying together several plaintext stream, the GBC can be applied for situations where several readers are allowed to read at different levels of secrecy within a given document.

Document Management Cryptography

Document Management Cryptography

Version Management, Archival, and Need-to-Know Efficiency

Abstract: Project management implies a maze of documents that easily get out of hand, hamper efficiency, snap tight nerves, and is altogether agonizing. Solution: a single set of project documents, where each document is inclusive of all relevant information: basic (visible to all), restricted (visible to middle and upper management), and sensitive (visible to upper management only). The documents are sent, received and stored in one way (encrypted). Each echelon decrypts each document with its own key so that the decrypted version exposes only what that reader is meant to see. Similarly each echelon adds, writes to each document such that higher echelons can read it, all all lower echelons will read only if marked for their attention. No restriction on number of echelons. This order allows for today's maze of project documents to function as intended, while managed with a fraction of the effort because no matter how many echelons are involved, there is only one single document to send, receive, store, and retrieve. Instead of document variety, we offer key-variety. Document Management Cryptography simplifies the drudgery of document management, makes the work environment more pleasing, and much more profitable.

Introduction: To understand what DMC is about, let's describe a generic project management environment comprised of a project manager, an executive team, middle management, and staff (There may be more echelons, but the three are enough for our purpose). As the project evolves it is expressed through a growing number of documents. The project documents include: 1. public domain project data (public), 2. widely shared non-public project data (staff), 3. management restricted data (management), 4. executive grade sensitive data (executive). Usually the basic parameters of the project may be announced and become "public". Work plans, schedules, quantitative computation is data worked out the staff ("staff" data); Considerations, risk analysis, expectations, cost figures, HR data is developed by middle management, ("management"), and above that there are financing data, risk sharing, high level business scenarios that are the purview of the top echelon ("executive"). Data exposure is clear upward, and opaque downward. It is therefore that document management is dividing documents according to their data contents. This implies separation. Executive data is written into 'executive-only' documents, management data is written to management and executive only documents, and staff data is written into non-public documents. It is a management burden to keep these categories apart. There are many reported situations where confidentiality was inadvertently breached when an executive holding documents of executive level mixed with management level, and further mixed with staff level and public domain levels. One document slips to the wrong category, "spills the beans", often without a trace.

Apart from mistakenly crossing categories, there arises the challenge of "version management". Let document $D_1$ be a staff document, containing data $S_1$. Let document $D_2$ be a management document, containing $S_1$ and management data $M_1$. At a later point in time $S_1$ is updated (new version). The project management team now has to insure that the update $S_1$ to $S'_1$ will be carried out in $D_1$ and in $D_2$. And possibly in $D_3$—the executive document containing $S_1$. Since there are several documents that contain the same staff data $S_1$, it is a burden to insure a uniform update.

So why not separate the data so that each project document will contain only data contained in that category? This is not practical because the data tends to be intertwined. For example cost data of various elements of the project may be marked and identified over a description of these elements. The cost data may be 'management level' and the 'elements' description may be staff level.

Not only is version and exposure management a daunting challenge while the project is ongoing, it remains so when the project is concluded, but the data must be retained for any future accounting, tax auditing, and general good management practice. One has to insure that the data sensitivity considerations are honored indefinitely after the project has concluded.

This headache and burden of sorting out documents according to their data exposure requirement is growing exponentially with the size of the project. There are more documents because there are more parts, there are more versions because the project lasts longer, and there are more echelons of management and supervision because of the increased complexity.

It is this very issue of version and exposure management of project data that is addressed by the Document Management Cryptography.

The Concept

The underlying idea of DMC is to handle one document only. One document to be shared by all, one document to send, to receive, to store by all levels, and echelons, and even by the public.

On its face this principle will violate the requirement for data exposure management.

It certainly looks that way, but it is not. In fact, the generated, transmitted and stored document has zero exposure per se. Not the public, not the staff, not management, and not even the executive echelon will be able to read it. The reason: it is encrypted!

And each echelon is given a reading key with which the encrypted document is decrypted to show in plain language only the data proper for that echelon.

Imagine the project manager writing the initial project plan. It contains some basic parameters to be exposed to the public (P), some project details needed by the staff, some restricted data aimed at the middle management (M), and then some sensitive data to be read by the executive team (E).

As the document leaves the project manager's desk, it is encrypted. And the cryptogram is spread out to everyone involved. When the press gets a hold of that project document they can read only the P portion. When a member of the staff comes around she uses her staff key, and the encrypted document is decrypted for her, showing only the public data and the staff data (P+S). A middle manager will approach the very same document and see in it the public portion, the staff data, and the management data (P+S+M). And every executive will use his executive key and read in the very same document the public portion, the staff data, the management information, and the executive material.

When each document reader concludes the reading, the decrypted version dissolves, and disappears, and only the encrypted version is kept, ready to be re-invoked at any time, maintaining the data exposure regimen every time it is used.

And what if a staff member is taking the document generated by an executive, and wishes to add, elaborate, modify? He would do so in plain language, of course, modifying only the parts that he can see (what does not decrypt is not visible to the reader), and save it with a different name before distributing the modified document to its proper distribution list. The revised document will be seen with the revisions and modifications by all staffers, all managers and all executives. The managers and the executives will see the changes side by side with the restricted and sensitive data that the staffer did not see.

All in all, the normal project development is taken place and every document is maintained once and interpreted differently as if the system were to handle a multitude of documents to honor data exposure requirements.

For example, a staffer may send a manager a document that the manager misplaced. The manager, using his management key will be able to read in that document the management only stuff that the staffer was blind toward.

The DMC simply relocates the data exposure discrimination to a new device called a "reading key" which allows the system to deal manage, transmit and store one and only version.

Operation: The nominal operation of the DMC may be divided to categories:
  Writing & Reading DMC documents
  Storage & Retrieval Management Writing and Retrieving DMC Documents There are three categories of writers: executives, managers, and staffers. Executive writing: Executive Aron is writing project document (d) comprised of information at staff level, (s), information for managers, (m) and material for fellow executives (e). Document (d) is encrypted using DMC and its encrypted version (d') is produced. (d') is routed to all project people—same document. The copy that is being accessed by execute Bill is decrypted with Bill's executive reading key that opens up the full document (d) for Bill's attention. The copy of (d') that is accessed by manager Charlie is decrypted with the manager's key, and exposed before Charlie the (d) document without the executive information in it. Respectively Staffer David reads the same copy with his staffer's key, and what he sees is only the (s) data—designed for his attention.

Manager Alice writes document (d). Nominally Alice is expected to only write to her level (managers) and below (staffers). As above the encrypted document (d') is read for its m and s information by all managers and executes, while staffers see only the s-information.

As a matter of policy a company might encourage all project people to report to higher echelon anything they deem important and that does not get properly addressed at their level. Using DMC a staffer would be able to address management or the executive level, and the same for managers towards executives. This is a mechanism to 'whistle blow' and otherwise communicate discreetly with higher ups. One should notice that if a staffer writes for an executive she herself would not be able to read back what she wrote because she does not have the executive key.

It's clear from this operation that a writer will be expected to designate with respect to anything he writes, what is the level of project exposure associated with that writing.

Storage and Retrieval Management

Project documents will all be stored in their encrypted form, and a key management system will have to be setup to allow each to read at his or her level, when retrieving an old document. Over time old documents might be relaxed as to their restrictions, and eventually everyone will be given the executive key to read sufficiently old papers.
Cryptography
The Document Management Cryptography may be accomplished in various schemes. We present two:
  The exponential method
  The rubber method
Multiplicative DMC generates an encrypted document of size $2^t|p|$ where $|p|$ is the size of the unencrypted file, the plaintext, p, and t is the number of echelons served by the DMC. The price paid for the benefits of the DMC is a considerably larger file for both transmission and storage.

The rubber method is based on U.S. Pat. No. 6,823,068. The encrypted file is somewhat larger than $|p|$, but is requires more preparation for each document.

The DMC exponential method is based on alphabet A comprised of $a=u*v$ letters, (u,v positive integers). All the letters of the alphabet are listed in a random order in $u*v$ matrix: u rows and v columns. This is called the base matrix: M1.

Matrix M1 associated with two matrices: M1u and M1v, each of size $u*v$. M1u is placed next to M1 and M1v is placed above or below M1. M1u is called the horizontal key of matrix M1, and M1v is called the vertical key of M1. M1 together with its horizontal and its vertical keys (three matrices altogether) are called the "M1 key set", and M1 is its base.

Mu (the horizontal key of M1) may be regarded as a base for its own key set. Its horizontal key would be regarded as Muu, and its vertical key would be regarded as M1uv (M1uu and M1uv are both $u*v$ matrices).

Mv (the horizontal key of M1) may be regarded as the base for its own key set. Its horizontal key would be regarded as M1vu, and its vertical key would be regarded as M1vv (M1vu, and M1vv are both $u*v$ matrices).

The nomenclature continues with the same order, accordingly one could properly interpret matrices designated as M1vuuvv, and M1uuvvuuuv, . . . etc.

We now describe The DMC Exponential of the First Order:

Any letter $m_{ij}$ in the A alphabet appears in matrix M1 in row i and column j When $m_{ij}$ appears in the plaintext, it is replaced by two letters: the first letter is a random selection from row i in matrix M1u, and the second is a random selection from column j in matrix M1v.

As described the M1 key set will enable encryption of any plaintext of any length written in the A alphabet. The size of the so generated ciphertext is twice the size of the plaintext, because any letter of the plaintext was replaced with two ciphertext letters.

Because of the random selections a given plaintext p will be encrypted to n different cipher texts $c_1, c_2, \ldots c_n$ if encrypted n times. And the longer the plaintext the lower the odds that any two of the n ciphertexts will be identical, even for high n values.

Decryption proceeds symmetrically. The intended reader will read in the ciphertext two letters at a time. Find which row in Mu the first letter is written --i, and which column the second letter in the ciphertext is written in matrix Mv --j, and then retrieve $m_{ij}$ in M as the corresponding plaintext letter.

By construction it is clear that all the $c_1, c_2, \ldots c_n$ ciphertexts will decrypt to the same generating plaintext p.

The M key set is the key to execute the DMC Exponential method of the 1st order.

We will now describe the DMC Exponential method of the 2nd order:

We consider two plaintexts $p_1$ and $p_2$ of the same length: $|p_1|=|p_2|$. We shall encrypt $p_1$ letter by letter as described above (in the DMC Exponential of the 1st order), with one important change. Instead of selecting random letters from M1u and M1v respectively, we will select letters as guided by another $u*v$ matrix, M2. As follows:

Let a be the first letter in $p_1$ and let b be the first letter in $p_2$. let a be in position (i,j) in M1 (row i and column j). To encrypt a we need to select a letter from row i in M1u, and a letter from column j in M1v.

Let row i in M1u be:

$g_1, g_2, \ldots g_v$

And let column j in M1v be:

$h_1, h_2, \ldots h_u$

Let b (the first letter in $p_2$) be found in location (i',j') in M2. Accordingly instead of a random selection from the set: $g_1, g_2, \ldots g_v$, we shall select $g_j'$, and instead of a random selection from the set: $h_1, h_2, \ldots h_u$, we shall select $h_i'$.

A recipient of the ciphertext, who is not aware of M2 will decrypt the pair: $g_j'$-$h_i'$ as a (based on his knowledge of the M1 key set). However, an intended recipient who is aware of M2 will interpret the same set ($g_j'$-$h_i'$) as the encryption of the letter a from $p_1$, but in parallel she will interpret the same pair as the encryption of b from $p_2$.

It will work similarly for the subsequent letters in $p_1$ and $p_2$. The same ciphertext c will be interpreted as $p_1$ by the holder of M1, M1u, and M1v, and will be interpreted also as the letters comprising $p_2$.

We say then that the DMC of the 2nd degree is a setup that encrypts two plaintexts $p_1$ and $p_2$ in parallel such that one key holder decrypts the ciphertext c back to $p_1$, and the other encrypts the same to $p_1$ and to $p_2$.

Using the 2nd degree, the randomness used to pick coordinates markers for the plaintext letter, is being replaced with a chosen pair such that this choice reflect the identity of the in-parallel plaintext letter that is encrypted with this procedure.

The idea of replacing a letter with two so called marker letters that define this letter through its coordinates in a letter matrix, may be extended indefinitely and build a set up where any number n of in-parallel plaintexts are encrypted through the same cryptogram. This can enable the discrimination between readers who know all the involved matrices and can therefore decrypt the combined ciphertext to all the n plaintexts $p_1, p_2, \ldots p_n$, and between other readers who don't have possession of all the keys, and assume that the selected ciphertext letters were picked randomly.

Let's Examine now the DMC Exponential of the 3rd degree:

We recall that in the 2nd degree a letter was picked (c2) from matrix M1v such that its column indication identifies the column address of letter p in M1, and its row address identifies row address of p' in M2. Operating at the 3rd degree one does not identify c2 outright but rather relate to two adjacent matrices: M1vv and M1vu such that c2 may be identified via any element in M1vv in column j, and via any element in M1vu on row i'. Any random selection will do. Albeit, we assume the existence of a third plaintext, p3, and wish to encrypt in parallel the next letter from it. That would be letter p". p" is marked in M3 in coordinates (i",j"). We will now identify i" by choosing a letter c3 from column j in M1vv because c3 will be at row i". And we also pick letter c4 from M1vu such that its column is is j" and its row is i'.

The respective ciphertext sequence will be c1-c3-c4, where c3-c4 is identifying p" and c2, and c1-c2 is identifying p' and p.

Only a writer who is aware of all the involved matrices can accomplish this feat where three plaintext sequences p1, p2 and p3 are encrypted in tandem to a single ciphertext sequence c1-c3-c4. As it is evident the number of matrices used rises exponentially and hence the name An intended reader of all the encrypted messages will be aware of all the matrices and decrypt the ciphertext sequence backwards. From the identity of c3 and c4, the reader will identify p" in M2. From the same element the reader will identify c2 in M1v, and from the identity of c2 and c1 the reader will identify p' and p, and thereby read the corresponding letters of all the three plaintexts.

An intended reader who is supposed to read only p1 and p2, and not p3, will not be aware of M2, and interpret c3 and c4 only as some random choices to identify c2. That reader will also identify c1, and from c1 and c2 the reader will identify p and p' (and not p"), and read p1 and p2.

DMC Exponential Illustration

Let alphabet A be comprised of 8 letters: 0,1,2,3,4,5,6,7 (000,001,010,011,100,101,110,111). Clearly this alphabet will handle all binary strings. We set A in a u*v=2*4=8 randomly organized table:

$$M1 = \begin{matrix} 4 & 7 & 1 & 0 \\ 5 & 3 & 2 & 6 \end{matrix}$$

We write, M1h:

$$M1u = \begin{matrix} 5 & 4 & 3 & 6 \\ 7 & 1 & 2 & 4 \end{matrix}$$

We write, M1v:

$$M1v = \begin{matrix} 1 & 6 & 5 & 2 \\ 3 & 7 & 0 & 4 \end{matrix}$$

Which is all we need to exercise DMC in the first degree. We then add M2 matrix to exercise DMC in a 2nd degree, and matrix M3 to exercise DMC in the 3rd degree. The following pages illustrate that practice.

Key implementation parameters are:
1. Alphabet choice
2. level management
3. Security Enhancement Alphabet Choice The illustration herein is shown with a very limited alphabet of 8 letters. As mentioned this alphabet and the illustration are sufficiently robust to encrypt any size plaintext. If practiced via 1 levels, then using 31 matrices, then the practice involves a key space K of size |K|:

$|K|=(8!)^{31}$

For only two levels this amount to a whopping $|K|=4.3*10^{27}$ And in general for an alphabet A comprised of a=u*v letters, the key space will be:

$|K|=((u*v)!)^{31}$

It is not necessary to use DMC with $2^n$ letters n bits long each. However it adds some simplicity and generality to the system. A base-64: 8*8 setup seems inviting. Each matrix comes with a key space of $64!=1.27*10^{89}$.

The larger the matrices, the greater the intractability of the cipher—exponentially. Albeit the encryption decryption effort is proportional to the size the matrices, by the nature of the encryption and decryption process. It is therefore that one can choose to increase the matrix size, pay a proportional increase in nominal processing, and gain an exponential benefit in intractability. And since the encryption/decryption processes are the same regardless of the size of the matrix, one can code the encryption and decryption to be usable with any size matrix decided by the user of the cipher (who may not be a cryptographer neither a programmer). It implies that the project manager will be able to choose different strength (size) keys for different project depending on the sensitivity of the project.

The size of the matrices may be of such size that for messages of sufficiently small size the DMC cipher will offer Shannon secrecy. This can be readily figured out since for small enough messages, given a random ciphertext, one could match it with a proper size random plaintext, by filling in the rubrics in the large matrices. Namely, it is possible under such conditions to match any ciphertext with any plaintext—a property directly linked to Shannon secrecy.

The DMC Exponential may be implemented with as many levels as desired. Let there be an implementation of l levels. To increase the level to l+1, it would be necessary to add the level l+1 substitution matrix Ml+1, and two coordinating matrices M . . . v and M . . . u.

In other words, we may add 3 alphabet matrices for each level. So the total cryptographic key for l level DMC is 3l. It may be noted that as a bare minimum it is necessary to keep secret M1, M2, . . . Ml while the other (the coordinating) matrices may be put in the clear.

One may practice dec implementation in which DMC is practiced at level l, but appears to be practiced at a higher level l'>l. This practice confounds the cryptanalyst, and allows for smooth upgrade from l to l'.

In a decoy implementation one selects randomly the letters from the coordinating rows and columns (as in DMC of the first degree), and hence only M1 is needed. There is no need here for M2, M3, Ml.

Illustration: with respect to the 3rd degree illustration above: one only encrypts p=1 2 3 4. p1=1, which may be identified via M1u and M1v as: [5 4 3 6][5 0]. A random choice reduced the options to (4,0). The letter 0 in M1v is expressed via M1vv and M1vu as: [3 4 7 1][1 0], which again is reduced to a random choice of (1 1). We have thus encrypted p1=1 to c1=(4,1,1). It appears as a three level DMC implementation, but it is a decoy because there are no M2 and M3 involved, only M1.

To decrypt c1=(4,1,1) to p1=1 one would first regard the (1,1) letters. According to M1vu and M1vv (1,1) points to letter 0 in M1v, so (4,1,1) is reduced to (4,0). The combination (4,0) in M1u and M1v unequivocally points to p1=1.

When DMC is practiced with a group where different members have different level keys, then a low level key holder may practice a decoy procedure with respect to the levels above his grade. A cryptanalyst will have no means to identify such encryption is decoy, but group members who are aware of the higher level keys will readily realize that decoy is being practiced because they can't read any plaintext of a higher level (above the writer's level), since it would look as random (because decoy is practiced through random selection).

Reduced Level Implementation It is readily possible to implement DMC over a single plaintext stream. Let a plaintext P be comprised of letters p1, p2, . . . . One could artificially define the sequence: p1, pl+1, P2l+1 as plaintext stream P1, and p2, pl+2, . . . as plaintext P2, etc. and then encrypt l letters in parallel. Similarly the levels can be reduce from l to any desired level.

Security Enhancement
The security offered by this cipher may be enhanced via:
key replacement
linking with a randomizer cipher
Dummy levels Key Replacement:
If the key is switched and changed often enough, then the data used with a particular key might not be enough for a conclusive cryptanalysis. On the other hand it is so much more convenient to run a particular project with the same key from start to finish.

One powerful way to change keys is to use a 'complete transposition cipher': all matrices are permutations of each other. And hence, all or some of them can be transposed to another matrices every so often. The "so often" may be based on time, on rounds of use, etc.

One may note an anomaly, the higher levels are more vulnerable to cryptanalysis than the lower levels, so it may be the higher levels that may need to consider transposition.
Linking with a Randomizer Cipher
Cryptanalysis of DMC is based on the low entropy of the plaintext. For example: a raw brute force cryptanalysis where one tries one matrices configuration after the other, and used the ciphertext on each, then all configurations that result in a plaintext that does not read as a proper plain message is discarded. One would then precede the DMC cipher with any 'randomizer cipher' (e.g. DES) that genera a random looking ciphertext. It would be that ciphertext that would be fed as input to the DMC. Cryptanalysis of the DMC will not be possible as before, but will have to be linked with brute force analysis of the randomizer cipher. It would be the combined strength of the randomizer cipher and the DMC cipher that will determine the cryptanalytic barrier.

This security enhancement will work also work with each level independently. It is possible for example to pre-encrypt the level 3 message, and not the levels below. The key for level 3 need not be shared with other levels.

Dummy Levels: Every level of the DMC may be operating on a purely random basis. Let p1, p2, . . . pl be the l plaintexts feeding into a DMC. While each of these plaintexts may be a meaningful message, it may also be a random sequence. The way the DMC operates, each level may choose on its own to be "randomized" and meaningless, and that decision will not affect the other levels. So the whole DMC set up may be churning out meaningless messages, or perhaps only one, two or any subset of the l levels may encrypt a meaningful message. The cryptanalyst will be in the dark about this decision. It is therefore a very powerful means to enhance security. In particular one could erect a DMC for sale l=5 levels, and use only two levels meaningfully: level 1 and 3, and the rest will be randomized. At any point, stealthily some previously randomized levels will be taken up for service of a meaningful message.
Cryptanalysis
The DMC Exponential by its nature is not based on algorithmic complexity and rather on the quantity of randomness in its key. Therefore there is no concern for some smart mathematical cryptanalysis offering an algorithmic shortcut. Cryptanalysis will proceed on the basis of the expected low entropy of the plaintext, and on the mounting constraints we more and more data is used via a fixed key. Such cryptanalysis may be appraised on combinatorics grounds.
Advantage over Common Practice
The idea of separating project data according to sensitivity and 'need to know' is old and in common practice. In particular one could simulate the operation of the DMC by having data at various security levels encrypted via a key known only to members of this level or of higher levels. And so achieve the same functional capability touted by DMC.

Such separate encryption scheme will artificially and tenuously tie the information from different levels to each other. Any level will be able to "fly solo", advance to higher revision levels, irrespective of the other levels. This cannot happen in DMC. When the per level cryptography is separated from the other levels, it is necessary to manage a complicated key regimen so each level will have the updated keys for the levels below. The DMC regimen implies non-repudiation. While higher levels will be able to hide their content from lower levels, they could not deny that content, should there by a subsequent inquiry.

Also, the DMC may operate formally with l levels, but actually with 0<r<l levels only, while the other l–r levels are 'dummy', operate without a guiding matrix but rather through random selection of letters. And the user can readily, temporarily, add another level or more (increase the value of r), and those changes are unknown to the cryptanalyst. It creates a great measure of security to the DMC user.

Since the highest level is of the lowest security, it may be desirable to use one or more 'dummy' levels above the actually used highest level.

Theory: The DMC may be reduced to a nominal cipher that generates an n-letters ciphertext from n-letters plaintext. As reviewed elsewhere a DMC operating with l levels may view a plaintext stream P comprised of letters p1, p2, . . . as a merged stream of l independent streams P1, P2, Pl, as follows:

$P1: p1, pl+1, p2l+1 \ldots$ $P2: p2, pl+2, p2l+2 \ldots$ $Pl: pl, p2l, p3l \ldots$ In this interpretation the DMC may be regarded as a universal cipher because every plaintext stream of size n bits which encrypts by some other cipher to a ciphertext of n bits may also be encrypted to the same ciphertext, by creating a matrix with elements of size n letters. or by finding integers l, u v such that:

$n=l*2u*v$ and define a DMC with l levels, comprised of 2u over 2v size matrix where the elements will be all the strings of size u*v bits. Such a DMC by construction will encrypt every n bits long plaintext to the same n bits long ciphertext that the emulated cipher encrypts to.

Accordingly, any block cipher in particular may be associated with an equivalent DMC. For example 128 bits block size AES may be constructed via a 4 levels DMC with matrices the size of 16×16 bits comprised of 4 bits long elements. The DMC version of this instance of AES will be free of the AES concern for a mathematical shortcut, (at a price of a longer key), and will also compete well performance wise the AES computation.

Drone Targeted Cryptography

Swarms of Tiny Surveyors Fly, Stick, Hide Everywhere, Securely Communicating Via Solar Powered New Paradigm Cryptography.

Abstract: As flying, camera-bearing drones get smaller and lighter, they increasingly choke on the common ciphers as they interpret their commands, and send back their footage. New paradigm cryptography allows for minimum power, adjustable randomness security to step in, and enable this emerging technology to spy, follow, track, and detect. E.g.: to find survivors in a collapsed structure. We describe here a cryptographic premise where intensive computation is avoided, and security is achieved via non-complex processing of at-will size keys. The proposed approach is to increase the role of randomness, and to build ciphers that can handle any size key without choking on computation. Orthodox cryptography seeks to create a thorough mix between key bits and message bits, resulting in heavy-duty computation. Let's explore simple, fast ciphers that allow their user to adjust the security of the ciphertext by determining how much randomness to use. We present "Walk in the Park" cipher where the "walk" may be described through the series of visited spots (the plaintext), or, equivalently through a list of the traversed walkways (ciphertext). The "walking park" being the key, determines security by its size. Yet, the length of the "walk" is determined by the size of the plaintext, not the size of the "park". We describe a use scenario for the proposed cipher: a drone taking videos of variable sensitivity and hence variable required security—handled by the size of the "park".

Keywords—low-power encryption, randomness, Trans-Vernam Cipher, User-Controlled Security.

Introduction: Flying drones are inherently invasive; they see what was previously hidden. There are many laudable applications for such invasive devices, e.g. search and rescue operations, catching fugitives, the war on terror, etc. Yet, very often drones violate someone's privacy, or even endanger national security, and hence the visual vista exposed by them should be treated with proper sensitivity, namely encryption. Alas, as drones become smaller, power becomes an issue, and modern ciphers which churn and mix key bits and message bits tend to require too much power to function. This challenge is addressed herein.

We extend the introduction to discuss (i) the application environment, and (ii) the principles of the proposed solutions.

Application Environment: Flying drones can network, communicate, and coordinate movements and activities in support of a surveillance goal. They need to be securely controlled, securely coordinated, and securely deliver their collected data to their customer. This implies fast, effective cryptography. Alas, the drones are mini or micro size, lightweight, and short on power, so most of the mainstay ciphers will not be practical for them. Some attributes are discussed:

Speed: High speed, high-resolution cameras fitted on flying drones may be required to transmit to an operational center, to serve an important rescue operation, or other proper assignment. Similarly, an isolated device somewhere may be activated with a large stream of commands, most of them should be further transferred to devices down the line, exploiting directional microwave communication. All in all, a swarm of drones may need to accommodate high volume, high speed information exchange. The existing popular ciphers slow down that flow rate, and are not friendly to this requirement.

Maintenance: Quite a few flying drones will be placed in hard to access locations, and no physical maintenance will be feasible. They might use a solar power source and function indefintely. Hence the use of any specific cipher, which at any moment may be mathematically breached, is a risky practice. This applies to all algorithmic complexity ciphers. As Prof. Nigel Smith articulates in his book "Cryptography (an Introduction)": "At some point in the future we should expect our system to become broken, either through an improvement in computing power or an algorithmic breakthrough." Normally, cryptography gravitates towards very few ciphers considered 'secure'. If one of them is suddenly breached (e.g. GSM communication cipher), then all the "out of reach" nodes which rely on it, have lost their security, and physical attention is not practical.

Magnetic Vulnerability: Many flying drones are placed in very harsh environment, and are subject to lightening violence, as well as man made electromagnetic impacts. Software based cipher may be at greater risk.

In summary, flying drones in particular and IOT nodes in general are vulnerable both to malicious attack, and to environmental punishment. These vulnerabilities may be remedied to a large extent if we come up with a new cryptographic approach: Cryptography of Things (CoT).

Principles of the Proposed Solution: Modern cryptography erects security around data using two parameters: (i) algorithmic complexity, and (ii) randomness. It's generally believed that the more complex an algorithm the more secure the ciphertext, and also the more randomness that is being used (the larger the key), the more secure the ciphertext. Randomness is in a way dull, and of no much interest mathematically (except of course with respect to its definition and to metrics of quality). By contrast, algorithmic complexity is an exciting math dilemma. Academic cryptographers are attracted to this challenge and develop new and newer complex algorithms. Unfortunately in today's state of affairs, we only manage to compare complexities one to the other, not to ascertain their level in an objective mathematical way. And even if it turns out that P≠NP as most complexity researchers believe, in cryptography complexity is used in combination with randomness, hence one is using a random key selected from a large key space. What is hard to know is how many specific keys when applied with specific plaintexts, offer some mathematical vulnerability, leading to effective extraction of the message. In other words, the de facto complexity, or security of algorithms cannot be ascertained. Worried about this, we come up with increasingly complex algorithms, which require more and more computational effort. They in turn require more and more power—which many IOT nodes simply don't have.

Randomness, on the other hand, is passive memory, and even the smallest and most unsophisticated devices can be fitted with gigabytes of memory, serving as key. These realities lead one to aim to develop cryptography where the role of reliable, passive, manageable, secure randomness is enhanced, while the role of doubtful complex algorithms that are power hogs, is decreased.

This thinking brings to mind the famous Vernam cipher: the algorithm could not have been simpler, and the key could easily be as large as hundreds of gigabytes. So what? Memory is both cheap and light. It may be stored without requiring power. Too bad that Vernam is so impractical to use. Yet, can we re-analyze Vernam as a source of inspiration for security through more randomness and less algorithmic complexity?

Let's envision a Vernam Inspired Cipher (VIC) where at any stage the user can 'throw in a few more key bits' and by that achieve a large increase of cryptanalytic burden, together with a modest increase of nominal processing burden (encryption, and decryption). Let us further demand from the VIC the Vernam property of achieving mathematical secrecy at the minimum key size required by Shannon's proof of perfect secrecy.

To better analyze this vision let's regard any cryptographic key, k, as the natural number represented by binary interpretation of its bit sequence. Accordingly, the Vernam key space associated with n-bits long messages, will be: $1, 2, \ldots (2^n-1)$ corresponding to $\{00 \ldots 0\}_n$ to $\{11 \ldots 1\}_n$. We may further agree that any natural number $N=K>2^n-1$ will be hashed to an n-bits size string. Once we agree on the hashing procedure we have managed to recast Vernam cipher as a cipher that accepts any positive integer as a key, with which to encrypt any message m comprised of n bits to a corresponding ciphertext. We regard this as natural number key representation (NNKR).

We can similarly recast any cipher according to NNKR. We consider a cipher for which the series $n_1, n_2, \ldots n_{max}$ represents the allowable bit counts for the keys. E.g for DES the series has one member $n_1=n_{max}=56$; for AES the series contains three members: $n_1=128$, $n_2=192$, $n_3=n_{max}256$. For a cipher where the key is a prime number then the series is the series of primes. For ciphers defined over every bit string of length $n_{max}$ all the natural numbers from 0 to $2^n-1$ qualify as a $n_{max}$ key. Larger keys will be hashed to a $n_{max}$ bits long hash. For ciphers where the series $n_1, n_2, \ldots n_{max}$ represents discrete possible keys, we may agree to hash any natural number to highest member of the list $n_1, n_2, \ldots$ which is lower than that natural number. For all natural numbers smaller than $n_1$, we will "hash" them to the null key ($|K|=0$), and we may formally agree that the case of K=NULL is the case of no encryption (the ciphertext is simply the plaintext). With the above definition we have recast all ciphers as accepting every natural number as a key.

We define the concept of "normal cipher" i as a cipher for which any valid metric of security, $s_i$, is never lower for larger keys. Say, for two positive integers $K_1$ and $K_2$ used as keys, and where $K_1<K_2$, we may write: $s_i(K_1) \le s_i(K_2)$ In other words, with normal ciphers we "buy" security, and "pay" for it with a choice of a random number. Let $s_i(K)$ be the security achieved by a user of cipher i, "investing" key K. The metric s, will reflect the average computational effort required of the cryptanalyst for extracting the message m from a captured ciphertext c, computed over the distribution of m∈M, where M is the message space from which m is selected. Let $p_i(K)$ be the average combined processing effort (encryption plus decryption) required of a user of cipher i, while using key, K, over the distribution of message m∈M.

For any cipher i, using a natural number K as key, we may define the utility of the cipher at this point as the ratio between the cryptanalytic effort and the nominal processing effort:

$$U_i(K)=s_i(K)/p_i(K) \qquad (1)$$

We can now define a Vernam Inspired Cipher as one where over some range of natural numbers K ($K_1 \ldots K_2$) as key, the utility of the cipher will be somewhat stable:

$$U_1, U_{k1+1}, \ldots U_{k2} \sim U \qquad (2)$$

In that case a user encrypting with $K_1$ will be able to increase the security he builds around the data, while still using the same cipher, by simply ratcheting up the key from $K_1$ to $K_2$. She will then—again, using the same cipher—increase its associated security from $s(K_1)$ to the higher value of $s(K_2)$ $$s(k_2) = s(k_1) + \Sigma(U(k+1) * p(k+1) - \qquad (3)$$
$$U(k) * p(k))_{\text{for } k=k_1 \text{ to } k=k_2}$$
$$= s(k_1) + (U(k_2) * p(k_2) - U(k_1) * p(k_1))$$

which is reduced to:

$$s(k_2)=s(k_1)+U^*(p(k_2)-p(k_1)) \qquad (4)$$

Recasting cryptographic keys as natural numbers leads to redefinition of the key space, #K, as a subset of the natural numbers from 1 (or formally from zero) to the highest natural number to be considered as a key, #K=$K_{max}$:

$$\#K \le k_{max} \qquad (5)$$

And hence, for messages comprised of n bits, a key max of value $2^n$ ($K_{max}=2^n$) will allow for a cipher where the user could simply ratchet up the integer value used as key, $K'<2^n$, to the point of achieving mathematical security. We can define a special case of a Vernam Inspired Cipher, as a Trans Vernam Cipher (TVC), being a cipher where increase in the integer value used as key will eventually reach "Vernam Security Levels", or say, Shannon's security, for n-bits long messages:

$$s_{max}=s(K_{max}=2^n)=s(K')+U(K_{max})*p(K_{max})-U(K')*p(K') \quad (6)$$

Existence: It's readily clear that DES, AES and their like will not qualify as Vernam Inspired Ciphers. For DES:

$$s(k<2^{56})=0$$

$$s(k>2^{56})=s(k=2^{56}) \quad (7)$$

For AES:

$$s(k<2^{128})=0$$

$$s(2^{128} \le k<2^{192})=s(k=2^{128})$$

$$s(2^{192} \le k<2^{256})=s(k=2^{192})$$

$$s(k>2^{256})=s(k=2^{256}) \quad (8)$$

The background 'philosophy' to casting key spaces onto the the natural numbers is discussed in reference: [Samid 2001, and Samid 2016 (b).]

"Walk-in-the-Park" Cipher

We present here a Trans-Vernam Cipher (TVC), that runs by the name Walk-in-the-Park because both encryption and decryption is taking place by "walking"—charting a path determined by the message, and then describing it through various entities in the "park" where the walk happens. It is based on the idea that a 'walk' can be described either via the places visited, or via the roads taken from one visited place to another. One needs the "park" (the key) to convert one description to the other.

The cipher is defined as follows:
We employ a four-letter alphabet: X, Y, Z, and W, expressed via 01,10,11,00 respectively. The key is a table (or matrix) of size u*2v bits, which houses some arrangement of the four alphabet letters (u*v letters in total). We regard every letter as a node of a graph, and regard any two horizontally or vertically contiguous letters as connected with an edge. So every letter marked on the graph has between 2 to 4 edges connecting it to other letters on the graph. (4 edges for middle nodes, 3 edges for boundary nodes, and 2 edges for corner nodes).

We define a path on the graph as a sequence of marked letters such that any two contiguous letters on the path are connected via an edge.

Informally, the cipher works by mapping the plaintext into a sequence of X,Y,Z, and W; then using this sequence to mark a pathway on the graph. Given an agreed upon starting point, it is possible to describe the very same graph via denoting the edges traversed by the pathway. Each node, or vertex on the graph has up to four edges; let's mark them Up, Down, Right, Left: U,D,R,L, and assign the bit combinations 01,10,00,11 respectively to them. The translation of the pathway from a sequence of vertices to a sequence of edges amounts to encrypting the plaintext to the ciphertext. And respectively for the reverse (decryption).

Why is this a Trans Vernam Cipher? Because the graph may be large or small. The larger it is the more security it provides. It may be so large that it will be a Vernam equivalent, and it may be so small that brute force will extract it relatively easily. The processing effort is not affected by the size of the graph, only by the length of the pathway, which is the size of the encrypted message. By analogy given a fixed walking speed, it takes the same time to walk, say, 10 miles on a straight stretch of a road, or zigzagging in a small backyard.

Detailed Procedure:

1. Alphabet Conversion: Map a list of symbols to a three letters alphabet: X, Y, Z. By mapping every symbol to a string of 5 letters from the {X,Y,Z} alphabet. It is possible to map $3^5=243$ distinct symbols (a few less than the ASCII list of 256 symbols).

2. Message conversion: let $m=m_0$ be the message to be encrypted, written in the symbols listed in the 243 symbols list (essentially the ASCII list). Using the alphabet conversion in (1) map $m_0$ to $m_3$—a sequence of the 3 letters alphabet: X, Y, Z.

3. DeRepeat the Message: enter the letter W between every letter repletion in $m_3$, and so convert it to $m_4$. $m_4$ is a no-repeat sequence of the letters {X,Y,Z,W}. Add the letter W as the starting letter.

4. Construct a key: construct a u*v matrix with the letters {X,Y,Z,W} as its elements. The matrix will include at least one element for each of the four letters. The letters marking will abide by the 'any sequence condition' defined as follows: Let $i \ne j$ represent two different letters of the four {X,Y,Z,W}. At any given state let one of the u*v elements of the matrix be "in focus". Focus can be shifted by moving one element horizontally (right or left), or one element vertically (up or down)—reminiscent of the Turing Machine. Such a focus shift from element to an adjacent element is called "a step". The 'any sequence condition' mandates that for any element of the matrix marked by letter i, it will be possible to shift the focus from it to another element marked by the letter j, by taking steps that pass only through elements marked by the letter i. The 'any sequence condition' applies to any element of the matrix, for any pair of letters (i,j).

5. Select a starting point: Mark any matrix element designated as "W" as the starting point (focus element).

6. Build a pathway on the matrix reflecting the message ($m_4$): Use the {X,Y,Z,W} sequence defined by the $m_4$ version of the message, to mark a pathway (a succession of focus elements) through the matrix. The "any sequence condition" guarantees that whatever the sequence of $m_4$, it would be possible to mark a pathway, if one allows for as much expansion as necessary, when an 'expansion' is defined as repeating a letter any number of times.

7. Encrypt the pathway: Describe the identified pathway as a sequence of edges, starting from the starting point. This will be listed as a sequence of up, down, right, left {U,D,R,L} to be referred to as the ciphertext, c. The so generated ciphertext (expressed as 2 bits per edge) is released through an insecure channel to the intended recipient. That recipient is assumed to have in her possession the following: (i) the alphabet conversion tables, (ii) the matrix, (iii) the identity of the starting point, and (iv) the ciphertext c. The intended recipient will carry out the following actions:

8. Reconstruct the Pathway: Beginning with the starting element, one would use the sequence of edges identified in the ciphertext, as a guide to chart the pathway that the writer identified on the same matrix.

9. Convert the pathway to a sequence of vertices: Once the pathway is marked, it is to be read as a sequence of vertices (the matrix elements identified by the letters {X,Y,Z,W}), resulting in an expanded version of the message, $m_{4exp}$. The expansion is expressed through any number of repetitions of the same letter in the sequence.

10. Reduce the Expanded Message (to $m_4$): replace any repetition of any letter in $m_{4exp}$ with a single same letter: $m_{4exp} \rightarrow m_4$ 11. Reduce $m_4$ to $m_3$: eliminate all the W letters from $m_4$.

12. Convert $m_3$ to $m_0$: use the alphabet conversion table to convert $m_3$ to the original message $m_0$.

Illustration: Let the message to be encrypted be: $m=m_0=$"love". Let the alphabet conversion table indicate the following:

l—XYZ
o—ZYX
v—XYZ
e—ZYY

Accordingly we map $m_0$ to $m_3$=XYZ ZYX XYZ ZYY.
We now convert $m_3$ to $m_4$=WXYZWZYXWXYZWZYWY.
We build a matrix that satisfies the 'any sequence condition':

$$\begin{matrix} 1 & 2 & 3 \\ 4 & 5 & 6 \\ 7 & 8 & 9 \end{matrix} = \begin{matrix} X & X & Y \\ X & W & Y \\ Z & Z & Z \end{matrix}$$

Using $m_4$ as a guide we mark a pathway on the matrix:
Pathway=5,2,3,6,9,6,5,8,9,6,3,2,5,2,3,6,9,8,5,8,9,6,5,6
The pathway may be read out through the traversed edges, regarded as the ciphertext, c:
c=URDDULDRUULDULDDLUDLULR.
In order to decrypt c, its recipient will have to use the matrix (the graph, the key, or say, "the walking park"), and interpret the sequence of edges in c to the visited vertices:
Pathway=5,2,3,6,9,6,5,8,9,6,3,2,5,2,3,6,9,8,5,8,9,6,5,6.
This is the same pathway marked by the ciphertext writer. Once it is marked on the matrix it can be read as a sequence of the visited vertices:
$m_{4exp}$=WXYYZYWZZZYYXWXYYZZWZZYWY.
Which is reduced $m_{4exp} \rightarrow m_4$: WXYZWZYXWXYZWZYWY; Which, in turn, is reduced to the three letters alphabet: $m_4 \rightarrow m_3$=XYZ ZYX XYZ ZYY, which is converted to m="love"

Walk-in-the-Park as a TVC: There are various procedures, which would translate the matrix (the key) into a natural number and vice versa. Here is a very simple one. Let k be a square matrix (key) as described above, comprised of $u^2$ letters. Each letter is marked with two bits, so one can list the matrix row by row and construct a bit sequence comprised of $2u^2$ bits. That sequence corresponds to a non-negative integer, k. k will be unambiguously interpreted as the matrix that generated it. To transform a generic positive integer to a matrix, one would do the following: let N be any positive integer. Find u such that $2(u-1)^2 < N \leq 2u^2$. Write N in binary and pad with zeros to the left such that the total number of bits is $2u^2$. Map the $2u^2$ bits onto a $u^2$ matrix, comprised of 2 bits elements, which can readily be interpreted as $u^2$ letters {X,Y,Z,W}. If the resultant matrix complies with the 'any sequence' condition, this matrix is the one corresponding to N. If not, then increment the $2u^2$ bit long string, and check again. Keep incrementing and checking until a compliant matrix is found, this is the corresponding matrix (key) to N. A more convenient way to map an arbitrary integer to a "Park" is as follows: let N an arbitrary positive integer written as bit string of $N_b$ bits. Find two integers $u \leq v$ such that:

$$18uv \geq N_b > 18u(v-1)$$

Pad N with leftmost zeros so that N is expressed via a bit string of 18uv bits. Map these 18uv bits into a rectangular matrix of (3u)*(6v) bits. This matrix may be viewed as a tile of uv "park units"(or "unit parks"), where each unit is comprised of 18=3*6 bits, or say 3×3=9 letters: {X,Y,Z,W}.

There are 384 distinct arrangements of park units, when the bits are interpreted as letters from the {X,Y,Z,W} alphabet, and each unit is compliant with the 'any sequence condition'. This can be calculated as follows: We mark a "park unit" with numbers 0-8:

$$\begin{matrix} 4 & 3 & 2 \\ 5 & 0 & 1 \\ 6 & 7 & 8 \end{matrix}$$

Let mark position 0 as W, positions 1,2,3 as X, positions 4,5 as Y, and positions 6,7,8 as Z. This configuration will be compliant with the 'any sequence condition'. We may rotate the markings on all letter place holders: 1-8, 8 times. We can also mark, 1 as X, 2,3,4 as Y, and 5,6,7,8 as Z and write another distinct 'any sequence compliant' configuration. This configuration we can rotate 4 times and remain compliant. Finally we may mark 1 as X, 2,3,4,4 as Y, and 6,7,8 as Z, and rotate this configuration also 4 times. This computes to 8+4+4=16 distinct configuration. Any such configuration stands for the 4! permutations of the four letters, which results in the quoted number 384=16*4! We can mark these 384 distinct configurations of "park units" from 0 to 383. We then evaluate the 'unit park integer' ($N_p$) as the numeric value defined by stretching the 18 bits of the unit-park into a string. We then compute $x=N_p$ mode 384, and choose configuration x (among the 384 distinct unit-park configurations), and write this configuration into this park unit. Since every 'park unit' is 'any sequence compliant' the entire matrix of (3u)*(6v) {X,Y,Z,W} letters is also 'any sequence' compliant. The resultant matrix of 18uv letters will challenge the cryptanalyst with a key space of: $384^{uv}$ keys. Alas, the cryptanalyst is not aware of u and v, which are part of the key secret. This special subset of 'any sequence compliant' matrices is a factor of 683 smaller than the number of all matrices (compliant and non-compliant): $683 = 2^{18}/384$ It is clear by construction that Walk-in-the-Park is a TVC: the key (the map) gets larger with larger integer keys, and for some given natural number $k_{Vernam}$ a message m will result in a pathway free of any revisiting of any vertex. The resultant ciphertext can then be decrypted to any message of choice simply by constructing a matrix with the traversed vertices fitting that message.

Cryptanalysis: A 9-letters key as in the illustration above will be sufficient to encrypt any size of message m, simply because it is 'any sequence compliant'. A large m will simply zigzag many times within this single "park unit". A cryptanalyst who is aware of the size of the key will readily apply a successful brute force cryptanalysis (there are only 384 'any sequence' compliant configuration of a 3×3 key, as is computed ahead). Clearly, the larger the size of the key the more daunting the cryptanalysis. Even if the pathway revisits just one vertex twice, the resultant cipher is not offering mathematical security, but for a sufficiently large map (key) the pathway may be drawn without revisitation of same vertices—exhibiting Vernam, (or say, perfect) secrecy.

Proof: let c be the captured ciphertext, comprised of |c| letters {U.D.R.L}. c marks a pathway on the matrix without re-visiting any vertex, and hence, for every message m∈M (where M is the message space) such that $|c| \geq |m|$, we may write:

$$Pr[M=m|C=c]=0.25^{|c|}$$

That is because every visited vertex may be any of the four letters {X,Y,Z,W}. Namely the probability of any message m to be the one used depends only on the size of the ciphertext, not on its content, so we may write: $Pr[M=m|C=c]=Pr[M=m]$, which fits the Shannon definition of perfect secrecy. Clearly, if the path undergoes even one vertex re-visitation, then it implies a constraint on the identity of the revisited vertex, and some possible messages are excluded. And the more re-visitation, the more constraints, until all the equivocation is washed away, entropy collapses, and only computational intractability remains as a cryptanalytic obstacle.

This "Walk in the Park" cipher, by construction, is likely using only parts of the key (the graph) to encrypt any given message, m. When a key K is used for t messages: $m_1, m_2, \ldots m_t$, then we designate the used parts as $K_t$, and designate the unused parts as $K_{-t}$. For all values of $t=0,1,2,\ldots$ we have $K_t + K_{-t} = K$. And for $t \rightarrow \infty$ Lim $K_{-t}=0$. By using a procedure called "tiling" it is possible to remove from the t known ciphertexts: $c_1, c_2, c_t$, any clue as to the magnitude of $K_{-t}$. Tiling is a procedure whereby the key matrix is spread to planar infinity by placing copies of the matrix one next to each other. Thereby the ciphertext, expressed as a sequence of U,D,R,L will appear stretched and without repetition, regardless of how small the matrix is. The cryptanalyst will not be able to distinguish from the shape of the ciphertext whether the pathway is drawn on a tiled graph or on a truly large matrix. Mathematically tiling is handled via modular arithmetic: any address (x,y) on a tiled matrix is interpreted as x mod u, and y mod v over the u*v matrix. This tiling confusion may be exploited by a proper procedure for determining the starting point of the pathway. Determining the Starting Point of the Pathway: In the simplest implementation, the starting point is fixed (must be a W element by construction of the pathway), for all messages. Alas, this quickly deteriorates the equivocation of the elements near the starting point. Alternatively the next starting point may be embedded in the previous encrypted message. Another alternative is to simply expose the starting point, and identify it alongside the ciphertext. This will allow the user to choose a random W element each time. As long as t<<uv the deterioration in security will be negligible. A modification of the above, amounts to setting the address of the next starting point in the vicinity of the end point of the previous message. This will result in a configuration where consecutive pathways mark a more or less stretched out combined pathway. A cryptanalyst will be confounded as to whether this stretched combined pathway is marked on a large matrix, or on a tiled matrix.

And hence, regardless of how many messages were encrypted using the very same key, the cryptanalyst will face residual equivocation, and be denied the conclusive result as to the identity of the encrypted message.

Persistent Equivocation: A mistaken re-use of a Vernam key, totally destroys the full mathematical equivocation offered by a carefully encrypted message. Indeed, Vernam demands a fresh supply of random bits for each message used. By contrast, the "Walk in the Park" cipher exhibits residual equivocation despite re-use of the same key. Let us assume that the cryptanalyst knows the size of the key (3u*3v letters), let us further assume that the cryptanalyst also knows that the 'any sequence condition' was achieved by using the "park unit" strategy. In that case the key space will be of size: $384^{uv}$. Let us also assume that the cryptanalyst knows the starting points for t encrypted messages. If by charting the t pathways, no re-visitation occurrence is found, then the cryptanalyst faces mathematical security. If there are h vertices which are visited by the t pathways at least twice, then even if we assume that the park units for all those h vertices suddenly become known, then the key space is reduced to $384^{uv-h}$ which deteriorates very slowly with h.

This cipher targets drone as a primary application, but clearly it extends its utility way beyond. In the present state the "Walk in the Park" cipher is an evolution of the ciphers described in reference [Samid 2002, Samid 2004]

Usage Scenarios

We describe here a use case that is taken from a project under evaluation. It relates to swarms of tiny drones equipped with a versatile video camera. Each drone is extremely light, it has a small battery, and a solar cell. It is designed to land on flat or slanted objects like roofs. The camera streams to its operators a live video of the viewable vista. The drone requires encryption for interpretation of commands, communicating with other drones, and for transmitting videos. The high-powered multi mega pixel camera may be taping non sensitive areas like public roads; it may stream medium sensitive areas, like private back yards, and it may also stream down highly sensitive areas, like industrial and military zones. The micro drone may be dropped in the vicinity of operation, with no plans of retrieval. It should operate indefinitely.

Using Walk-in-the-Park the drone will be equipped with three keys (matrices, graphs): 1. a small hardware key comprised of square flash memory of 500×500 {X,Y,Z,W} letters. This will amount to a key comprised of 500,000 bits. 2. A flash memory holding 1000×1000 {X,Y,Z,W} letters, comprising 2,000,000 bits. 3. A flash memory holding 7500×7500 {X,Y,Z,W} letters comprising 112,500,000 bits. The latter key should provide perfect secrecy for about 6 gigabytes of data.

The determination of the security sensitivity of the photographed area (and the corresponding security level used) may be determined onboard the drone, or communicated from the reception center based on the transmitted pictures. To achieve maximum speed the "Walk in the Park" cipher is written with "Turing Machine" simplicity: minimum number of operational registers, minimum operational memory; for every state (particular focus element in the matrix), the firmware reads the identity of the neighbors of the focus to decide where to shift the focus to, and output the direction of the shift as the next ciphertext letter. Decryption is symmetrically in the opposite direction.

Summary Notes

We presented here a philosophy and a practice for Drone Cryptography, or more broadly: "Cryptography of Things" (CoT) geared towards Internet of Things applications. The CoT is mindful of processing parsimony, maintenance issues, and security versatility. The basic idea is to shift the burden of security away from power-hungry complex algorithms to variable levels of randomness matching the security needs per transmission. This paper presents the notion of Trans-Vernam Ciphers, and one may expect a wave of ciphers compliant with the TVC paradigm. It's expected that the IoT will become an indispensable entity in our collective well being, and at the same time that it should attract the same level of malice and harmful activity experienced by the Internet of People, and so, despite its enumerated limitations, the IoT will require new horizons of robust encryption to remain a positive factor in modern civil life.

B3

The BitMint Bundle Buy ($B^3$) Disruption

Consumer Leverage in the Age of Digitized Dollars

Two critical attributes of digitized dollars may be leveraged into a new consumer paradigm whereby today's retail profits will be shared by consumers and enablers. Money in a digitized format has no allocation ambiguity—a digitized dollar at any time point, exact as it may be, is under the control of its present owner. Money drawn on check may float, may default—digital money is always clearly assigned. The second critical feature of digitized money is that it may be tethered to any logical constraint, so that its control is determined by an unambiguous logical expression. These two features open an opportunity for a disruptive consumer-oriented initiative, exploiting online shopping.

At any given point of time countless of consumer products are being explored for prospective purchase by millions of online shoppers. Let P be such a prospective purchase. P is an item that is coveted by a large number of people, and identical specimen of it are being sold by many competent competing retailers. P may be a particular brand and size of flat screen TV, it may be a best-seller book, a popular video, an ordinary toaster, a trendy suitcase, etc. For starters lets exclude items that are not perfectly identical like flowers, meals, pets, airline tickets etc. Such standard items that qualify as P are being shopped for by say n=n(t) people at any given time, t. The n shoppers check out some r retail shops. Many shoppers inquire only with one retailer and purchase P, if the price seems right. Some shoppers compare two retailers, and fewer compare three. This "laziness" on the part of the shoppers motivates retailers to offer P at a price higher than their competitors, mindful that they may lose a few super diligent shoppers who meticulously compare all the r retailers.

Now, let's imagine that the n shoppers who at a given moment are all shopping for the same P are members of some union, or some organized group. And hence they are all aware of the fact that there are n of them, all shopping for the same product. Surely they would organize, elect themselves a leader and announce to the r retailers that they represent a market of n items of the P variety. The leader, armed with the market power of his group will pitch the r retailers into a cut throat competition. Let's add now an important assumption: each of the r retailers has n P items in stock, so each retailer can satisfy the entire group represented by that leader. The larger the value of n, the greater the stake for the retailers. The more robust the current profit from the P merchandise, the deeper the discount to be offered by the competing retailers. The leader accentuates the odds by saying that the entire order will go to the winning bidder. This means that for each retailer the difference between winning and losing is very meaningful, which in turn means that all retailers are desperate to win the bid.

It is clear that the organized shoppers enjoy a big discount on account of them being organized. Now back to the surfing n online shoppers who are not organized, and are not mutually aware. These shoppers are the target of this $B^3$ concept:

$B^3$ is an enterprise whose website is inviting shoppers for P to browse. When they do they see a list of the r retailers and their prices. For sake of illustration let the r retailers offer consumer product P at a price range $105-$115. Each browser will be pointed out to the cheaper retailer. But she will also find a proposal: "Let us buy P for you for a price of $95, substantially cheaper than the cheapest retail price. We will buy this from one of these reputable retailers and they would contact you with respect to shipping. Since all P products are identical, the browser will have no rational grounds to refuse the offer (assuming that $B^3$ has established its reputation). Doing the same with all n shoppers the $B^3$ website will amass a bidding response sum of B=$95*n dollars. Armed with the bidding money, $B, $B^3$ will challenge the r retailers to compete. Let the most competitive retailer bid for $90 per item. $B^3$ will accept the bid, immediately pay the winning retailer $90n, and the winning retailer will soon contact the shoppers about shipping cost and other administrative matters. The difference between the price paid by the shopper, and the price paid by $B^3$ to the retailer is the $B^3$ profit: $(95-90)n. When done, the shoppers will have enjoyed a great discount, $B^3$ will become nicely profitable. Indeed, the previous profit margins enjoyed by the retailers are now shared with the consumer and $B^3$.

Now where does digital money come in? There are two modes of implementation of this $B^3$ ad hoc grouping idea: (i) $B^3$ secures a commitment from the shoppers to pay the agreed upon sum of $95 in the event that $B^3$ finds a seller, and (ii) $B^3$ collects the $95 from the shopper, expecting to find a seller later. Both modes are problematic. In the first mode, there will be a percentage of regrets. Some consumers will change their mind so $B^3$ will not have the money to pay the winning seller who agreed on a price per a definite quantity. In the second mode, in the event that no deal is consummated, then all the shoppers will have to be reimbursed and someone will have to carry the chargeback cost.

These issues disappear with digitized money ($). The shopper will tether a digital coin in the amount of $95. The tethered coin will remain in the possession of the shopper, only that for a window of time, say 3 hours, 6 hours, 24, or alike, $B^3$ will have the right to use this money (pay with it). If this right was exercised the owner loses the coin, (and gets the merchandise), if not, then without any further action, no chargeback, the digital coin remains as it was before, in the possession of its owner. When $B^3$ initiates the competition among the r retailers, then each retailer knows that if its bid is the winning bid, then the money will be instantly transmitted to that retailer—the money is ready, available, and in digitized form so that the retailer may either keep it digital, or redeem it to the old accounting mode at a cost of 0.5% which is far less than the prevailing payment card fees.

Much as a car dealer will not offer a rock bottom price to a casual browser, only to a serious shopper ready to buy, so this $B^3$ idea will not fly except with the tantalizing feature of ready money, paid on the spot to the winning retailer.

One Item Illustration: Alice shops for a pair of sneakers, and finds them in Amazon for $95; she finds the same at Target for $91. But she buys not in either store, in turn she submits a query for these sneakers to $B^3$. $B^3$ fast computers quickly queries a large number of retailers for the price and availability for the same product, then the $B^3$ smart algorithm offers to Alice to pay it $83, and in a few hours she either gets a confirmation of shipment from some reputable retailer, or the money automatically returns to her wallet. $B^3$ quotes $83 because its algorithms predict that it could bundle the sneakers in a large list of items, and the return bid will be so low that it would amount to $B^3$ paying for the sneakers only $79, which will leave $B^3$ with a $4.00 revenue from which to pay for its operation, and make a profit.

Bundle Illustration: (please refer to the table below). Let's illustrate the $B^3$ dynamics as follows: 10 shoppers are online at the same time, each buying another widget (w1, w2, ... w10). Each, checks one, or two of the primary three retailers who offer those widgets (Retailers: R1, R2, and R3). The actual prices for the 10 widgets by the three retailers are shown in the illustration table. A diligent shopper will check all three retailers and order (the same widget) from the best offer. But most shoppers will check one, may be two retailers, and rush to buy.

Now we imagine a world where $B^3$ operates, and the 10 shoppers check, each their widget, with $B^3$ website. The $B^3$ algorithm, for each widget, quickly checks all the relevant retailers (in our illustration there are three R1, R2, R3), and based on their pricing at the moment, the $B^3$ algorithm projects the discount price associated with the lowest bid of these retailers. So, for example for the first widget (w1) the prices offered by the retailers are: $40, $41, $39. $B^3$ will estimate that the lowest bid will be associated with discount price for w1 of $37. Then $B^3$ computes the price to quote to the first shopper. In our example the quoted price is 5% higher than the estimated bidding price: $38.85. The shopper is assured by $B^3$ that the quote is lower than the best price available online right now, and then $B^3$ offers the shopper the following deal: "You pay me my quoted price $38.85, and you are most likely to get an email from one the three retailers (R1, R2, or R3) notifying you that one count of widget w1 is being shipped to you." The shopper is happy, she got a better price!

$B^3$ will bundle all the 10 widgets to which similar offers have been extended, and accepted, and rush a request for bid to all three retailers (R1, R2, and R3). Retailer one computes his retails prices for the 10 widget and it comes to $332.00. The retailer will quickly evaluate its inventory situation with respect to all the widgets, and other factors, and decide how great discount to offer for each widget. Only that the per-widget discount is not forwarded to $B^3$. The only number that is sent back is the bidding figure, which is $292.16 (see table), which is 12% summary discount for all the widgets put together.

$B^3$ at its end, will summarize all the money it got from the 10 shoppers which according to the illustration table is $305.55, and use this figure as its threshold for acceptance. Should the best bid come higher than that figure of $305.55, then no bid will be accepted because the threshold sum is the money actually collected by $B^3$—there is no more. If that sum is lower than the best bid, then $B^3$ has ill modeled the pricing.

In the case in the illustration table, R3 offers the lowest bid: $285.12, and $B^3$ instantly accept the bid, sends the BitMint digital coins to R3, and pockets the difference between what $B^3$ collected from the shoppers, and what retailer R3 is bidding for: $324.00-$285.12=$20.43. This operating income now funds the $B^3$ operation and generates the $B^3$ profit. See table below:

Viability Analysis: On its face, the $B^3$ concept will be robbing powerful large online retailers from the bulk of their profit margins. One should expect then a serious concerted backlash. However, since $B^3$ can be headquartered anywhere in cyberspace, it is hard to see a successful legal challenge to it.

Only in its full maturity will $B^3$ be recognized as the disruptive development that it is, but by then it is likely to be too late for any efforts to stop it. $B^3$ will start over limited items, say only a bestseller book, or a popular brand watch, etc. The overall impact will be minimal, the volume of the deal unimpressive. But through these small steps $B^3$ will gradually become a shopping fixture, get shoppers hooked, and swell.

There is no reason to limit the competition between the retailers to one consumer product, "P". $B^3$ will assemble shopping requests to many qualified consumer products, and package them all into a single "auction" (or any other form of competition).

The $B^3$ concept may be implemented in a rich variety, giving a large space for improvement and optimization. Obviously, the larger the shopping bid, the greater the discount to be offered by the retailers, because more is at stake, and the impact of winning or losing is greater. Also clear is that the greater the variety of products bundled together by $B^3$, the greater the discount and the greater the profit of $B^3$ because different retailers will have different incentives to get rid of cumulative inventory, and offer it at a lower price. In normal shopping situations retailers will be reluctant to offer too low a price for items, no matter the financial incentive, because it would annoy customers. But in the $B^3$ format there is no disclosure of how low a price is offered per item—only the sum total is communicated by the retailer to $B^3$.

Retailers will be queried before the price competition on their inventories. Different retailers will report different stock for different items. $B^3$ will then define a package that represents the minimum combination such that all qualified retailers can each fulfill the entire order, to make it equal opportunity for the retailers. Of course, a retailer who consistently reports low inventories will be excluded from the competition. Same for retailers that when they win they become tardy, or difficult with the shoppers to which they need to ship the merchandise.

In the beginning $B^3$ will work with large nationally recognized online retailers, but over time smaller retailers will apply to participate. $B^3$ will encourage such participation—the more that compete, the greater the discount. Some

| | | | B3 Bundle Illustration | | | |
|---|---|---|---|---|---|---|
| Buyer | widget | R1 | R2 | R3 | B3 Bid Estimate | B3 Offer |
| 1 | w1 | $ 40.00 | $ 41.00 | $ 39.00 | $37.00 | $ 38.85 |
| 2 | w2 | $ 23.00 | $ 23.00 | $ 22.00 | $20.00 | $ 21.00 |
| 3 | w3 | $ 8.00 | $ 9.00 | $ 9.00 | $7.00 | $ 7.35 |
| 4 | w4 | $ 55.00 | $ 54.00 | $ 52.00 | $47.00 | $ 49.35 |
| 5 | w5 | $ 34.00 | $ 33.00 | $ 36.00 | $31.00 | $ 32.55 |
| 6 | w6 | $ 73.00 | $ 71.00 | $ 70.00 | $66.00 | $ 69.30 |
| 7 | w7 | $ 11.00 | $ 12.00 | $ 10.00 | $8.00 | $ 8.40 |
| 8 | w8 | $ 40.00 | $ 40.00 | $ 40.00 | $35.00 | $ 36.75 |
| 9 | w9 | $ 14.00 | $ 14.00 | $ 13.00 | $11.00 | $ 11.55 |
| 10 | w10 | $ 34.00 | $ 36.00 | $ 33.00 | $29.00 | $ 30.45 |
| | Retail Price | $332.00 | $333.00 | $324.00 | 291 | $305.55 |
| | Bid (−12%) | $292.16 | $293.04 | $285.12 | | |
| | B3 Income: | | | | | $ 20.43 | specialty retailers might wish to join, and $B^3$ will respond by tailoring packages for their capacity.

$B^3$ will operate sophisticated computers, compiling all available relevant data to offer bolder and bolder prices for the browsing shoppers, so as to increase the $B^3$ popularity and profits. The greater the discounts the more popular $B^3$ will become: more retailers will opt in, and more shoppers will be tempted to use it.

The price competition may be in a form of an open auction, or reverse auction, one may say: what is auctioned off, is not any product or article, it is rather the opportunity to receive a purchase order for the supply a bundle of merchandise each to its designated shopper. The retailer who promises to fulfill this purchase order at the lowest price is the winner (among the pre-qualified retailers). It may turn out that a closed, secret price competition is more advantageous, experience will tell.

The psychological lure for a retailer is the fact that once a retailer's bid is accepted, the money is instantly passed on en bulk because $B^3$ has the money ready for payment. The winning retailer will also receive the list of shoppers and their contact info, so that it can contact its customers. $B^3$ paid for the listed shoppers, but these shoppers are the customers of the winning retailer. The retailer and its customer discuss shipping arrangements, warranties, etc.

Return policy The case of merchandise return will have to be negotiated among the retailer, $B^3$, and the customer. In principle it has some complications, but since the percentage of return is minimal, this is not too much of a problem. Admittedly though, the 'return' issue may become a weak point for the $B^3$ solution, and one which the suffering retailers might exploit.

In its maturity $B^3$ will charge the shoppers from their digitized dollars wallet. But in the beginning the $B^3$ customer will pay $B^3$ via a credit card. $B^3$ will immediately transact with the digitized dollars mint, and buy the digital coin that is owned (tethered) to the individual customer of $B^3$, but that is spendable during the coming, say, 6 hours, by $B^3$. If the money is not spent by $B^3$ within that window of time, the money automatically becomes spendable and controlled by the original buyer of the digitized money.

Outlook: Today large national retailers compete mildly in a silent co-survivors balance. A cut-throat competition will rob all of them, winners included, of their present fat profit cushion. And therefore we find one item cheaper at Amazon and another cheaper at BestBuy. This situation also gives room for not so efficient retailers. A wide sweeping $B^3$ disruption will inject a much stronger competition that would weed out the sub-efficient retailers, and benefit the consumers.

The use of digitized dollars in this $B^3$ scheme will usher in the era of digitized payment digitized banking, and digitized saving and investment.

Cyber-Passport

Identity Theft Prevention & Recovery Legislation

Imagine that a government report finds that 7% of US passports in use today, are counterfeits. An emergency task force will be assembled, and charged to come up with a quick and resolute solution to this gross offense to civil order. Yet, every year more than 7% of US adult population becomes victims of identity theft. Many more than, say, people infected by asthma. Why then does Asthma attract a major government counter-action, and identity theft attracts a major campaign of warnings, alarms, and hand wringing? Because too many cyber security leaders believe that outsmarting the fraudsters is imminent. Our overconfidence destroys us. It's time for a grand admission: we are losing this war. The government needs to help the victims, and carb the growth of this plague. Both should address the fundamental fact: once a person's social security number, date of birth, place of birth, mother's maiden name, and biometrics are stolen, the victim is forever vulnerable because those personal parameters are immutable. Therefore the government should issue a limited life span personal id: cyber passport, and mandate that any contact with the government, like filing taxes, would require this cyber passport code. Same for opening accounts, or withdrawing money form bank accounts, etc. A cyber passport valid for a year, when compromised, (and the theft is not detected) will serve the thief on average only for six months. Beyond that having the victim's permanent data attributes will not suffice. Anyone that realizes that his or her cyber passport was stolen, could immediately request a replacement. The legislation will not mandate citizens to sign up, but will require institutions to verify cyber passport for any listed activity. The more victims, the greater the expected participation in the program. High risk individuals could be issued a new cyber passport every six months, others may be, every two or three years. The cyber passport will be issued based on physical presence of the person to whom it is issued, with robust biometric identification. Based on the cost of the aftermath, the front-end cost of issuing the cyber passport will be minimal Administered right, the cyber passport will void the benefit cyber frauds enjoy today from holding immutable attributes of their victims. To continue and abuse their victim, they will have to steal the fresh and valid cyber passport, and that would be harder than before.

The transmission, and storage of the newly issued cyber passports will be governed by legislation exploiting modern cryptography: (1) verification databases will hold a cryptographic image of the cyber passport (e.g. hash), so that thieves will not be able to produce the cyber passports even if they break into that database; (2) cyber passports per se will not be transmitted online. Instead, a cryptographic dialogue will accomplish the same goal, while denying an eavesdropper the chance to learn how to steal the user identity the next time around.

The Cyber Passport initiative is one for which only the government will do. It has to be nation-wide, although it can be administered by states honoring each other codes (like with driving licenses), and it must be accompanied by legislation that will enforce established security standards for data in storage and data on the move. The initiative will require an effective instant validation apparatus, much like the ones used by credit card companies to authorize payments.

Should we make progress in the war against identity theft, then the life span of those passports will be extended. What is most powerful is the ability of any citizen to request a new passport any time he or she even suspects a compromise. People will be ready to pay a modest fee to avoid the nightmare of identity theft.

The cyber passport initiative should first cover the increasing number of victims who find themselves abused time and again because their permanent personal data is in the hands of thieves. Victims who would be issued cyber passport will so inform their banks, their medical practitioners and others, who by law, will have then to request the cyber passport any time someone with that name attempts contact. The government will inform the IRS and other departments of the cyber passports, and no one with a passport will again face a situation where the IRS refunded someone else in his name. As the program works, it will gradually expand.

Should there by another "Target" or "Home Depot", then all affected customers will be issued a fresh cyber passport, and thus greatly limit the damage.

For many years automotive designers believed that soon cars will be better engineered, safer, and accidents will ebb. We are making some progress, but we do install seat belts and air-bags, admitting that deadly crashes do happen. Similarly here, let's admit that the 7% plus of Americans falling victims annually to cyber crime is worrisome, and is not going to be cured overnight, and hence let's invest in the means to cut short the life span of each fraud event.

The cyber passport may be short enough to be memorized. For instance: a three letters string combined with five digits: ABC-12345 will allow for a range of 1.7 billions codes. The letters and the digits should be totally randomized, although one is tempted to use the code to convey all sorts of information about the person. The codes should be issued against a physical presence of a government official and the identified person. Biometrics, pictures, and documents will be used to insure correct identification. Banks and state offices will be commissioned to issue these passports. People who are sick and can't come to a code issuing station, will be visited by government officials.

T-Proof Secure Communication (TSC)

A User-Determined Security for Online Communication Between Secret Sharing Parties Abstract: Promoting the idea that open-ended randomness is a valid counterpart to algorithmic complexity, we propose a cipher exercised over user-determined measure of randomness, and processed with such simple computation that the risk of a surprise compromising mathematical insight vanishes. Moreover, since the level of randomness is user-determined, so is the level of the practiced security. The implications are that responsibility for the security of the communication shifts to the user. Much as a speeding driver cannot point the finger at the car manufacturer, so the communication parties will not be able to lay any blame on the algorithm designer. The variable randomness protocols are much faster, and less energy consuming than their algorithmic counterparts. The proposed TSC is based on T-Proof, a protocol that establishes a secure shared fully randomized, non-algorithmic transposition key for any desired n-size permutation list. Since the users determine n, they also determine the size of the key space (n!), and the level of the exercised security. The T-Proof ultimate transposition protocol may also be leveraged to induce any level of terminal equivocation (up to Vernam-size) and diminish at will (and at price) the prospect of a successful cryptanalysis.

Introduction Transposition—arguably—is the most basic cryptographic primitive: it requires no separate table of alphabet, and its intractability is rising super exponentially. A list of n distinct data units may be transposed to n! permutations. So a block of say 500 bits divided to 10 bits at a time can be transposed up to $3.04*10^{64}$ permutations. If the transposition key is randomly selected then the cryptanalytic intractability is satisfactory. Assuming two parties agree to permutations based on u bits at time (in the above example u=10). The parties may also agree on the size of the block, b bits, which will determine the permutation list as comprised of n=b/u elements. Thereby they will determine the intractability (n!) of their communication. To accomplish this simple primitive all they need is to share a transposition key of the proper size. A transposition key, $K_t$ may be expressed as a 2×n size table that identifies that the element in position i (1≤i≤n) in the pre-transposition string will be found in position j (1≤j≤n) in the post-transposition string, applicable to all the n elements in the list.

If the parties wish to make the security ad-hoc, and determined per session, they will need to find a way to share a transposition key for arbitrary n. It is theoretically possible for the parties to share a sufficiently large number of transposition keys for various values of n, but this is certainly cumbersome, complicated, and is very inconvenient for refreshing the keys once established. Alternatively the required transposition key will be computed using some pseudo-random generator. But in this case the seed for the PRNG may be compromised and doom the cipher. That is the background over which the TSC is proposed. The idea is to use the T-Proof protocol [Samid 2016 (C)]. This protocol allows a prover to prove to a verifier that she holds a certain ID or shared secret, s, also known to the verifier. The T-Proof protocol has two essential parts: (i) dividing the secret (s) string to some n non-repeat substrings, and (ii) using a non-algorithmic randomization process to transpose the identified n substrings to a transposed s: $s_t$. Both the prover and the verifier, aware of s, will know how to divide s to the same n non-repeat substrings. The verifier will then readily ascertain that $s_t$ is a strict permutation of s based on these n substrings, and thereby verify that the prover indeed is in possession of the claimed shared secret s. When this T-Proof protocol is exercised the verifier well knows how s was transposed to $s_t$, and can readily build the transposition key $K_t$ that corresponds to that conversion: $s_t=T(s, K_t)$. We recall that that transposition key $K_t$ was gleaned from some physical source, like "white noise", and hence is not vulnerable to compromise. The T-Proof protocol may be used with a nonce, r that will mix with the secret s to generate a combined string q=mix(s,r). The division to substrings will take place over q instead of over s, and thereby the parties will foil any attempt to use the replay strategy to falsely claim possession of s. Accordingly, T-Proof can be mutually applied, each party chooses a different nonce to challenge the other. Having exercised this T-Proof protocol the parties are convinced about the other party identity and about sharing the secret s. They can now proceed with symmetric communication. It would be based on the shared knowledge of the transposition key, $K_t$, that was passed from one to the other as they exercised the T-Proof protocol. A stranger unaware of s, will not be in possession of $K_t$. Yet $K_t$ was derived from a physical source, not an algorithmic source, and here lies the power of this cipher method. The parties will be able to use Kt for any further communication. Either directly as we shall describe ahead, or within some more involved procedure, as they pre agree, or even agree in the open per session because the security of the method is based on the fact that $K_t$ is drawn from a physical source, the chance for any key to be selected is 1/n! for n-items permutations, and $K_t$ is shared only by the communicating parties. The parties may now agree in the open on the per session unit size, u bits per substring (letter), and then compute the per session block size to be b=un bits. They will be able to communicate with each other with these blocks applying $K_t$ for each block. These choices of the number of transposed elements, and the size of the transposed element, may be made per-session, responsive to the sensitivity of the contents. Also the size of the shared secret (s) is a users' choice, which must be made earlier than when the parties are ready to communicate. The security of the cipher relates directly, and predictably to these user choices, which implies a shift of the responsibility for the uncompromised communication to the communicating parties. One might argue that other ciphers, say RSA, also exhibit a measure of security directly related to the size of the security parameters (for RSA the user may determine the size of the selected primes). However, RSA like the other ciphers which are based on algorithmic complexity, does not have the same solid probabilistic assessment of cryptanalytic intractability, and what is more, the nominal encryption and decryption effort is rising exponentially with the size of the security parameters. With TSC the relationship of operational effort to the size of the security parameters is by and large strictly proportional. That is the essence of TSC. Its attraction is based on (i) the non-algorithmic randomness of the transposition key, and on (ii) the user determined security level—by choosing the size of transposition list.

The Basic Protocol Alice and Bob share a secret s. They contact each other online, and mutually apply the T-Proof protocol on each other to assure themselves that they talk to the right party. The two applications of the T-Proof procedure resulted in having two shared transposition keys ($K_{ta}$, $K_{tb}$). They may choose one, or choose the two such that each of them will communicate to the other using one of the two transposition keys. Alternatively they may combine these two keys to a single transposition key, $K_t$.

According to the T-Proof protocol $K_t$ is perfectly randomized, created through white noise or from other real-life random source. If n is too large or too small, the parties can agree on a different nonce, repeat the T-Proof procedure and do so as many times as necessary until they get a satisfactory value for n. They can also apply a simple procedure to reduce the number of permutation elements to the desired value (discussed ahead). Since n is larger for larger a pre-transposition T-Proof string (q), it is easy to gauge the value of the nonce (r) and the parameters of the mixing formula q=mix(s,r) to achieve the desired value of n. The next step: Alice and Bob agree on a 'letter size,' namely the bit size of a substring that will be interpreted as the letters in which a given block of data is written in. That size, u bits will then be used to compute the block size of their communication: b=un. Alice and Bob can now use $K_t$ to communicate any data flow between them taken one block of b-bits at a time. Illustration: Alice and Bob share a secret s=7855 (s=1111010101111). Alice sends Bob a nonce $r_a$=14. They both agree on a simple mix function q=mix(s,$r_a$) q=s-$r_a$=7841 or q=1111010100001. Alice and Bob both break up q to substrings using the incremental method where each letter is larger by one bit than the one before it (except the last one): 1, 11, 101, 0100, 001 Alice then uses a physical random number generator to generate a transposition key, $K_t$:

1 2 3 4 5

3 1 5 4 2

Accordingly, Alice transposes q to $q_t$=101, 1, 001, 0100, 11 and sends it to Bob: $q_t$=1011001010011. Bob aware of q and of how to break q to substrings will then examine $q_t$ that Alice sent him in order to verify that $q_t$ is indeed a permutation of q based on the known substrings. To do so Bob will first look for an image of the largest letter (substring) 0100. This letter fits only in one place on $q_t$=101100111 Then Bob will place one of the second largest letters: 101. $q_t$=100111 Bob then, very easily, fits all the remaining letters (substrings) on $q_t$, and by then he achieves two objectives: (i)

Bob convinces himself that the counter party who claims to be Alice, is indeed Alice, since she communicates in a way that only the holder of the secret s could communicate. And (ii) Bob now has the random transposition key, $K_t$ that Alice uses to transpose q to $q_t$.

Bob then wishes to securely pass to Alice his bank account number: 87631-97611-89121. Using $K_t$, Bob will communicate to Alice: 68137-69117-18129, which Alice, using the shared $K_t$ will readily decrypt. Alice and Bob could agree on, say, 3 bits letters, and hence the account will be written as: 876-319-761-189-121, and the encrypted version will look like: 761876121189319.

Or they use the binary representation: 1010110100111011000001101110010000111110111100-0111, with letters of size u=2. The account number will be comprised of 25 two-bits letters, and every group of five will be communicated after being transposed with $K_t$. The parties would agree on how to handle the case where some bits must be padded from one end or the other to fit into the designated groups. Alice and Bob can also agree that when Alice writes to Bob she uses the $K_t$ he used to prove his bona fide to her, and vice versa. Or, they can combine the two keys to one, applying one after the other, resulting in a third, combined key. And of course, the next time around, they will each prove their bona fide to each other again, use a different $K_t$ for the purpose, and apply the new $K_t$ to communicate regularly throughout that session. The small illustrative numbers are deceiving. Factorial values climb fast, and any practical transposition will pose a daunting challenge to the cryptanalyst.

Use Cases TSC may be used by any two parties sharing a secret; it may be used by central nodes husbanding a large number of subscribers, or registered users, and it may be used by Internet of Things (IoT) applications where one party at least operates with limited capacity (battery perhaps), and requires minimum computation. TSC can also be used by two strangers. They may establish a common secret using Diffie Hellman or equivalent, and then use TSC instead of a more common symmetric cipher. TSC may be engineered such that the user will determine the level of security used. The size of the transposed string, (q, $q_t$) is controlled by the size of the secret s, the size of the randomized nonce $r_b$, and the mix function. The size of q, and the nature of the formula to break q to n unique substrings—determines the transposition load, n. The user can also control the size of the transposed unit, u, and hence the size of the block b. In practice the user will be asked to decide on level of security, high, medium, low, and the software will pick the values listed above. The concept is the same—security is determined by the user, not by the cipher builder. Much as the speed in which a car is driven is determined by the driver, not by the car manufacturer.

For certain purpose it may be decided that the shared secret transposition key, $K_t$ should be used as an element in a more involved symmetric cipher. Group Communication: k parties sharing a secret s may available themselves to TSC to build secure group communication. The group will come together online, and cross verify each other's bona fide. This will generate k instances of a non-algorithmic transposition key: $K_{t1}, K_{t2}, \ldots K_{tk}$. The parties could simply agree on one of these transposition keys as their choice and start group communication on its basis.

Alternatively, the parties may boost the security of their protocol by combining some or all of these transposition keys. To do that the parties will have to insure that all these transposition keys operate on the same number of transposed elements, n. (which is easily done, as discussed above).

Since each of the k parties can evaluate all the k keys, they can also compute a combined key by applying successively these k keys: $K_t^g = K_{tk} * K_{t(k-1)} * \ldots K_{t1}$ and use $K_t^g$ for their session communication. Group Hierarchy: A group as above of k parties sharing a secret s may include a subgroup of k'<k members, who will share an additional secret s'. This subgroup could communicate by using a transposition key that results from combining the k-group key $K_t^g$ with the additional transposition key $K'_t^g$ that emerges from applying the TSC protocol over the subgroup. ($K'_t^g * K_t^g$). The k' member subgroup could have a k"<k' members sub-subgroup in it, sharing a secret s", exercising the TSC protocol and extracting a secret transposition key $K''_t^g$ which can be used separately or in combinations of the previous keys: $K''_t^g * K'_t^g * K_t^g$. This would result in hierarchical protection for the smaller "elite" subgroup. And it may have as many layers as desired. One might note that the operational burden will be the same because however many transposition keys are applied one after the other, the result is equivalent to a single key, and can be expressed in a table of two n members lists, as seen above. Hardware Applications: TSC processing suggests the possibility of extremely fast hardware implementation, which might be of special importance for industrial, and SCADA real-time control. Comparison with Diffie-Hellman: Commonly today two parties with a shared secret would execute the Diffie-Hellman (DH) protocol to keep their communication secure. Diffie Hellman, by its nature, is vulnerable to Man-in-the-Middle (MiM) attack. A MiM may simultaneously open two DH channels, one with Alice, the other with Bob, and pass the information through from one to the other, as the contents of that information convinces both Alice and Bob that they operate within a single protective DH channel, while in fact they operate under two channels, and all their messages are exposed to the MiM. Using TSC, Alice and Bob might as well be fooled by the MiM operating two channels, and the MiM will indeed be privy to all that passes between them, but that would not do the MiM any good since Alice and Bob pass all their messages encrypted with the per-session transposition key, which both of them computed based on their shared secret s, which the MiM is not aware of. And since the next session between Alice and Bob will use a different key, the MiM has no hope for a replay attack. Based on this persistent security of the TSC it would make sense to apply it for all communications between a user and a central agency (a bank, a merchant, a government office). The password will not be transmitted across, but function as the shared secret s, and become the basis of secure communication where the level of security is up to the users. The secret s could be combined from, say, three secrets (passwords): $s_1$, $s_2$, $s_3$, such that for mere access one requires only $s_1$, for more serious online actions, $s_1 + s_2$ will be needed, and for super critical actions $s_1 + s_2 + s_3$.

Advanced Protocols The salient feature of T-Proof is that a "key space size equivocation" lies between the pre- and post transposition images. That is, given one image, the corresponding image will be any of the n! possible candidates, where n is the count of transposed elements, and each candidate is associated with a contents-independent 1/n! probability. This state was defined by [Samid 2015 (B)] as a state of Ultimate Transposition. To the extent that the shared secret s that generates the protocol is highly randomized (as a good password should be), and of unknown size, then this ultimate transposition cipher resists brute force cryptanalysis (much as most symmetrical ciphers with a random plaintext).

[Samid 2015] discusses equivocation generating protocols that may be readily used with any ultimate transposition cipher (UTC), and all of them can be used with T-Proof.

We discuss two examples: Let a message M be comprised of 1 words: $m_1, m_2, \ldots m_l$. One may find h decoy words: $d_1, d_2, \ldots d_h$ and concatenate them in some order with M, using a separator letter, say, '*', between the concatenated parts. The result, $p = m_1, m_2, \ldots m_l, *, d_1, d_2, \ldots d_h$ is regarded as the plaintext, p.

p is being processed with T-Proof over the distinct words: transposing n=m+h+1 elements, generating some permutation c:

$$c = \ldots m_i, \ldots d_j, \ldots, *, m_u \ldots d_v$$

of the n elements. If the decoy letters were selected such that there are e permutations which amount to a plausible plaintext candidate, then because of the ultimate transposition property of the cipher it would be impossible for a cryptanalyst to decide which of the e candidates is the one that was actually encrypted to c. The only strategy available to the cryptanalyst will be to brute force analyze the underlying shared secret s. If the size of s is unknown the cryptanalyst will have to start from the smallest possible s size and keep climbing up. If the size of s is known, the cryptanalyst will have to check the entire s-space. For each possible s the cryptanalyst will have to check whether the encrypted T-Proof message, $q_t$ which was sent by Alice to Bob, and presumably captured by the cryptanalyst, is a proper permutation of the q computed from the assumed s. If it is then the combined q and $q_t$ (the pre-image and post image permutations of the transposed list), will identify the randomly chosen transposition key, $K_t$, and if applying $K_t$ to c results in a p-candidate that is a member of the e-plausible options then that p-candidate becomes a high probability candidate. If only one plausible p-candidate is netted by this brute force attack then the cryptanalyst cracked the system. But if two or more p-candidates are found in the exhaustive search, then the cryptanalyst cannot go any further because the transposition key was selected via real life measurement as opposed to via crackable algorithmic randomness.

In [Samid 2015] one finds a description of how to select the decoy words, automatically, or via human selection. The larger the decoy set and the smarter its choice, the larger the value of e, and the larger the chance that the cryptanalyst will be stopped by an unresolved equivocation.

Illustration. Let the message be: m="Alice loves Bob". The selected decoy words are: hates, Carla, David. The plaintext will be p="Alice loves Bob*hates Carla David". Using T-Proof the resulting ciphertext is: c="hates Bob David Carla*Alice loves". It is easy to write down e=24 p plausible candidates derived from c, and all of them are mathematically equivalent with the right message m. (e.g.: "Carla hates Alice*Bob Loves David")

Note: The T-Proof may be implemented with various methods to break the message q to distinct substrings. In some of these methods the number of substrings, n, is determined by the bit contents of q, so it cannot be determined ahead. Yet, in the procedure described above n has to be n=m+h+1. To accomplish that it is possible to agree on a q string of sufficient size such that the number of substrings of whatever method, t, will be equal or larger than n (t≥n). And then, starting with the largest letter (bit wise) to combine it with the smallest letters by size order so that the number of substrings will be reduced until it equals n. The other advance method will be to achieve mathematical secrecy. High-End Security The specter of ultimate transposition cipher leads to ciphers that operate as close as desired to perfect Shannon secrecy. We first describe briefly the procedure that leverages ultimate transposition: Let m be a message to be encrypted, expressed as an x-bits string. We shall define a corresponding m' string as follows $m'=m\oplus\{1\}^m$. We now concatenate the two strings: $p=m\|m'$. p is a 2x bits string where by construction it is comprised of x zero bits, and x one bits. Applying an ultimate transposition over p, one generates c, which is also a 2x bits string and where also there are x zeros and x ones. It is easy to see that c can be decrypted into some $p'\neq p$ where the first x bits of p (counting from left to right) are any desired sequence of x bits. In other words, given c, then all $2^x$ possible candidates for m are viable candidates, namely there is a transposition key, $K_t$ that decrypts c to any of the possible $2^x$ candidates for m. Illustration: let m=110010. We compute $m=m\oplus\{1\}^6=110010\oplus111111=001101$. We concentrate m and m': $p=m\|m'=110010001101$. p is a 12 bits long string with 6 zeros and 6 ones. We apply an ultimate transposition operation on p to generate c. Say c=011110110000. Since c has 6 ones and 6 zeros, it can be transposed back to a plaintext such that the 6 leftmost bits will be any combination from 000000 to 111111, and hence, given c, any possible m looks equally probable.

We can therefore employ the T-Proof protocol involving an ultimate transposition operation over a list of 2n transposed items, and use it to encrypt a message comprised of n bits via the above described procedure. If we have a message comprised of y bits, we can break it down to n bits size blocks, and encrypt each block with the same or with another round of ultimate transposition, and thereby achieve Shannon secrecy or any desired proximity to it. That security will be controlled by the size of the shared secret s.

Cryptanalysis

The TSC may be attacked either from the front—the final transposition step, or from the back, at the T-Proof procedure that communicates the transposition key, $K_t$, to the recipient.

Up front attack: With regard to the basic protocol, assuming the cryptanalyst knows the size of the transposed elements (u bits), the fact that the transposition was effected via a non-algorithmic random operation, will require her to apply the brute force approach and test all the n! permutations of the known or assumed n=b/u transposition elements. There is no theoretical possibility for an up front shortcut. And if the brute force analysis will net two or more plausible permutations then the cryptanalyst will end up with irreducible equivocation.

With respect to the advanced protocols, the ultimate transposition cipher will render the equivocation that was identified in an exhaustive search, non-reducible, with no fear for any algorithmic shortcuts or alike.

Back side attack The cryptanalyst should start with the encrypted string $q_t$ communicated to the recipient. She will have to work out all possible q strings (the pre-transposition image of $q_t$), and for each such q option, she will have to reverse compute the mix function, and calculate the corresponding secret $s=mix^{-1}(q, r)$. r, the nonce is known. If s is a plausible secret, then q is plausible, and the transposition key for $q_t=T(K_t, q)$ is a viable candidate for the front-end transposition key. If going through this entire process the cryptanalyst finds exactly one plausible secret, s, then the cryptanalysis is complete. If more than one plausible s is found, but among the found s-candidates only one corresponding $K_t$ will reverse transpose the TSC ciphertext c to a plausible p, then also the cryptanalysis is complete. But if there is more than one—the resultant equivocation is terminal.

To the extent that the cryptanalyst cannot determine the plausibility of s, there is no hook for the cryptanalyst to hark on, and not even brute force is a guaranteed cryptanalysis. So, two secret-sharing parties who share a high quality randomized secret s, where the bit size of s is part of its secrecy, do present a daunting challenge for the cryptanalyst.

In analyzing $q_t$ the cryptanalyst will assume that the substrings of q are all unique, and then will be able to compute the maximum number $t_{max}$ of such substrings: $t_{max}=i$ such that $\Sigma 2^j \leq |q_t|$ for $j=1,2,\ldots,i$, while: $\Sigma 2^j > |q_t|$ for $j=1, 2\ldots, i+1$. The cryptanalyst will have to check all $t_{max}!$ permutations for q, and then compute s from $mix^{-t}$, and examine s for plausibility.

If the size of s is known (say it is a four digits PIN), then a brute force cryptanalysis is possible over s-space. And if only one value of s leads to a reasonable plaintext p, then the cryptanalysis is successful. Otherwise, it terminates with the computed equivocation.

The users could select a shared secret s of any desired size. They can be prepared with several s secrets to be replaced according to some agreed schedule. It is therefore the users who have the power and the responsibility to determine the level of security for their messages. The salient feature of the TSC is that it is not dependent on algorithmic complexity, and its vulnerability in any case is credibly assessed with straight forward combinatorial calculus.

Bit Switchable Migration Transposition

Given a bit string s, and a migration counter, r to (Equivoe-T style). s can be transposed to $s_t$ by migrating the bits one by one with the direction of the next count being determined by the identity of the migrating bit. 0—clockwise, 1—counter clockwise, or the opposite. This will make the resultant transposition dependent on the content of s.

Illustration: let s=1101110, and r=4. We start clockwise: s(1)=110110. Since the hit bit is '1' the counting direction reverses: s(2)=11011. The new bit is zero, so the next round proceeds clockwise: s(3)=1101. Again a "1" was hit, so the direction reverses again: s(4)=110. The direction continues counterclockwise because the hit bit is 1: s(5)=11. The bit hit is zero so the next round is clockwise: s(6)=1.

T-Proof
Secure Communication via Non-Algorithmic Randomization

Proving Possession of Data to a Party in Possession of Same Data

Abstract: shared random strings are either communicated or recreated algorithmically in "pseudo" mode, thereby exhibiting innate vulnerability. Proposing a secure protocol based on unshared randomized data, which therefore can be based on 'white noise' or other real-world, non algorithmic randomization. Prospective use of this T-Proof protocol includes proving possession of data to a party in possession of same data. The principle: Alice wishes to prove to Bob that she is in possession of secret data s, known also to Bob. They agree on a parsing algorithm, dependent on the contents of s, resulting in breaking s into t distinct, consecutive sub-strings (letters). Alice then uses unshared randomization procedure to effect a perfectly random transposition of the t substrings, thereby generating a transposed string s'. She communicates s' to Bob. Bob verifies that s' is a permutation of s based on his parsing of s to the same t substrings, and he is then persuaded that Alice is in possession of s. Because s' was generated via a perfectly randomized transposition of s, a cryptanalyst in possession of s' faces t! s-candidates, each with a probability of 1/t! (what's more: the value of t, and the identity of the t sub-strings is unknown to the cryptanalyst). Brute force cryptanalysis is the fastest theoretical strategy. T-Proof can be played over s, mixed with some agreed upon nonce to defend against replay options. Unlike the competitive solution of hashing, T-Proof does not stand the risk of algorithmic shortcut. Its intractability is credibly appraised.

Introduction

Online connection dialogues normally start by Alice logging on to Bob's website, passing along name, account number, passwords etc.—data items well possessed by Bob. Such parties normally establish a secure channel beforehand but (i) the secure channel is vulnerable to man-in-the-middle (MiM) attacks, and (ii) at least some such information may be passed along before the secure channel is established (e.g. name, account number). It is very easy for Bob to send Alice a public encryption key, and ask her to encrypt her secret data s with that key, but this solution is also vulnerable to MiM attacks. Hashing is one effective solution, but it relies on the unproven hashing complexity. Here we propose a solution for which "brute force" is the best cryptanalytic strategy: T-Proof (T for transposition): Alice wishes to prove to Bob that she is in possession of a secret, s, known to Bob. Bob sends Alice random data, r, with instructions how to "mix" s and r into q which appears randomized. q is then parsed to t letters according to preset rules. And based on these t letters q is randomly transposed to generate q'. q' is then communicated to Bob over insecure lines. Bob verifies that q' is a permutation of q, and concludes that Alice is in possession of s. A hacker unaware of q will not know how q is parsed to t letters, and hence would not know how to reverse-transpose q' to q. Unlike the prevailing hashing solutions and their kind, T-Proof is not based on algorithmic complexity, rather on solid combinatorics, whereby the user can credibly estimate the adversarial effort to extract the value of the proving secret s. Alice and Bob need to share no secret key to run the T-Proof procedure. T-Proof is computationally easy, operates with any size of secret s, and may be used by Alice to identify to Bob who she is, while keeping her identity secret towards any eavesdropper. It may be used by a group to prove the identities of files, and databases kept by each member of the group. Unlike hashing, T-Proof, in some versions, does not stand the risk of collision, only brute force attack, the required effort of which may be controlled by the user.

The anchor of security online is a "cyber passport" authoritatively and replaceable issued off-line, and then securely used for identification and other purposes. Inherently using an identification code to prove identity is a procedure in which the identity verifier knows what id to expect. Customarily, people and organizations have simply sent their id to the verifier, in the open. More sophisticated means include some form of encryption. Alas, If Alice sends Bob a cipher to encrypt his message to her with it, then this cipher may be confiscated by a hacker in the middle, who will pretend to be Alice when he talks to Bob, and gives him his version of "Alice's cipher", which Bob uses and thereby reveals to the hacker his secret data (id, account number, password, etc). Bob then uses Alice's cipher to send her the same, and Alice is never the wiser.

A more effective solution is one where a stealth man in the middle cannot compromise the proving data. One such method is hashing. Hashing is based on unproven complex algorithms, and collision is always a worry. So it makes sense to come up with alternative means for a party to prove to a verifier aware of s, that the prover is in possession of s.

This proposed solution is based on the idea that the prover may parse her secret bit string s, to some t letters, where a letter is some bit sequence. The procedure to parse s to t letters is a function of s. Then the prover, randomly transposes the t letters, to create an equal length string s'. s' is sent over to the verifier. The verifier, in possession of s will use the same parsing procedure to identify the same t letters in s, and then verify that s' is a strict permutation of s. This will convince the verifier that the prover has s in his or her possession. A hacker, capturing s' will not know what t letters s' is comprised of, and anyway since s' is a random permutation of s, the hacker will not know how to reverse transpose s' to s.

Illustration: The prover, named John Dow, wishes to let the verifier know that he asks to log in. Using T-Proof Mr. Dow will write his name (s) in ASCII:

$s$=01001010 01101111 01101000 01101110
  00100000 01000100 01101111 01110111

Let's parse s as follows: the first bit is the first letter "A", the next two bits are the second letter, "B", the third letter is comprised of the four next letters, etc:

$A$=0, $B$=10, $C$=0101, $D$=00110111,
$E$=1011010000110111
$F$=0001000000100010001101111011110111

$s$=0 10 0101 00110111 1011010000110111
  0001000000100010001101111011110111=ABCDEF

Let's now randomly transpose the t=6 letters (A, B, C, D, E, F) to write:

$s'$=$T(s)$=ECFABD=1011010000110111 0101
  0001000000100010001101111011110111 010
  00110111,

Or:

$s'$=10110100 00110111 01010001 00000010
  00100011 01111011 10111010 00110111

The verifier, in possession of s, will similarly break s to A,B,C,D,E,F letters, then, starting from the largest letter, F=0001000000100010001101111011110111, the verifier will find the "F-signature" on s': s'=1011010000110111 0101 F 0 10 00110111 then the "E-signature": E=1011010000110111 s'=E 0101 F 0 10 00110111 And so on to construct s'=ECFABD. The verifier will conclude then that s' is a perfect permutation of s, based on the six letters A, B, C, D, E, F. All letters were found in s', and no unmarked bit left in s'. If the verifier does not know the name John Dow, then the verifier will list all the names in its database pre-parsed by their proper letters, and compare s' to this expression of the names.

The hacker, capturing s' cannot parse it to the proper letters (A, B, C, D, E, F) because, unlike the verifier, the hacker does not know s. If the hacker uses the same parsing rules on s', he gets: A'=1, B'=01, C'=1010, D'=00011011, E'=1010100010000001, F'=00010001101111011101110. So clearly: A'≠A, B'≠B, C'≠C, D'≠D, E'≠E, F'≠F. So s' cannot be interpreted by the hacker as a permutation of s, except after applying the prolonged brute force cryptanalysis. Notice that the verifier and the prover need not share any secrets to collaborate on this T-Proof procedure. They just need to adhere to this public protocol. There are many variations on this procedure to balance security and convenience, but this illustration highlights the principle.

The T-Proof Environment The environment where T-Proof operates is as follows: three parties are involved: a prover, a verifier, and a hacker. A measure of data regarded as secret s is known to the prover and to the verifier, and not known to the Hacker. The prover and the verifier communicate over insecure lines with the aim of convincing the verifier that the prover is in possession of s—while making it hard for the Hacker to learn the identity of s. The verifier and the prover have no shared cryptographic keys, no confidential information. They both agree to abide by a public domain protocol. T-Proof is a public function that maps s to s', such that by sending s' to the verifier, the prover convinces the verifier that the prover is in possession of s, while the identity of s', assumed captured by the hacker, makes it sufficiently intractable for the Hacker to infer s. We are interested in the following probabilities: (1) the probability for the verifier to falsely conclude that the prover holds s, and (2) the probability for the Hacker to divine s from s'. We rate a solution like T-Proof with respect to these two probabilities.

The T-Proof Principles

The T-Proof principle is as follows: let s be an arbitrary bit string of size n: $s=s_0=\{0,1\}^n$. Let s be parsed into t consecutive sub-strings: $s_1, s_2, \ldots s_t$, so that:

$$s_0 = s_1 s_2 \ldots s_t$$

Let s' be a permutation of s based on these t substrings. Any one in possession of s, will be able to assert that s' is a permutation of s (based on the t sub-strings), and will also be able to compute the number of possible s-string candidates that could have produced s' as their permutation. Based on this number (compared to $2^n$) one will be able to rate the probability that s' is a permutation of some s"≠s. Given that the string s is highly randomized (high entropy), then anyone in possession of s' but without the possession of s, will face well defined set of randomized possibilities for the value of t and for the sizes of $s_1 s_2, \ldots s_t$ such that by some order, o, these substring will construct s':

$$s'_0 = s_i s_j s_k \ldots s_t \ldots$$

T-Proof is then a method for a prover to prove that she has a measure of data s, known to the verifier, such that it would be difficult for a Hacker to infer the value of s, and where both the probabilities for verifier error and for Hacker's success are computable with solid durable combinatorics, and the results are not dependent on assumed algorithmic complexity.

Auxiliary principles: (a) to the extent that s is a low entropy string, then it may be randomized before submitting it to T-proof. For example encrypting s with any typical highly randomizing cipher. The cipher key will be passed in the open since what is needed here is only the randomization attribute of the cipher, not its secrecy protection. (b) In order for the prover to be able to prove possession of same s time and again (in subsequent sessions), she might want to "mix" s with a random bit sequence r, to generate a new string, q, and apply T-Proof over q.

T-Proof Design

The T-Proof procedure is comprised of the following elements:
  Non-Repetition Module
  Entropy Enhancement Module
  Parsing Module
  Transposition Module
  Communication Module
  Verification Module These modules operate in the above sequence: the output of one is the input of the next.

Non-Repetition Module

In many cases the prover would wish to prove the possession of s to the verifier in more than one instant. To prevent a hacker from using the "replay" strategy and fool the verifier, the prover may take steps to insure that each proving session will be conducted with new, previously unused, and unpredictable data.

One way to accomplish this is to "mix" s with a nonce, a random data, r, creating q=mix(s,r). The mixing formula will be openly agreed upon between the prover and the verifier. The "mix" function may be reversible, or irreversible (lossy or not lossy). Namely given q and r it may be impossible to determine the value of s, since many s candidates exist, or, alternatively, given r and q, s will be determinable. It will then be a matter of design whether to make it intractable to determine s from r and q, or easy.

One consideration for r and the "mix" is the target bit size of the value that undergoes the T-Proof procedure. That size can be determined by selecting r and 'mix'.

Since the procedure computed by the prover will have to also be computed by the verifier, (except the transposition itself), it is necessary that r will have to be communicated between the two. Since the verifier is the one who needs to make it as difficult as possible for the prover to cheat, it makes more sense for the verifier to determine r, (different per each session), and pass it on to the prover. The mix function, too, may be the purview of the verifier.

The simplest mix option is concatenation of s with r: q=sr, and r is adjusted to get the right size q.

Entropy Enhancement Module

Once the secret s is preprocessed to become q (the non-repetition module), it may be advisable to pump in entropy to make it more difficult for the hacker to extract the secret (s or q). Linguistic data (name, addresses) are of relatively low entropy, and can be better guessed than purely randomized data. It is therefore helpful for the users to "randomize" q. The randomization process, also will be in the open, and known to the hacker.

An easy way to randomize q is to encrypt it with a public key using any established cipher.

Parsing Module

Given a string s comprised of n bits: $s=s_0=\{0.1\}^n$, it is possible to parse it to t consecutive substrings $s_1 s_2 \ldots s_t$, where $1 \le t \le n$. Based on these t substrings s may be transposed up to t! permutations. So for every secret s, there are at most t! s' candidates. Or, alternatively, given s' the hacker will face up to t! s-candidates. Therefore, it would seem that one should try to maximize t.

The hacker facing the n-bits long s' string does not know how the sub-strings are constructed. The hacker may or may not know the value of t. Clearly if t=1 then s'=s. If t=2, then the cut between the two substrings may be from bit 2 to bit n−1 in s'. If the substrings are all of equal size then their identity is clear in s'. If the hacker is not aware of t or of any substring size (because it depends on s, which is unknown to him), then given s' the hacker will face a chance to guess s:

$$Pr[x=s] = 1/C^{t-1}_{n-2}$$

where x is any s candidate, and $C^{t-1}_{n-2}$ is the number of ways that (t−1) split points can be marked on the n bits long string. This guessing probability decreases as t increases (and the substrings decrease).

On the other hand, larger t would make it more difficult for the verifier to check whether s' is a permutation of s based on the parsed substrings. A large t, implies small sub-strings. A small sub-string of an average size of (n/t) bits will probably fit on different spots on s', and the verifier would not know which is the right spot.

Illustration: Let s'=10101110101000101110. for a substring $s_i$=101 the verifier will identify 5 locations to place it on s'. And or $s_j$=111, there are two locations. By, contrast a larger substring $s_k$=1000101 will fit only in one location on s'.

One would therefore try to optimize the value of t and the various sub-string sizes between these two competing interests.

Some design options are presented ahead:

The Incremental Strategy

The Minimum size strategy

The log(n) strategy

These strategies are a matter of choice, each with its pro and cons.

We keep here the s, s' notation, but it should also apply to instances where the "entropy enhancement" module is applied, and then s, and s' will be replaced by q and q'.

The Incremental Strategy

The "minimum size strategy" works as follows: s is approached from left to right (or alternatively, from right to left). The first bit is regarded as the first letter, let's designate it as A. A is either "1" or "0". Then one examines the second bit. If it is different from the first bit then it is set as B. If the second bit is of the same value as the first bit, then the next bit is added, and the two-bit string becomes B. Further, one examines the next two bits, if they look the same as a previous letter, one moves up to three bits, and so on. When the last letter so far was defined as l bits long, and there are only m≤2l letters left in s, then the last letter is extended to include these m bits.

This strategy increments the size of the letters, and the parsing of the string s depends on the bit value of s. And hence, knowing only s', the hacker will not know how s was parsed out, not even the value of t—the number of sub-strings. As designed s is parsed into t non-repeat letters, and hence s will have t! permutations.

This strategy can be modified by starting with bit size of l>1, and incrementing "+2" or more instead of "+1" each round.

There might rise a slight difficulty for the verifier looking at s' trying to verify that s substrings fit into s'.

Illustration (Incremental Strategy)

The prover, Bob, wishes to convince the verifier, Alice, that he has in his possession Bob's PIN, which is: $s=8253_{10}=10000000111101$ Bob then decomposes s to a sequence of non-repeat letters, from left to right, starting with a bit size letter: The first leftmost bit is 1, so Bob marks a=1. The next bit is zero, Bob marks b=0 (a≠b). The third bit is a zero too, so it would not qualify for the next letter. Bob then increments the size of the letter to two bits, and writes c=00. (c≠b≠a). What is left from s now is:

$s=0000111101$

The next 2 bits will not qualify as d, since then we have d=c, which Bob wishes to avoid, so Bob once again increases the bit count, now to three and writes d=000 (≠c≠b≠a). s now looks like:

$s=0111101$

The next three bits will qualify as e=011, because e≠d≠c≠b≠a), and the same for f=110≠e≠d≠c≠b≠a. Now:

$s=1$

One bit is left unparsed it could not be g=1 since then g=a, so the rule is that the left over bits are concatenated to the former letter, hence we rewrite: f=1101

At this point we can write:

$s=abcdef$ where the 6 letters that comprise s are defined above.

Bob will then randomly transpose s per these 6 letters and compute an s-transpose:

$s'=dbfeac$

Bob will now transmit s' to Alice using its binary representation:

$s'=000\ 0\ 1101\ 011\ 1\ 00$

But not with these spaces that identify the letters, rather:

$s'=00001101011100=860$

Alice receiving s', and having computed the letters in s, like Bob did (Alice is in possession of s), will now check whether the s' that Bob transmitted is letter-permutation of s (which she computed too).

To do that Alice starts with the longest letter: f=1101, and moves it from the rightmost bits in s':

$s'=0000[11011]_f 011100$

Alice will then look if e=011 fits in s':

$s'=0000\ [1101]_f [011]_e\ 100$

Continuing with d=000:

$s'=0\ [000]_d\ [1101]_f\ [011]_e\ 100$

And so on, until Alice, the verifier, securely concludes that s' is a permutation of s based on the incremental parsing strategy of s.

The Minimum Size Strategy

This strategy is similar to the incremental size strategy. The difference is that one tries to assign minimum size for each next sub-string.

Regarding the former illustration, let $s=8253_{10}=10000000111101$. It will be parsed a=1, b=0, c=00, d=000, resulting in s=0111101. But the next letter, will be e=01, because there is no such letter so far. And then f=11. We now have: s=101. The next letter could have been g=10 because this combination was not used before. But because only 1 bit is left in s, we have g=101. Clearly the parsing of s is different by the two strategies, even the number of sub-strings (letters) is different.

The log(n) Strategy

This strategy is one where matching s' to the sub-strings of s is very easy. But unlike the former two strategies, the parsing of s (comprised of n=|s| bits) is by pre-established order, independent of the contents of s.

Procedure: Let $L_i^j$ be letter i (or, say sub-string i) from the j series alphabet. For every letter series j we define, the size of the letters:

$|L_i^j||=2^i$

Accordingly one will parse a bit string s as follows:

$s=L_1^j L_2^j \ldots L_t^j$ where $L_t^j$ has the length $l=|s|-(2^0+2^1+2^2+\ldots 2^{t-1})$, where t is the smallest integer such that $|s|\le 2^t$. Accordingly $t\sim\log_2(|s|)=\log_2(n)$.

Illustration: Let s=1 01 0010 00100001 0000010000001, we parse it as follows: $L_0^1=1$, $L_1^1=01$, $L_2^1=0010$, $L_3^1=00100001$, $L_4'^1=0000010000001$ Security and convenience considerations may indicate that the last letter is too large. In that case it will be parsed according to the same rules, only that its sub-strings will be regarded as a second letters sequence:

$$L'^1_t = L_0^2 L_1^2 L_2^2 \ldots L'^2_{t'}$$

Note that for every round of log(n) parsing there would be exactly one possible position for every substring within s', because every sub-strings is longer than all the shorter substrings combined. This implies a very fast verification process.

Illustration, the last letter above: $L'^1_4=0000010000001$ may be parsed into: $L_0^2=0$, $L_1^2=00$, $L_2^2=0010$, $L_3^2=0000001$ The last letter in this sequence can be parsed again, and so on, as many times as one desires. The log(n) strategy might call for all sub-strings of size $2^m$ and above to be re-parsed.

The verifier, knowing s will be able to identify all the letters in the parsing. And then the verifier will work its way backwards, starting from the sub-string that was parsed out last. The verifier will verify that that letter is expressed in some order of its due sub-strings, and then climb back to the former round until the verifier verifies that s' is a correct permutation of the original s string.

This strategy defines the parsing of every bit string, s, regardless of size. And the longer s, the greater the assurance that the prover indeed is in possession of s.

The Smallest Equal Size Strategy

This strategy parses s to (t−1) equal size sub-strings (letters), and a t letter of larger size. One evaluates the smallest letter size such that there is no repeat of any letter within s.

Given a bit string s, $\{0,1\}^n$, for l=1 one marks m l bits long substrings starting from an arbitrary side of s (say, leftmost) where m=(n−n mod l)l. These leaves u=n−l*m bits unmarked (u<l). If any two among these m substrings are identical, then one increments l, and tries again iteratively until for some l value all the m substrings are distinct. In the worst case it happens for an even n at l=0.5*n+1, and for an odd n at l=0.5(n+1). Once the qualified l is identified, the first (m−1) substrings are declared as the first (t−1) sub-strings of s, and the m-th l bits long substring is concatenated with the remaining u bits to form a l+u bits long substring. The thus defined t substrings are all distinct, and it would be very easy for the verifier to ascertain that s' is a t-based permutation of s. On the other hand, the hacker will readily find out the value of t because applying this procedure to s' will likely result in the same value of t. So the only intractability faced by the hacker would be the t! size permutation space.

Illustration: let s=10010011101001110. For l=1 we have several substrings that are identical to each other. Same for l=2. We try then for l=3:

$s$=100 100 111 010 011 10

There are two identical strings here, so we increment l=4:

$s$=1001 0011 1010 0111 0

Now, all the four, four bit size substrings are distinct, s is parsed into: 1001,0011,1010,01110.

Transposition Module

The T-Proof transposition should be randomized to deny the hacker any information regarding reversal, so that given s' the hacker will face all t! possible permutation, each with a probability of 1/t!. This can be done based on the "Ultimate Transposition Cipher [7], or by any other methods of randomization. It is important to note that the randomization key is not communicated by the prover to the verifier, so the prover is free to choose and not communicate it further.

One simple example for randomized permutation is as follows: the string s is comprised of t sub-strings: $s_1, s_2, \ldots s_t$. When substring $s_i$ is found in position j in the permutation s', then we shall designate this string as $s_{ij}$.

Using repeatedly a pseudo random number generator, the prover will randomly pick two numbers $1 \le i \le t$, and $1 \le j \le t$, and so identify $s_{ij}$. Same will be repeated. If the random pick repeats a number used before (namely re-picks the same i, or the same j), then this picking is dropped, and the random number generator tries again. This randomization process is getting slower as it progresses.

Another variety is to pick the next unused index (i, and j) if a used value is re-selected.

Communication Module

The communication module needs to submit s' and some meta data describing the protocol under which the string s' is being sent.

The module might have also to communicate the random nonce to the prover, and the confirmation of the reception of the s information.

Verification Module

Let's first develop the verification procedure for a simple permutation, s' (as opposed to the several rounds of transposition as in the log(n) strategy). Procedure: the verifier first tries to fit the longest substring into s' (or one of the longest, if there are a few). If there is no fit, namely, there is no substring on s' that fits the longest substring checked, then the verification fails. If there is one fit, then the fitted bits on s' are marked as accounted for. The verifier then takes the next largest substring and tries to fit it somewhere in the remaining unaccounted bits of s'. If no fit—the verification fails. If there is a single fit, the above process continues with the next largest substring. This goes on until the verification either fails, or concludes when all the substrings are well fitted into s' and the verifier then ascertains that there are no left-over unaccounted for bits. If there are leftover bits—the verification fails.

If for any substring there are more than one places of fit, then, one such place is chosen, and the other is marked for possible return. The process continues with the picked location. If the verification fails at some point, the verifier returns to the marked alternative, and continues from there. This is repeated at any stage, and only if all possible fittings were exhaustively checked and no fit was found, then the verification as a whole fails. If somewhere along the process a fit is found then the verification succeeds.

In the case of several rounds as in the log(n) parsing strategy, then the above procedure is repeated for each round, starting from the last parsing.

Different parsing strategies lead to different efficiencies in verification.

Applications

T-Proof may be applied in a flexible way to provide credibly estimated security to transmission of data already known to the recipient. The most natural application may be the task of proving identity and possession of identity-related data, but it is also a means to insure integrity and consistency of documents, files, even databases between two or more repositories of the same.

Proving Identity

When two online entities claim to be known to each other and hence start a dialogue, then the two may first identify themselves to each other via T-Proof. In particular, if Alice runs an operation with subscribers identified by secret personal identification numbers, PIN, then Bob, a subscriber, may use T-Proof to prove his identity to Alice, and in parallel Alice, will use T-Proof to prove to Bob that she is Alice, and not a fishing scheme. In that case they may each apply the entropy enhancement module with the other supplying the necessary randomness.

Alice could store the PINs or names, etc. with their parsed letters so that she can readily identify Bob although he identifies himself through T-Proof.

Proving Possession of Digital Money

Some digital money products are based on randomized bit strings (e.g. BitMint). Such digital coins may be communicated to an authentication authority holding an image of this coin. T-Proof will be a good fit for this task.

Acceptable Knowledge Leakage Procedures

Alice may wish to prove to Bob her possession of a secret s, which Bob is not aware of So Bob passes Alice communication to Carla, who is aware of s, and he wishes Carla to confirm Alice's claim that she is in possession of s. By insisting on going through him, Bob is assured that Carla confirms the right s, and also it gives him the opportunity to test Carla by forwarding some data in error. Alice, on her part, wishes to prevent Bob from subsequently claiming that he knows s. She might do so over a randomized s, by extracting from s some h bits, and constructing an h bits long string over which Alice would practice T-Proof h should be sufficiently large to give credibility to Carla's confirmation, and on the other hand is should be a sufficiently small fraction of s, to prevent Bob form guessing the remaining bits.

Meta Payment

Embedding Meta Data in Digital Payment

A digital payment process is comprised of sending money bits from payer to payee. These money bits may be mixed with meta-data bits conveying information about this payment. These so called meta-bits will be dynamically mixed into the money bits (or "value bits") to identify that very payment. The combined bit stream may or may not be interpreted by the payee. The purpose of this procedure is to augment the accountability of payments and suppress fraud.

Introduction

Digital money carries value and identity in its very bit sequence. In general a holder of these bits is a rightful claimant for its value. Alas, one could steal money bits, or one could try to redeem money bits he or she previously used for payment (and hence have no longer valid claim for their value). These avenues of abuse may be handled with a procedure in which money bits will be associated with meta bits. The combined bit stream will identify money and meta data regarding the transaction which moved the claim for that money from the payer to the payee.

Two questions arise:
What type of meta data would be used?
How to mix the money bits with the meta bits?
Use cases

Type of Meta Data

The useful meta data may identify:
payer, Payee, time of transaction what was exchanged for the money transaction transaction category association The latter refers to transactions that are part of a contract, arrangement, project, to facilitate tracking.

Mixing Money Bits and Meta Bits

The Mixing may be:
Sectionalized
Encrypted

In the first mode, the overall stream is comprised of a section of money bits followed by a section of meta bits, followed again by a section of money bits, and again a section of meta bits, as many iterations like this as necessary.

In the second mode, the money bits and the meta bits are encrypted to a combined cipher stream, with a proper decryption option at the reading end. In either mode one should address the issue of recurrent payment: how to handle the mixture upon dividing the money bits and using one part one way (paying further, or storing away) and the second part in another way.

Sectionalized Mixing

In this mode the stream is comprised of digital coin header followed by coin payload, comprised of money bits and meta bits, followed by a digital coin trailer. The payload stream is comprised of $v_1$ money bits followed by $u_1$ meta bits, followed by $v_2$ money bits, followed by $u_2$ meta bits, and so on, alternative sections money bit and meta bits. The size of the sections may be predetermined to allow for the stream to be properly interpreted. Alternatively the sections will be of variable size and marked by starting place and ending place. Such marking may be accomplished using "Extended Bit Representation".

Extended Bit Representation (EBR)

Extended Bit Representation is a method that enables any amount of desired marking along a sequence of bits. Useful to identify sections in the bit stream of different meaning or purpose.

Let S be a sequence of s bits. S can be represented in an "n-extended bit representation" as follows:

$$1 \rightarrow \{11 \ldots 1\}_n$$

$$0 \rightarrow \{00 \ldots 0\}_n$$

This will replace S with an S″ string of size sn bits. This extension will leave (2&upn-2) n-bits combinations free to encode messages into the bit stream.

For n=2, one may assign $\{00\} \rightarrow 0$, $\{11\} \rightarrow$, $\{01\}$—beginning, b, $\{10\}$—closing, c. And hence one could combine two $S_1^2$ and $S_2^2$ strings into:

$$b\ S_1^2\ c\ b\ S_2^2\ c$$

Or a more efficient way. One could also say that every "b" sequence that follows another b sequence (without having a "c" in between), will not be a beginning sign, but some other mark, say, unidentified bit (as to its binary identity).

For n=3 there would be 8−2=6 available markers to be encoded. So a string s=01101, will become a net $S^3$=000111111000111. And it can be cut to incorporate some meta data D=000110 in it as follows:

$$S^3 + D = 000\text{-}111\text{-}001\text{-}000110\text{-}100\text{-}111\text{-}000\text{-}111$$

where the hyphens "-" are introduced for readability only. The triple bit 001 marks the beginning of the D string, and the triple bit "100" marks its end.

Encrypted Mixing

In this mode the money bits, M, and the data bits D are processed via a secret key K to produce an encrypted mix E. The payee may have possession of K and thus separate M from D, or the payee may not have possession of K. It may be that only the mint that is asked to redeem the digital money has the K.

Recurrent Payment Either mixing mode will work well for a payer who sends the bits to a payee who in turn redeems those bits at the mint, or any other money redemption center. But payment flexibility requires that a digital payment may be paid further from one payee to the next. This recurrent payment challenge must be handled differently depending on the mode.

Recurrent Sectional Mixing

We discuss two methods. One where the sections are marked, using the extended bit marking, and the other is based on fixed building blocks.

The variable size method Payer #1 passes to a payee a sequence $S_1$ comprised of money bit, $M_1$, and meta data bits $D_1$. The payee now becomes payer #2 and decides to may some of the $M_1$ money to one payee ($M_{11}$), and the other part to another payee: $M_{12}$. Such that $M_{11}+M_{12}=M_1$.

This will be done by passing $D_1$ to the two payees, and adding meta data $D_{21}$ for the first payee and $D_{22}$ to the second payee. So the bit transfer from Payer #2 to his first payee will be: $M_{11}D_1D_{21}$ And the bit transfer from payer #2 to his second payee will be: $M_{12}D_1$ & $D_{22}$ And so on. Subsequent transfers are done such that more of the bits are meta data and less of the bits are money type.

Fixed Building Blocks

A money stream M may be broken down to fixed 'atoms' of value m. This will imply that m is the smallest exchanged value. A payment will be comprised of passing t m units from payer to payee. The payer will add to each unit its own meta data. If such meta data has a fixed bit count of d. The first payer passes to its payee m+d bits. m money bits and d meta data bits. That payee when turning payer will pass to its payee m+2d bits because the m money bits will have to have their first meta data batch, d, from the first payer and then have their second meta data batch from the second payer. The p payer will pass to its payee m+pd bits when passing the same fixed money unit, m.

Recurrent Encrypted Mixing

Here there are two modes. If the payee has the decryption key then he applies it to separate the money bits from the meta bits. And then depending on the protocol decides whether to use those meta bits when she encrypts a payment package to her payee, or whether just to use her own meta data.

If the payee does not have the decryption key then he must regard the encrypted package en block per its nominal value. And when he pays the same further he will add his meta bits and re-encrypt what was paid him with the meta bits he has to add to pay ahead. In that mode it would be possible to split the money by proper indication in the meta data. The new payee may, or may not have the keys to unmix the bits, and if not then she would pay it further by marking in her meta bits how much of the money paid to it she pays to whom.

So the first payer pays M money bits accompanied with D meta bits, encrypted to become $E=(M+D)_e$. The payee receiving that payment will wish to pay $M_1$ to one payee of hiss, and $M_2$ to another payee ($M_1+M_2=M$). He will then combine E with metadata $D_1$, such that $D_1$ will indicate that a cut of $M_1$ from M is to be paid to the first payee. Once E is matched with $D_1$, then the current payer will encrypt E and $D_1$ to created a subsequent encrypted package: $E_{11}=(E+D_1)_e$. He will also combine the same E with meta data $D_2$ to indicate that out of M a cut of $M_2$ is to be paid to this second payee. And similarly the current payer will combined E with $D_2$ and encrypt them both: $E_{12}=(E+D_2)_e$.

It is clear that this arrangement could continue from payer to subsequent payer. It is a variety of the blockchain concept. The redeemer, or the proper examiner of the dynamics of payment will have all the keys necessarily to replay the payment history of this money. Use Cases Meta data gives the relevant authority the desired visibility of payment dynamics. It is helpful in combatting fraud and misuse. It is a powerful accounting tool. The mint or the agent that is eventually redeeming the digital money will be able to follow on the trail of that money from the moment it was minted and put into circulation to the moment when it being redeemed. All the interim holders of that digital coin will be identifiable. The content of the metadata may be comprised of mandatory parts and voluntary parts. Payers may choose to add metadata to help them analyze the payment if that payment eventually comes into challenge. The meta data may involve payer identification in the clear or in some code.

Cryptographic Tensors

Avoiding Algorithmic Complexity; Randomization-Intensified Block Ciphers

Casting block ciphers as a linear transformation effected through a cryptographic key, K, fashioned in tensorial configuration: a plaintext tensor, $T_p$, and a ciphertext tensor, $T_c$, each of order n+1, where n is the number of letters in the block alphabet: $T_p=$; $T^\beta{}_{i1,i2,\ldots,in}$; $T_c=T^\beta{}_{i1,i2,\ldots,in}$ All the (n+1) indices take the values: 1,2, . . . t. Each tensor has $t^{n+1}$ components. The two tensors will operate on a plaintext block p comprised of t letters, and generate the corresponding ciphertext block of same size, and when operated on the ciphertext block, the tensors will generate the plaintext block: We indicate this through the following nomenclature: $[p]\{T_pT_c\}[c]$. The tensors are symmetrical with respect to the n letters in the alphabet, and there are $(t!)^{2(n+1)}$ distinct instances for the key: $|K|=|T_pT_c|$ Introduction The chase after a durable algorithmic complexity is so ingrained in modern cryptography that the suggestion that it is not the only direction for the evolution of the craft may not be readily embraced. Indeed, at first glance the idea of key spaces much larger than one is accustomed to, sounds as a call in the wrong direction. Much of it is legacy: when cryptography was the purview of spooks and spies, a key was a piece of data one was expected to memorize, and brevity was key. Today keys are automated, memory is cheap, and large keys impose no big burden. As will be seen ahead one clear benefit from large keys is that they are associated with simple processing, which are friendly to the myriad of prospective battery-powered applications within the Internet of Things.

We elaborate first on the motivation for this strategic turn of cryptography, and then about the nature of this proposal.

Credible Cryptographic Metric

Modern cryptography is plagued by lack of credible metric for its efficacy. Old ciphers like DES are still overshadowed by allegations of a hidden back door designed by IBM to give the US government stealth access to world wide secrets. AES: Nobody knows what mathematical shortcuts were discovered by those well-funded cryptanalytic workshops, who will spend a fortune on assuring us that such breakthrough did not happen. Algorithmic vulnerabilities may be "generic", applicable regardless of the particular processed data, or they may be manifest through a non-negligible proportion of "easy instances". While there is some hope to credibly determine the chance for a clear mathematical (generic) shortcut, there is no reasonable hope to credibly determine the proportion of "easy cases" since one can define an infinity of mathematical attributes to data, and each such attribute might be associated with an unknown computational shortcut. The issue is fundamental, the conclusion is certainly unsettling, but should not be avoided: Modern cryptography is based on unproven algorithmic complexities.

The effect of having no objective metric for the quality of any cryptographic product is very profound. It undermines the purpose for which the craft is applied. And so the quest for a credible cryptographic metric is of equally profound motivation.

We may regard as reference for this quest one of the oldest cryptographic patents: the Vernam cipher (1917). It comes with perfect secrecy, it avoids unproven algorithmic complexity, and its perfect security is hinged on perfect randomness. This suggests the question: can we establish a cryptographic methodology free from algorithmic complexity, and reliant on sheer randomness?

Now, Shannon has proven that perfect secrecy requires a key space no smaller than the message space. But Shannon's proof did not require the Vernam property of having to use new key bits for every new message bits. Also Shannon is silent about the rate of deterioration of security as the key space falls short of its Shannon's size. Vernam's cipher suffers from a precipitous loss of security in the event that a key is reused. Starting there we may be searching for a Trans Vernam Cipher (TVC) that holds on to much of its security metrics as the key space begins to shrink, and what is more, that shrinking security metrics may be credibly appraised along the way. Come to think about it, security based on randomized bits may be credibly appraised via probability calculus. A TVC will operate with an objective metrics of its efficacy, and since that metric is a function of sheer randomness not of algorithmic complexity, it becomes the choice of the user how much randomness to use for each data transaction.

Mix v. Many Let's compare to block ciphers: an "open ended key-size cipher", OE, and a "fixed key size cipher" FK. Let |p| be the size of the plain message, p to be handled by both ciphers. We further assume that both ciphers preselect a key and use it to encrypt the message load, p. The security of FK is based on a thorough mixing of the key bits with the message bits. The security of the open-ended key size is based on how much smaller the key is compared to a Vernam cipher where $|k_{Oe}|=|p|$ and secrecy is perfect. Anticipating a given p, the OE user may choose a sufficiently large key to insure a desired level of security. While the FK cipher user will have to rely on the desired "thorough mixing" of each block with the same key. It is enough that one such mixture of plaintext bits and key bits will happen to be an easy cryptanalytic case, and the key, and the rest of the plaintext are exposed. We have no credible way to assess "thoroughness of mixture". The common test of flipping one plaintext bit and observing many ciphertext changes may be misleading. As we see ahead all block ciphers may be emulated by a transposition based generic cipher, and arguably all same size blocks may be of "equal distance" one from the other. By contrast, the OE user can simply increase the size of the key to handle the anticipated plaintext with a target security metric.

Tensor Block Cryptography

Let p be a plaintext block of t letters selected from alphabet A comprised of n letters. We shall describe a symmetric encryption scheme to encrypt p into a corresponding ciphertext block c comprised also of t letters selected from the same alphabet A. c will be decrypted to p via the same key, K. We shall mark the t ordered letters in the plaintext p as: $p_1, p_2, \ldots p_t$. We shall mark the t ordered letters of the corresponding ciphertext c as $c_1, c_2, \ldots c_t$. We can write:

$$p=\{p_i\}^t; \; c=\{c_i\}^t; \; c=enc(p,K); \; p=dec(c,K)$$

where enc and dec are the encryption and decryption functions respectively. The key K is fashioned in tensorial configuration: a plaintext tensor, $T_p$, and a ciphertext tensor, $T_c$, each of order n+1, where n is the number of letters in the block alphabet:

$$T_p = T^\beta{}_{l1,l2,\ldots ln}; \; T_c = T^\beta{}_{l1,l2,\ldots ln}$$

All the (n+1) indices take the values: 1,2, ... t. Each tensor has $t^{n+1}$ components. The two tensors will operate on a plaintext block p comprised of t letters, and generate the corresponding ciphertext block of same size, and when operated on the ciphertext block, the tensors will generate the plaintext block: We indicate this through the following nomenclature: $[p]\{T_p T_c\}[c]$. The tensors are symmetrical with respect to the n letters in the alphabet, and there are $(t!)^{2(n+1)}$ distinct instances for the key: $|K|=|T_p T_c|$ For each of the t arrays in each tensor, for each index $i_1, i_2, \ldots i_j, \ldots i_t$ we will have: $i_{j1}=1,2, \ldots d_1$, $i_{j2}=1,2, \ldots d_2, \ldots i_{jt}=1,2, \ldots d_t$, where, $d_1, d_2, \ldots d_t$ are arbitrary natural numbers such that:

$$d_1 * d_2 * \ldots d_t = n$$

Each of the 2t arrays in K is randomly populated with all the n letters of the A alphabet, such that every letter appears once and only once in each array. And hence the chance for every components of the tensors to be any particular letter of A is 1/n. We have a uniform probability field within the arrays. $T_p$ is comprised of t t-dimensional arrays to be marked: $P_1, P_2, \ldots P_t$, and similarly $T_c$ will be comprised of t t-dimensional arrays to be marked as $C_1, C_2, \ldots C_t$. Generically we shall require the identity of each ciphertext letter to be dependent on the identities of all the plaintext letters, namely: ci=enc(p1, p2, ... pt) for i=1,2, ... t. And symmetrically we shall require:

$$p_i = dec(c_1, c_2, \ldots c_t)$$

for i=1,2, ... t. Specifically we shall associate the identity of each plaintext letter $p_i$(i=1,2 ... t) in the plaintext block, p, via the t coordinates of $p_i$ in $P_i$, and similarly we shall associate the identity of each ciphertext letter $c_i$ (i=1,2, ... t) with its coordinates in $C_i$. We shall require that the t coordinates of any $c_i$ in $C_i$ will be determined by the coordinates of all the t letters in p. Andy symmetrically we shall require that the t coordinates of any $p_i$ in $P_i$ will be determined by the coordinates of all the t letters in c. To accomplish the above we shall construct a t*t matrix (the conversion matrix) where the rows list the indices of the t plaintext letters $p_1, p_2, \ldots p_t$ such that the indices for $p_i$ are listed as follows: i, i+1, i+2, ... i+t−1 mod t, and the columns will correspond to the ciphertext letters $c_1, c_2, \ldots c_t$ such that the indices in column $c_j$ will identify the indices in $C_j$ that identify the identity of In summary the index written in the conversation matrix in row i and column j will reflect index j of plaintext letter $p_i$, and index i of ciphertext letter $c_j$.

Namely:

|       | c1 | c2 | c3 | ... | ct−1 | ct  |
|-------|----|----|----|----|------|-----|
| $p_1$ | 1  | 2  | 3  | ... | t−1  | t   |
| $p_2$ | 2  | 3  | 4  | ... | t    | 1   |
| $p_3$ | 3  | 4  | 5  | ... | 1    | 2   |
|       |    |    |    | ... |      |     |
| $p_t$ | t  | 1  | 2  | ... | t−2  | t−1 |

The conversion matrix as above may undergo t! rows permutations, and thereby define t! variations of the same. The conversion matrix will allow one to determine $c_i, c_2, \ldots c_t$ from $p_1, P_2, \ldots p_t$ and the 2t arrays (encryption), and will equally allow one to determine $p_1, p_2, \ldots p_t$ from $c_1, c_2, \ldots c_t$ and the 2t arrays (decryption). Key Space: The respective key space will be expressed as follows: each of the 2t matrices will allow for n! permutations of the n letters of the alphabet, amounting to $(n!)^{2t}$ different array options. In addition there are t! possible conversion matrices, counting a key space:

$$|K|=(n!)^{2t}t!$$

Iteration Re-encryption, or say, iteration is an obvious extension of the cryptographic tensors: a plaintext block may be regarded as a ciphertext block and can be 'decrypted' to a corresponding plaintext block, and a ciphertext block may be regarded as plaintext and be encrypted via two tensors as defined above to generate a corresponding ciphertext. And this operation can be repeated on both ends. This generates an extendable series of blocks $q_{-i}$, $q_{-(i-1)}, \ldots q_0, q_1, \ldots q_i$, where $q_0$ is the "true plaintext" in the sense that its contents will be readily interpreted by the users. Albeit, this is a matter of interpretation environment. From the point of view of the cryptographic tensors there is no distinction between the various "q" blocks, and they can extend indefinitely in both directions. We write: $\ldots [q_{-i}]$ $\{T^i_p T^i_c\}[q_{-(i-1)}]\{T^{-(i-1)}_p T^{-(i-1)}_c\}[q_{-(i-2)}] \ldots$
The intractability to extract p from the w-th ciphertext, $c^{(w)}$, will be proportional to the multiplication of the key spaces per round: $|K_c^{(w)}{}_{==>p}|=|K|^w=((n!)^{2t}t!)^w$ where w is the count rounds: $p ==> c' ==> c'' ==> c''' \ldots c^{(w)}$. We shall refer to the above as base iteration which will lead to variable dimensionality iteration, and to staggered iteration.

Variable Dimensionality Iteration The successive block encryptions or decryptions must all conform to the same tensorial dimensionality, and be defined over t-dimensional arrays. However the range of dimensionality between successive tensorial keys may be different. Let everythrough t dimensions such that the first dimension ranges from 1 to $d_1$, the second dimension ranges from 1 to $d_2$, ... and index i ranges from 1 to $d_i$. (i=1,2, ... t). As we had discussed we can write: $d_1 * d_2 * \ldots d_t = n$ When one iterates, one may use different dimensionality: $d'_1, d'_2, \ldots d'_t$ for each round, as long as: $d'_1 * d'_2 * \ldots d'_t = n$ So for n=120 and t=2 the first application of tensor cryptography might be based on 2 dimensional arrays of sizes 20*6, while the second iteration might be based on 15*8. And for t=3 one could fit the 120 alphabet letters in arrays of dimensionalities: 4*5*6, or perhaps in dimensionalities. It is noteworthy that dimensionality variance is only applicable for base iteration. It can't be carried out over staggered iteration.

Staggered Iteration Let tensor cryptography be applied on a pair of plaintext block and ciphertext block of $t_1$ letters each: $[p_1, p_2, \ldots p_{t1}]$ $\{T_p T_c\}[c_1, c_2, \ldots c_{t1}]$ Let us now build an iterative plaintext block by listing in order $t_2$ additional plaintext letters, where $t_2 < t_1$, and complement them with $(t_1 - t_2)$ ciphertext letters from the ciphertext block generated in the first round: $c_{t2+1}, c_{t2+2}, \ldots c_{t1}$ and then let's perform a tensor cryptography round on this plaintext block: $[P_{t1+1}, P_{t2+2}, \ldots p_{t1+t2}, c_{t2+1}, c_{t2+2}, \ldots c_{t1}]$ $\{T_p T_c\}$ $[c_{t1+1}, c_{t1+2}, \ldots c_{t1+t1}]$ In summary we have: $[p_1, p_2, \ldots p_{t1+t2}]$ $\{T_p T_c\}$ $\{T_p T_c\}$ $[c_1, c_2, \ldots c_{t2}, c_{t1+1}, \ldots c_{t1+t1}]$ A reader in possession of the cryptographic keys for both iterations will readily decrypt the second ciphertext block $c_{t1+1}, \ldots c_{t1+t1}$ to the corresponding plaintext block: $p_{t1+1}, p_{t2+2}, \ldots p_{t1+t2}, c_{t2+1}, c_{t2+2}, \ldots c_{t1}$ Thereby the reader will identify plaintext letters $p_{t1+1}, p_{t2+2}, \ldots p_{t1+t2}$. She will also identify the identity of the ciphertext letters: $c_{t2+1}, c_{t2+2}, \ldots c_{t2+t1}$, and together with the given $c_1, c_2, \ldots c_{t2}$ letters (from the first round), she would decrypt and read the other plaintext letters: $p_1, p_2, \ldots p_{t1}$. However, a reader who is in possession only of the key for the iteration $(T'_p T'_c)$ will only decrypt plaintext letters $p_{t1+1}, p_{t2+2}, \ldots p_{t1+t2}$, and be unable to read $p_1, p_2 \ldots p_{t1}$. This in a way is similar to the plain staggered encryption, except that this is clearly hierarchical: the plaintext letters in the first round are much more secure than those in the second round. Because the cryptanalyst will have to crack twice the key size, meaning an exponential add-on of security. Clearly this staggering can be done several times, creating a hierarchy where more sensitive stuff is more secure (protected by a larger key), and each reader is exposed only to the material he or she is cleared to read. All this discrimination happens over a single encrypted document to be managed and stored. This hierarchical encryption (or alternatively 'discriminatory encryption') happens as follows: Let a document D be comprised of high-level (high security) plaintext stream $\pi_1$, another plaintext stream $R_2$ with a bit lower security level, up to $\pi_z$—the lowest security level. The $\pi_1$ stream will be assigned $t_1$ letters at a time to the first round of tensorial cryptography. $\pi_2$ stream would fit into the plaintext letters in the second round, etc. Each intended reader will be in possession of the tensorial keys for his or her level and below. So the single ciphertext will be shared by all readers, yet each reader will see in the same document only the material that does not exceed his or her security level. Moreover every reader that does not have the multi dimensional array corresponding to a given letter in the plaintext block will not be able to read it. Some formal plaintext streams might be set to be purely randomized to help overload the cryptanalyst. Advantage over nominal block ciphers: The above described hierarchical encryption can be emulated using any nominal ciphers. Each plaintext stream $\pi_i$ will be encrypted using a dedicated key $k_i$, resulting in cipher $c_i$. The combined ciphertext $c_1 + c_2 + \ldots$ will be decrypted using the same keys. A reader eligible to read stream $\pi_i$, will be given keyes: $k_i, k_{i+1}, \ldots$ so she can read all the plaintext streams of lower security. This nominal emulation is artificial, and in practice each reader will keep only the portions of the total document that includes the stuff that she can read. Every reader will know exactly how much is written for the other levels, especially the higher security levels. And any breach of the nominal (mathematical intractability) cipher will expose all the security level scripts. By contrast, the described hierarchical encryption requires all the readers to keep the complete encryption file, and to remain blind as to how much is written for each higher security level. Also, using the hierarchical encryption, by default every reader gets the keys to read all the lower grade security material. And lastly, the described hierarchical encryption can only be cracked using brute force (no new mathematical insight), and the higher the security level, the greater the security of the encrypted material.

Discriminatory Cryptography, Parallel Cryptography Staggered Iteration Tensor Cryptography, is based on a hierarchy of arrays forming the key which may be parceled out to sub-keys such that some parties will be in possession of not the full cryptographic key, but only a subset thereto, and thus be privy to encrypt and decrypt corresponding script parts only. This discriminatory capability will enable one to encrypt a document such that different readers thereto would only read the parts of the document intended for their attention, and not the rest. This feature is of great impact on confidentiality management. Instead of managing various documents for various security clearance readers, one would manage a single document (in its encrypted form), and each reader will read in it only the parts he or she is allowed to read. The principle here is the fact that to match an alphabet letter a∈A, to its t coordinates: $a_1, a_2, \ldots a_t$ in some t-dimensional array M, it is necessary to be in possession of M. If M is not known then for the given a, the chance of any set of subscripts: $a_1, a_2, \ldots a_t$ is exactly 1/n where n is the number of letters in A. And also in reverse: given the set of coordinates: $a_1, a_2, \ldots a_t$, the chance for a to be any of the n alphabet letters is exactly 1/n. These two statements are based on the fundamental fact that for every arrays in the tensor cryptography, the n alphabet letters are randomly fitted, with each letter appearing once and only once. In the simplest staggered iteration case t=2, we have 2 letters blocks: $p_1 p_2 \Leftrightarrow c_1 c_2$, where the encryption and decryption happens via 2t=4 matrices: $P_1, P_2, C_1, C_2$. Let Alice carry out the encryption: $p_1 p_2 \to c_1 c_2$. Alice shared the four matrices $P_1, P_2, C_1, C_2$ with Bob, so Bob can decrypt $c_1 c_2 \to p_1 p_2$. And let it further be the case that Alice wishes Carla to only decrypt $c_1 c_2$ to $p_1$, and not to $p_2$. To achieve that aim, Alice shares with Carla matrix $P_1$, but not matrix $P_2$. Carla will be in possession of the conversion table, and so when she processes the ciphertext: $c_1 c_2$ she identifies the coordinates of both $p_1$ and $p_2$. Carla then reads the identity of $p_1$ in array $P_1$ in her possession. But since she has no knowledge of $P_2$, she cannot determine the identity of $p_2$. Furthermore, as far as Carla is concerned the identity of $p_2$ is given by flat probability distribution: a chance of 1/n to be any of the possible n letters. With David Alice shared everything except matrix $P_1$, so David will be able to decrypt $c_1 c_2$ to $p_2$ and not to $p_1$. All in all, Alice encrypted a single document which Bob, Carla, and David, each read in it only the parts intended for their attention. In practice Alice will write document D comprised of part $D_1$, and $D_2$. She will pad the shorter document. Such that if $|D_1|>|D_2|$, Alice will add 'zeros' or 'dots' or another pad letter to $D_2$ so that: $|D_1|=|D_2|$, and then Alice will construct plaintext blocks to encrypt through tensor cryptography. Each block will be constructed from two letters: the first letter from $D_1$, and the second letter from $D_2$. The corresponding ciphertext will be decrypted by Bob for the full $D=D_1+D_2$, while Carla only reads in it $D_1$ (and remains clueless about $D_2$), while David reads in the very same ciphertext $D_2$ only (and remains clueless about $D_1$). Clearly $D_1$ and $D_2$ don't have to be functionally related. In general tensor cryptography over t-dimensional arrays (hence over t-letters blocks) may be used for parallel cryptography of up to t distinct plaintext messages. Discriminatory tensor cryptography can be applied over non-iterative mode, where each plaintext letter in a t-letters block is contributed from a different file, or a different part of a given document (security discrimination), or it may be applied via the staggered iteration. The former is limited to t parallel streams, and its security is limited to ignorance of the mapping of one t-dimensional array comprised of n letters. The latter may apply to any number of parallel streams, files, or document parts, and the different secrets are hierarchical, namely the deepest one is protected the best. Also the staggered iteration implementation may allow for different volumes over the parallel encrypted files. The above can be described as follows: Let D be a document comprised of $D_0$ parts that are in the public domain, and some $D_1$ parts that are restricted to readers with security clearance of level 1 and above, and also of $D_2$ parts that are restricted to readers with security level 2 and above, etc. Using tensor cryptography one would share all the t ciphertext matrices ($C_1, C_2, \ldots C_t$), but only matrices $P_1, P_2, \ldots P_i$ with all readers with security clearance of level i or above, for i=1,2, . . . t. With this setting the same document will be read by each security level per its privileges. There are various other applications of this feature of tensor cryptography; for example: plaintext randomization, message obfuscation. In plaintext randomization, one will encrypt a document D as g letters i,j,l, . . . (i,j,l=1,2, . . . t) by order, while picking the other (t-g) letters in the t-letters plaintext block as a random choice. Upon decryption, one would only regard the g plaintext letters that count, and ignore the rest. This strategy creates a strong obfuscation impact on the cryptanalytic workload. In message obfuscation the various parallel messages may be on purpose inconsistent, or contradictory with the reader and the writer having a secret signal to distinguish between them.

3D Tensorial Cryptography Illustration Tensorial Cryptography is not easy to illustrate with any practical size alphabets, and any reasonable block sizes. Let's therefore limit ourselves to a 12 letters alphabet: A, B, C, D, E, F, G, H, I, J, K, L, and a block size t=3. Accordingly any plaintext, say, p=BCJBDLKKH . . . would be parceled out to blocks of three: p=BCJ-BDL-KKH- . . . To encrypt the plaintext one would need 2t=6 three-dimensional arrays: $P_1, P_2, P_3, C_1, C_2, C_3$, where each array contains all 12 letters of the alphabet in some random order: In addition one needs a conversion table, say:

|       | $C_1$ | $C_2$ | $C_3$ |
|-------|-------|-------|-------|
| $P_1$ | x     | y     | z     |
| $P_2$ | z     | x     | y     |
| $P_3$ | y     | z     | x     | where x, y, z represent the three dimensions of the 3D arrays. The table shows how the column under $C_1$ (x,y, z) says that the first letter in the encrypted ciphertext block will be the one which is found in array $C_1$ where the x-coordinate is the x-coordinate of $p_1$ as food in array $P_1$, and for which the y-coordinate is the y-coordinate of $p_2$, as found in array $P_2$. Finally, the z-coordinate of $c_1$ is the z-coordinate of $p_3$ as found in array P3. Since $p_1$=B has x coordinate of x=3 in $P_1$, and since $p_2$=C has coordinate y=2 in $P_2$, and since $p_3$=J has coordinate z=1 in $P_3$, $c_1$ is the letter with coordinate: {3,2,1} in $C_1$ which is $c_1$=L. Similarly we resolve the values of x,y, z for the rest of conversation table:

|       | $C_1$ | $C_2$ | $C_3$ |
|-------|-------|-------|-------|
| $P_1$ | x = 3 | y = 2 | z = 1 |
| $P_2$ | z = 2 | x = 2 | y = 1 |
| $P_3$ | y = 1 | z = 2 | x = 3 |

And accordingly the block p=BCJ encrypts to the ciphertext block c=LJL. It will be exactly the reverse process to decryption: $p_1$ will be letter found in array $P_1$ where x=3, y=2, z=1 (the first row) points to $p_1$ in $P_2$. Similarly the rest of the plaintext block will be BCJ, in summary:

|       |   | $C_1$ | $C_2$ | $C_3$ |
|-------|---|-------|-------|-------|
| $P_1$ | B | x = 3 | y = 2 | z = 1 |
| $P_2$ | C | z = 2 | x = 2 | y = 1 |
| $P_3$ | J | y = 1 | z = 2 | x = 3 |
|       |   | L     | J     | L     |

The key space owing to the six arrays is: $(12!)^6 = 1.20*10^{52}$, multiplied by conversion table permutation 3!=6: $|K|=7.24*10^{52}$. Use Methods The fundamental distinction of the use of tensor cryptography is that its user determines its security level. All predominant block ciphers come with a fixed (debatable) measure of security. The user only selects the identity of the key, not to cryptanalytic challenge. Tensor cryptography comes with a security level which depends on the size of the key, and a few algorithmic parameters which are also determined in the key package. One might view tensor cryptography as a cipher framework, which the key, selected by the user determines its efficacy. Tensor cryptography may be used everywhere that any other block cipher has been used, and the responsibility for its utility has shifted from the cipher builder to the cipher user. The user will counter balance speed, key size, and security parameters like life span of the protected data, and its value to an assailant. Sophisticated users will determine the detailed parameters of the cryptographic tensors; less sophisticated users will indicate rough preference, and the code will select the specifics.

Since the size of the key is unbound, so is the security of the cipher. It may approach and reach Vernam or say Shannon perfect secrecy, if so desired. Since the user is in control, and not the programmer of the provider of the cipher, it would be necessary for the authorities to engage the user on any discussion of appropriateness of the use of one level of security or another. It will be of a greater liability for the government, but a better assurance of public privacy and independence. Staggered cryptography and staggered iterations offer a unique confidentiality management feature for cryptographic tensors, and one might expect this usage to mature and expand. The fact that the key size is user determined will invite the parties to exchange a key stock, and use randomized bits therein as called for by their per session decision. The parties could agree on codes to determine how many bits to use. It would easy to develop a procedure that would determine alphabet, dimensionality and array from a single parameter: the total number of bits selected for the key. Cryptographic tensors work over any alphabet, but there are obvious conveniences to use alphabets comprised of $n=2^i$ letters: $i=1,2,3, \ldots$ which are $i=\log(n)$ bits long. Dimensionality t, will be determined by integers $2_1^x, 2_2^x, \ldots 2_t^x$, such that: $x_1+x_2+ \ldots x_t=i$ Two Dimensional Tensors Two dimensional tensors (t=2) have the advantage of easy display, and hence easy study. We shall devote this section to this sub category of tensor cryptography.

The simplest case of tensor cryptography is when n=2, {0,1}, and t=2. There are 2t=4 arrays. For example: $P_1=|0,1|$, $P_2=|1,0|$, $C_1=|1,0|$, and $C_2=|0,1|$. These four arrays, combined with the conversion matrix comprise the encryption key. We write the conversion matrix as:

|    | $c_1$ | $c_2$ |
|----|-------|-------|
| $p_1$ | x | y |
| $p_2$ | y | x | where x and y represent the horizontal and vertical dimensions respectively.

A clear advantage to two dimensionality is that the conversion table may be depicted by fitting the four arrays $P_1, P_2, C_1, C_2$ as a combined matrix such that the vertical (y) coordinate of $p_1$ will determine the vertical (y) coordinate of $c_1$, and the horizontal (x) coordinate of $p_2$ will determine the horizontal (x) coordinate of $c_1$. And respectively, the horizontal (x) coordinate of $p_1$ will determine the horizontal (x) coordinate of $c_2$ while the vertical coordinate of $p_2$ will determine the vertical coordinate of $c_2$. The combined matrix:

| $P_1$ | $C_2$ |
|-------|-------|
| $C_1$ | $P_2$ |

The Tensorial key in this example (4 arrays plus the conversion table) may therefore be expressed by the following construction:

| 0 1 | 0 1 |
|-----|-----|
| 1 0 | 1 0 |

And accordingly a plaintext of any length p will be encrypted to same length ciphertext c. For example: let p=01111000. Written as blocks of 2 bits: p=01 11 10 00 and encrypted to c=10 00 01 11.

Another illustration: consider a 9 letters alphabet: A, B, C, D, E, F, G, H, I. Let's construct the combined matrix as follows:

| A B C | C G F |
|-------|-------|
| D E F | H E B |
| G H I | A D I |
| E B D | C D A |
| F A G | B E I |
| H I C | H F G |

Let the plaintext, p be: p=CBAGHAAB. Dividing to blocks: p=CB AG AH AB we now encrypt block by block. First block:"CB" we therefore mark letter C in array $P_1$, and letter B on array $P_2$:

```
A  B  * --|-- C  G  F
D  E  F   |   H  E  B
G  H  I   |   A  D  I
----------|-------------
E  B  D   |   C  D  A
F  A  G --|-- * E  I
H  I  C   |   H  F  G
```

And from the combined matrix read $c_1$=G, and $c_2$=C. Similarly we mark the second block: AG:, which translates to $c_1$=H and $c_2$=F.

```
*--B--C --|--C--G--F

D  E  F  |  H  E  B

G  H  I  |  A  D  I

--|----------|--

E  B  D  |  C  D  A

F  A  G  |  B  E  I

H--I--C --|--H--F--*
```

In summary plaintext p=CBAGHAAB is encrypted to c=GCHFBIFC. Decryption proceeds in reverse, using the same markings on the combined matrix.

Implementation Note (#1): Assuming that all letters are eventually expressed with binary digits, the nine letters in the above example will be expressed as four bits strings. Albeit, the full scope of 4 bits strings allows for 16 characters (letters) to be expressed. That means that in this case 16−9=7 letters will be available for meta data. For example indicating where an encrypted string starts and ends.

Arithmetic Variety Cryptography

Abstract: The cryptographic algorithms we use are all based on standard arithmetic. They can be interpreted on a basis of some different arithmetic where z=x+y is not necessarily the familiar addition; same for multiplication and raising to power, and similar for subtraction, division, and root extraction. By keeping the choice of such arithmetic secret one will further boost any cryptographic intractability latent in the nominal algorithm. We preset here such a variety of arithmetic based on a standard format in which any natural number N is expressed through a "power base" b, as follows: $N=n_1+n_2^2+\ldots n_b^b$, where $n_i$ (i=1,2 . . . b) comprise a b size vector. We then define addition, multiplication, and power-raising based on respective operations over the $n_i$ values. We show the formal compatibility and homomorphism of this family of arithmetic with the nominal variety, which renders the familiar cryptographic computations to be as effective in any of these arithmetic varieties.

Power Base Arithmetic Let every non-negative integer N be expanded to d non-negative numbers: $n_1, n_2, \ldots n_d$, such that: $N=\Sigma n_i^i$ for i=1,2, . . . d $n_i$ will be regarded as the i-dimension of N. There are various such expansions for every N. For example, for N=14, d=3: $14=5^1+3^2+0^3=2^1+2^2+2^3$ We shall define the "leftmost expansion" and the "rightmost expansion" for every N as follows: The leftmost expansion (LME) of N is the expansion for which $n_1=N$ and $n_2=n_3, \ldots n_d=0$. The rightmost expansion (RME) is the one for which $\Sigma n_i$ i=1,2, . . . d is minimum. If two or more expansions share that minimum, then the one where $\Sigma n_i$ i=2,3, . . . d is minimum, will be the RME. And if two or more expansions share that minimum then the sorting out will continue: the expansion for which $\Sigma n_i$ will be minimum for i=3,4, . . . d. And so on until only one expansion is left, which will be regarded as the rightmost expansion.

We shall refer to the rightmost expansion of N as the normalized expansion. Unless otherwise specified, the d expansion of N will be the rightmost, the normalized expansion.

In the above example, the first expansion of [5,3,0] has $S_b=8$, and the second expansion [1,2,2] has a smaller value $S_b=5$, and is the nominal expansion.

For N=33, b=3 we may write:

$$33=2^1+2^2+3^3 \quad \text{(i)}$$

$$33=0^1+5^2+2^3 \quad \text{(ii)}$$

where the $S_b$ are the same: $S_b=2+2+3=0+5+2=7$ so one compares:

$S_{b1}=2+3<S_{b1}=5+2$ So the first expansion is the nominal.

More examples: N=100 b=4 maps into [2, 3, 2, 3]; N=1000 b=4 maps into [7, 5, 7, 5]. The same number for b=7 map into: [0, 2, 0, 0, 2, 2, 0] and [3, 0, 3, 3, 2, 3, 2].

For N=123456789 b=7 we write [36, 32, 28, 21, 16, 16, 14], and for N=987654321 for b=15 we write: [8, 19, 13, 9, 11, 8, 9, 7, 6, 5, 6, 5, 4, 4, 3]

Power Base Vectors: An ordered list of b non-negative integers: $u_1, u_2, \ldots u_b$ will be regarded as a power-base vector of size b. Every power base vector (PB vector) has a corresponding "power base value", U, defined as:

$$U=u_1^1+u_2^2+\ldots u_b^b$$

As well as a corresponding normalized vector of size b, which is the normal expansion of U.

Properties of Power Base Numbers: Lemma 1: every natural number, N, may be represented via any power base b. Proof: the trivial representation always applies: $N=N+0^2+0^3+\ldots 0^b$ for any value of b.

Lemma 2: every ordered list (vector) of any number, b, of natural numbers: $m_1, m_2, \ldots m_b$ represents a natural number N, which is represented by some nominal power base expansion: $n_1, n_2, \ldots n_b$. The transitions from $m_1, m_2, \ldots m_b$ to $n_1, n_2, \ldots n_b$ is called the normalization of a non-nominal power base expansion.

Addition Let X and Y be two natural numbers, we may define their "power base addition", Z=X (+) Y as follows: For i=1,2, . . . b $z_i=x_i+y_i$, where $z_1$ is the i-th member of the power base expansion of Z, $x_i$ is the i-th member of the nominal power base expansion X, and $y_i$ is the i-th member of the nominal power base expansion of Y.

Illustration: 14(+)33=[2, 2, 2](+)[2, 2, 3]=[4, 4, 5]=$4+4^2+5^3$=145 . . . base 3

Vector Addition: Two power base vectors, U and V, both of size b may be PB-added: W=U(+)V as follows. U, and V will first be replaced by their normalized vector, and then the two normalized vectors will be added as defined above.

Attributes of Power-Base Addition

Let's explore a few key properties of power base arithmetic addition: Universality Any two non-negative integers, X and Y are associated with a non-negative integer Z=X (+) Y under any expansion base b=1,2, . . . This is obvious from the definition of power base addition. Monotony For any non-negative integer Z=X (+) Y, we have Z>=X, and Z>=Y. This too is readily concluded from the definition of power base arithmetic Commutativity The definition of power base addition readily leads to the conclusion of commutativity: X (+) Y=Y (+) X Associativity Z=X (+) (Y (+) W)=(X (+) Y) (+) W Also readily concluded from the definition, since for any member of the power base expansion we have $z_i=x_i+(y_i+w_i)=(x_i+y_i)+w_i$ Adding Zero: X=X (+) 0=0 (+) X per definition. Adding arbitrary power-base vectors: Let $X=(x_1, x_2, \ldots x_b)$, and $Y=(y_1, y_2, \ldots y_b)$ be two power-base vectors, namely all $x_i$ and $y_i$ (for i=1,2, . . . b) be non-negative integers. These two PB vectors are readily mapped to a corresponding non-negative value integer as follows: $X=x_1+x_2^2+\ldots+x_b^b$ and: $Y=y_1+y_2^2+\ldots+y_b^b$ However these power-base vectors are not necessarily the normalized power base expressions of X and Y. So once X and Y are determined as above, they each are expressed via their normalized expression: $X=x'_1+x'_2{}^2+\ldots+x'_b{}^b$ and: $Y=y'_1+y'_2{}^2+\ldots+y'_b{}^b$ And the addition procedure is then applied to the normalized version of X and Y. Illustration: Let X=(8,0,4) and Y=(13,1,0). We compute: $X=8+4^3=72$, and Y=13+1=14. Normalizing: $X=4+2^2+4^3$ and $Y=2+2^2+2^3$, and hence X (+) Y=[8,0,4](+)[13,1,0]=[4,2,4](+)[2,2,2]=[6, 4,6]=$6+4^2+6^3$=238. The Normalization in Addition Theorem: Power base addition generates a normalized expansion. The power base expansion that represents the addition of X+Y is the normalized expansion of Z=(X (+) Y). Proof: We first prove a few lemmas: Lemma: in a normalized expansion of X we have $x_i\neq 1$ for i=2,3, . . . b Proof: let $x_i=1$ for i=2,3, . . . b: $X=x_1+x_2^2+\ldots 1^i+\ldots x_b^b$. We can then write: $X=(x_1+1)+x_2^2+\ldots 0^i+\ldots x_b^b$ for which the sum $\Sigma$ $x_i$ for i=1 to i=b will be the same. However the sub-sum: $\Sigma$ $x_i$ for i=2 to i=b will be lower, and hence the normalized expansion cannot feature $x_i=1$ for any $i=2, \ldots b$. Based on this lemma for any $i=2,3 \ldots b$ there will not be $z_i=1$. Because it would require for either $x_i$ or for $y_i$ to be equal to 1 (and the other equal to zero). And since $x_i$ and $y_i$ are listed in the normalized expansions of X and Y respectively, neither one of them will be equal to one.

Let us divide X to $X_g$, and $X_h$: $X=X_g (+) X_h$, where: $X_g=x_1+x_2^2+ \ldots x_{b-1}^{b-1}$ $X_h=0+0+ \ldots x_b^b$ And similarly: divide Y to $Y_g$, and $Y_h$: $Y=Y_g (+) Y_h$, where: $Y_g=y_1+y_2^2+ \ldots y_{b-1}^{b-1}$ $Y_h=0+0+ \ldots y_b^b$ Accordingly we can write: $Z=X (+) Y=X_g (+) X_h (+) Y_g (+) Y_h$, and then rearrange: $Z=(X_g (+) Y_g) (+) (X_h (+) Y_h)=Z_g (+) Z_h$ We have then $Z_h=0+0+ \ldots (x_b+y_b)^b$. The normalized expansion of $Z_h$ cannot feature $z'_b>x_b+y_b$ because that would require a lower value for at least one of the members: $z_{h1}, z_{h2}, \ldots z_{hb-1}$. But all these values are zero, and cannot be lowered further. Similarly, the normalized expansion of $Z_h$ cannot feature: $z'_{hb}<x_b+y_b$ because that would mean that some $z_i$ for $i=1,2, \ldots (b-1)$ will be higher. However, for every such value of i, which instead of zero is now t, the contribution to the value of Z will be $t^i$, which for every i will be less than the corresponding loss: $(x_b+Y_b)^b-(x_b+y_b-t)^b$, and so the value of Z will not be preserved. We have proven, hence, that the normalized expansion of $Z_h$ cannot be anything else except: $0,0, \ldots (x_b+Y_b)$.

The remaining issue of $Z_g=X_g (+) Y_g$, we may handle recursively, namely to divide $X_g$: $X_g=X_{gu}+X_{gv}$, where: $X_{gu}=x_1+x_2^2+ \ldots x_{b-2}^{b-2}$ $X_{gv}=0+0+ \ldots x_{b-1}^{b-1}$ And similarly divide $Y_g$: $Y_g=Y_{gu}+Y_{gv}$, where: $Y_{gu}=y_1+y_2^2+ \ldots y_{b-2}^{b-2}$ $Y_{gv}=0+0+ \ldots y_{b-1}^{b-1}$ Repeating the logic above we will conclude that $z_{b-1}=x_{b-1}+y_{b-1}$, and so recursively prove that for every value of $i=1,2, \ldots b$ there holds: $z'_i=+y_i$, where $x'_i$ is the value of member i in the normalized version of Z.

Subtraction: Power Base Subtraction may be defined as the reverse operation to Power Base Addition: $X=(X (+) Y) (-) Y$ A non-negative integer X may be subtracted from a non-negative integer Z, to result in a non-negative integer Y defined as: $y_i=z_i-x_i$ for $i=1,2, \ldots b$ where $X=x_1+x_2^2+x_3^3+ \ldots +x_b^b$ and where $Z=z_1+z_2^2+z_3^3+ \ldots +z_b^b$. By definition subtraction is only defined for instances where $z_i=>x_i$ for all values of $i=1,2, \ldots b$ Power Base Multiplication We shall define $Z=X (*) Y$ power base (PB)=b, as the power base multiplication of two nonnegative integers X, and Y into a non-negative integer Z, as follows: For all values of $i=1,2, \ldots b$, there holds: $z_i=x_i*y_i$ where $X=x_1+x_2^2+x_3^3+ \ldots +x_b^b$ and where $Y=y_1+y_2^2+y_3^3+ \ldots +y_b^b$. The $x_i$ and $y_i (i=1,2, \ldots b)$ represent the rightmost expressions of X and Y respectively. So for X=32, Y=111, and b=3 we have: $X=1+2^2+3^3$, and $Y=11+6^2+4^3$, and hence $Z=[11, 12, 12]=11+12^2+12^3=1883$ Power Base Multiplication (PBM) should be well distinguished from nominal multiplication (N-multiplication) where a non-negative multiplicand, m multiplies a non-negative integer X, expressed as power-base, b: $Y=m*X$ PB $b=m*(X_1+x_2^2+ \ldots +x_b^b)=mx_1+mx_2^2+ \ldots +mx_b^b$ which results in $Y=y_1+y_2^2+ \ldots +y_b^b$, where $y_i=mx_i$ Nominal multiplication is equivalent to m power-base addition of X: $Y=X (+) X (+) \ldots (+)X$ Power Base Division Power base division may be defined as the reverse operation of multiplication: $X=(X (*) Y) (/) Y$ If $Y=Z (/) X$ then $y_i=z_i/x_i$ for all values of $i=1,2, \ldots b$ where $X=x_1+x_2^2+x_3^3+ \ldots +x_b^b$ and where $z=z_1+z_2^2+z_3^3+ \ldots +zb^b$ Generalized Division The above definition of division applied to reverse multiplication. In general $Y=Z/X$ (power base b) will be defined as follows: $y_i=(z_i-r_i)/x_i$ where $r_i$ is the smallest integer that would result in an integer division. Obviously $0 \leftarrow r_i \leftarrow x_i$. This division will be written as: $Y=(Z-R)/X$ or: $Y=Z/X$ with remainder R where $R=[r_1, r_2, \ldots r_b]$ is a b-size vector.

Prime power base numbers A number P will be regarded as power base prime, if, and only if there is no number T such that Q=P/T has a remainder $R=[o, o, \ldots o]$ (b elements), and Q is in its nominal expression. If there is a number T such that R=0, and the q, expression is the nominal expression of Q, then T is considered the power base factor of P. By definition P=T*Q. So for P=32 b=5 we have P=[0,0,0,0,2] we have P (PB=2) is prime. Same for with b=3: [1,2,3]. For P=100 b=4 we have: [2,3,2,3] it's the same (all members are primes). But with b=3 100=[0,6,4] we have, T=[0,2,2] (division 0/0 is defined as 0), which is T=12 and the [0,2,2] expression is its nominal. And Q=[0,6,4](/)[0,2,2]= [0,3,2]=17 in its nominal (or say normalized) form. So for b=3 we have 12*17=100, which makes 100 a composite, and not a prime. A variety of prime numbers based crypto procedures could be adjusted to reflect this power base definition.

Modular Power Base Arithmetic Given a natural number M, a non-negative integer N' with power base b and which is expressed as $[n'_1, n'_2, \ldots n'_n]$ such that: $n_i=n'_i$ mod M where $n_i$ (for $i=1,2 \ldots b$) is $\leftarrow$M will be converted to N defined as: $N=n_1+n_2^2+ \ldots n_b^b$ And one will write: N=N' mod M over power base b N will then be expanded in a nominal way, which may be different from the expansion above. Illustration: let M=5 Let N'=1234. Using power base b=3 N' is expressed as: [9, 15, 10]. It is converted through modular arithmetics to N=[4, 0, 0] and we write: 4=1234 Mod 5 (power base b=3). And the nominal expansion is N=4=[0, 2, 0] Another: M=3 N'=5000 power base=4. It is expressed as N'=[6, 13, 9, 8]. Using the modular reduction: N=[0, 1, 0, 2]=17 for which the nominal expansion is: [1, 0, 0,2]. In modular arithmetics with power base b a modular M largest number will be: $N_{max}=(M-1)+(M-1)^2+(M-1)^b$ So for M=7 b=4 $N_{max}=6+6^2+6^3+6^4=1554=[6, 6, 6, 6]$. So in modular power base arithmetics with M=7 and b=4 all natural numbers are mapped to the range 0 to 1554.

Based on the known rules for regular modularity we can define Z=X+Y mod M (PB=b), and Z=X*Y mod M (power base b). And the modularity transfers: X+Y=(X mod M)+(Y mod M) mod M (PB=b), and similarly for multiplication. Association is not valid. cryptographic implications Modular power base arithmetics offers an alternative calculus on a modular basis. Numbers in some range 0 to (M-1) are exchanged based on some math formula and two values: M, the modular value, and b the power base value. Unlike the common modular arithmetic math which relies on computational burdens of raising to power in a modular environment. This power base paradigm is readily computable, and is competing with speed and efficiency with the common symmetric ciphers. A plaintext P of some bit length, p, may be interpreted as a number N&ndexp. A modular number $M>2^p$ may be chosen, and a power base b may be chosen too. One could then use a number E and compute: $N_c=f(M_p, E)$ mod M, power base=b where f is some agreed upon function, and E is the 'encryption key'. The result $N_c$ will be regarded as the corresponding ciphertext to $N_p$. f will be chosen such that a given other number D will reverse the process: $N_p=f(M_p, D)$ mod M, power base b where f may be close to f' or even f=f'. If such two different numbers E and D are found then this is a basis for an efficient cipher, provided one can not easily be derived from the other. If E=D are the two are easily mutually derivable then this scheme will serve as a symmetric cipher where M, b, E and D are the secret keys. Every modular arithmetic cipher may be adjusted and transformed to operate as a power base modular cipher. Some such conversions will be efficient and very useful, and some not.

Dimensionality Expansion Illustration For X=100,000 expressed in dimensionality d=11 will look like: 0, 11, 9, 7, 5, 4, 3, 3, 3, 3, 2. The same X with dimensionality d=20 will look like this: 0, 0, 0, 0, 2, 0, 2, 0, 2, 2, 0, 0, 0, 0, 2, 2, 0, 0, 0, 0. And with d=3: 63, 51, 46

Power-Raising Power Based Arithmetics Let's define: $Y=X^E$ mod M, power base b: $y_i=x_i^{e_i}$ mod M where y, is the i-th element in the power base expression of Y, and $x_i$ is the -th element in X, and $e_i$ is the i-th element in E. The expression: $y_1, y_2, y_b$ of Y is not necessarily the normalized expression $(Y_n)$. It is the t-th expression when all the possible expressions of Y (in power base b) are ranked from the right most expression (RME) to the leftmost expression (LME). Given Y and t, it is easy to calculate the expression that is exactly the $y_1, y_2, \ldots y_b$ series. And then by the mathematics of RSA, there is a vector D comprised of $d_1, d_2 \ldots d_b$ elements such that: $x_i=y_i^{d_i}$ mod M power base b Hence by sharing M and b two crypto correspondents will be able to practice asymmetric cryptography, based on RSA. However, because the individual numbers $x_i$ nd y, are so much smaller than X and Y, there are various combinations of b and M values where the power base version of RSA shows clear advantages. The above could also be used as a one-way function where the values of t, M, and b remain secret. The holder of Y and X will be able to ascertain that a claimer to hold E, M and b is indeed in possession of E. It is likely that there are different combinations of E, M and B that relate X to Y, but they all seem hard to identify.

Transposition-Based Substitution (TBS)

An n-bits long plaintext, p, is concatenated with p*=p[XOR] $\{1\}^n$ Into P=p||p* is transposed by a key space $|K_{TBS}|=(2n)$ !unlike a Vernam key that must be of size $|K_{Vernam}|=n$: $0<|K_{TBS}|<\log((2n)!)$TBS operates with any size key!

BitMint Escrow

An Automated Payment Solution to Replace Escrow Accounts Mutually Mistrustful Buyer and Seller Use Tethered Money to Benefit from the Mutual Security Otherwise Offered by Expensive and Cumbersome Escrow Services Increasingly, strangers across the Internet wish to conduct a one-off business, but are worried about the other side not following through on the deal. This common apprehension is properly addressed via escrow services where a trusted third party holds the payment until the buyer is satisfied, or until a resolution is reached (voluntarily or by court order). While the escrow solution is a fitting one for business-to-business transactions of a moderate to large volume, or for buyer and seller who subscribe to a governing organization (e.g. eBay), the growing majority of ad-hoc deals where buyer and seller stumble upon each other in cyberspace, is below the threshold that justifies the effort and the expense to secure a traditional escrow solution. This is the niche to which BitMint addresses itself: offering automated escrow services via the payment system that enjoys the credibility to redeem its digitized dollars against terms specified by the users. BitMint, the payment system, is not a side in the transaction, it simply obeys the terms specified by the buyer of its digitized money, and does so automatically, cheaply, and fast. How will it work? Buyer and Seller agree on terms; the buyer then "buys" digitized dollars from BitMint at the amount of the sale ($x). He instructs BitMint to redeem this money in favor of the seller (identified by some recurring by or one-time use ID), but only after the buyer sends the "OK to release" signal. The buyer further instructs BitMint to hold the $x unredeemed for a period of, say, six months, at the end of which the money returns to the disposition of the buyer—unless either the OK signal was given, or a court, or an arbitration agent orders the money frozen. The above is just one option among many possible terms agreed upon by the buyer and the seller. This particular option satisfies the buyer that if the seller is a fraudster, or does not deliver as promised, then the buyer's money will automatically return to the buyer's disposal after the set time (six months). The seller is satisfied that (i) the buyer came up with the money for the deal, and (ii) that the seller has six months to approach a pre-agreed upon arbitration service, or a court, to put a hold on the money until the dispute is resolved. Like in a nominal escrow, the very fact that the money is not in the control of either party incentivizes both parties to resolve the matter, and suppresses the temptation to cheat. Even if a moderate percentage of deals that don't go through because of this mutual mistrust, will end up happening, then the net effect will be the creation of a new market that was not there before, and the first to command this market has the head start to dominate it for the foreseeable future.

BRIEF DESCRIPTION OF THE DRAWING

FIG. 1: The PARCEL and PUZZLE Procedures

FIG. 1 shows the Prover holding the secret bit string represented as (a), The Prover then uses the agreed upon scheme to PARCEL it out to sub-strings represented as A, B, C, D, E, F shown as (b). Next the Prover uses a randomness source to randomly transpose string (a) into string (c) by changing the positions of the sub-strings. Element (d) in the figure represents string (c) as one solid string with no markings of the constituent substrings. String (d) is passed on from the Prover to the Verifier through insecure channels. Element (e) in the figure represents the received string, so (d)=(e). The Verifier then uses the same scheme the Prover used to break his copy of the shared data (g) to the same sub-strings A, B, C, D, E, and F. Then the Verifier solves a PUZZLE: can he fit these substrings in some order so that the combined string is identical to string (d) received from the Prover. If so, then the Verifier concludes that the Prover is in possession of the shared secret (a)=(g).

What is claimed is:

1. A method for a party regarded as a Prover sharing with another party regarded as a Verifier a secret S in a form of a bit string which is t bits long, to prove to the Verifier that the Prover is in possession of S by (i) the Prover applying a shared string-parceling algorithm, PARCEL, which will parcel string S to n≤t sub strings $s_1, s_2, \ldots s_n$ such that these n substrings concatenate to $S:S=s_1||s_2|| \ldots ||s_n$, then (ii) the Prover applying a source of randomness to transpose the n substrings into a different permutation, where $s_i$ is placed in position j, and marked $s_{ij}$, for i,j=1,2, . . . n, then (iii) the Prover reassembling the n substrings according to the selected permutation, to create string S* comprised oft bits: $S^*=s_{i1}||s_{k2}|| \ldots ||s_{ln}$, where i,k,l are integers from the set 1,2, . . . n, then (iv) the Prover communicating S* to the Verifier;

(v) the Verifier applies PARCEL to S and generates the same n substrings $s_1, s_2, \ldots s_n$, then (vi) the Verifier performs, a re-arranging permutation, PUZZLE test, checking that these n substrings, $(s_1, s_2, \ldots s_n)$ can be re-arranged in a different permutation such that when these strings are concatenated according to the new permutation, they form string S*; the test is regarded 'successful' if such a permutation is found, and is regarded 'failure' if no such permutation is found; then (vii) if the PUZZLE test is successful, the Verifier accepts the Prover, as the party which shares the possession of secret S, and when the PUZZLE test fails the Verifier rejects the Prover as possessing S.

2. The method of claim 1, further comprising the Verifier randomly selecting a number R, communicating R to the Prover, then both the Verifier and the Prover use an agreed upon algorithm, MIX, to mix R with S to generate a string Q=MIX(S, R), shared only by the Verifier and the Prover who share the secret S; wherein Q instead of S is used in the PARCEL function and the PUZZLE test.

3. The method of claim 1, wherein no repetition exists among the n substrings: $s_i \neq s_j$ for $i \neq j$, for i,j=1,2, ... n.

4. The method of claim 1, wherein the PARCEL function is defined as follows:

(i) parceling S to $s_1$ of length 1 bit, as the leftmost 1 bit in S, and to the rest of S, string $S^1$, then (ii) parceling $S^1$ to $s_2$, of length 2 bits, as the leftmost 2 bits in $S^1$, and the rest of $S^1$, string $S^2$, and so on, (iii) parceling $S^{(i-1)}$ to $s_i$, of length i bits, as the leftmost i bits in $S^{(i-1)}$, and the rest of $S^{(i-1)}$, string $S^i$, and so on until $s_{(n-1)}$, then (iv) assigning $s_n = S^{(n-1)}$.

5. The method of claim 1, wherein two parties share a secret string S comprised of t bits to exchange a secret transposition key T with which to transpose a permutation comprised of n entities to any one of the possible n! permutations, by regarding each $s_{ij}$ as an instruction to move the entity in position i to position j: i→j for i=1,2, ... n.

* * * * *